US012760959B2

(12) United States Patent
Yang et al.

(10) Patent No.: US 12,760,959 B2
(45) Date of Patent: Oct. 13, 2026

(54) REFRIGERATOR

(71) Applicant: HISENSE REFRIGERATOR CO., LTD., Qingdao (CN)

(72) Inventors: Chun Yang, Qingdao (CN); Dong Guo, Qingdao (CN); Xiangping Zhang, Qingdao (CN)

(73) Assignee: HISENSE REFRIGERATOR CO., LTD., Qingdao (CN)

( * ) Notice: Subject to any disclaimer, the term of this patent is extended or adjusted under 35 U.S.C. 154(b) by 0 days.

(21) Appl. No.: 18/900,137

(22) Filed: Sep. 27, 2024

(65) Prior Publication Data

US 2025/0020390 A1 Jan. 16, 2025

Related U.S. Application Data

(63) Continuation of application No. PCT/CN2022/129649, filed on Nov. 3, 2022.

(30) Foreign Application Priority Data

Jun. 30, 2022 (CN) ......................... 202210756766.7

(51) Int. Cl.
*F25D 23/02* (2006.01)
*E05D 3/18* (2006.01)
*F25D 23/06* (2006.01)

(52) U.S. Cl.
CPC ............ *F25D 23/028* (2013.01); *E05D 3/18* (2013.01); *F25D 23/062* (2013.01);
(Continued)

(58) Field of Classification Search
CPC ................. F25D 23/028; F25D 23/063; F25D 2323/024; F25D 2323/06; E05D 3/06; E05D 3/18; E05Y 2900/31
(Continued)

(56) References Cited

U.S. PATENT DOCUMENTS 2,793,387 A * 5/1957 Odell ......................... E05D 3/18 16/358
2,867,839 A * 1/1959 Squire ........................ E05D 3/18 16/358

(Continued)

FOREIGN PATENT DOCUMENTS

CN 104295174 A 1/2015
CN 106766596 A 5/2017

(Continued)

OTHER PUBLICATIONS

Chinese Notification of the First Office Action dated Sep. 28, 2023 in corresponding Chinese Application No. 202210756766.7, translated, 17 pages.

(Continued)

*Primary Examiner* — James O Hansen
(74) *Attorney, Agent, or Firm* — MH2 Technology Law Group LLP

(57) ABSTRACT

A refrigerator includes a box body, a door body, a hinge assembly, and a mounting block. The door body is connected to the box body. The hinge assembly includes a first hinge shaft and a second hinge shaft. The mounting block includes a first trajectory groove and a second trajectory groove. During a process of the door body being rotated to open or close, the first hinge shaft moves relative to the first trajectory groove, and the second hinge shaft moves relative to the second trajectory groove. The first trajectory groove includes a curved groove segment. An end of the curved groove segment extends in a direction proximate to a first side edge, and a distance between the curved groove segment and the door side wall is decreased along a direction from a door rear wall to a door front wall.

19 Claims, 13 Drawing Sheets

(52) U.S. Cl.
CPC ..... *E05Y 2900/31* (2013.01); *F25D 2323/024* (2013.01); *F25D 2323/06* (2013.01)

(58) Field of Classification Search
USPC .......................................................... 312/405
See application file for complete search history.

(56) References Cited

U.S. PATENT DOCUMENTS

| | | | | |
|---|---|---|---|---|
| 3,065,498 A * | 11/1962 | Johnson | E05D 3/18 | 16/359 |
| 3,083,403 A * | 4/1963 | Van Noord | E05D 3/18 | 16/361 |
| 6,493,906 B2 * | 12/2002 | Matteau | E05D 3/18 | 16/358 |
| 8,303,059 B2 * | 11/2012 | Darney | E05D 3/18 | 312/405 |
| 11,149,478 B2 * | 10/2021 | Xia | E05D 3/18 | |
| 2019/0186183 A1 * | 6/2019 | He | E05D 11/06 | |
| 2020/0124342 A1 * | 4/2020 | Zhang | E05D 3/18 | |
| 2022/0259907 A1 * | 8/2022 | Xia | E05D 3/18 | |

FOREIGN PATENT DOCUMENTS

| | | |
|---|---|---|
| CN | 207048541 U | 2/2018 |
| CN | 111155859 A | 5/2020 |
| WO | 2021012657 A1 | 1/2021 |

OTHER PUBLICATIONS

Extended European Search Report dated May 12, 2026 in corresponding European Application No. 22949065.1, 11 pages.

* cited by examiner

REFRIGERATOR

CROSS-REFERENCE TO RELATED APPLICATIONS

This application is a continuation application of International Patent Application No. PCT/CN2022/129649, filed on Nov. 3, 2022, which claims priority to Chinese Patent Application No. 202210756766.7, filed on Jun. 30, 2022, which are incorporated herein by reference in their entirety.

TECHNICAL FIELD

The present disclosure relates to the technical field of household appliances and, in particular, to a refrigerator.

BACKGROUND

In family life, refrigerators have become one of the necessary household appliances for every family. More and more consumers choose built-in refrigerators due to a demand for a beautiful and concise interior.

The built-in refrigerator is to embed the refrigerator into a matching cabinet, and form a heat dissipation cycle through a bottom plate, a back plate, and a top plate. Therefore, there may be small gaps between left and right side walls of the refrigerator and an inner wall of the cabinet.

SUMMARY

A refrigerator is provided, and the refrigerator includes: a box body, a refrigeration device, at least one door body, a hinge assembly, and a mounting block.

The box body includes a plurality of storage compartments, an inner container defining the plurality of storage compartments, a shell forming an appearance of the refrigerator, and a heat insulation layer disposed between the inner container and the shell. The box body includes a first body side wall and a second body side wall disposed opposite to each other. The plurality of storage compartments include a refrigerating compartment and a freezing compartment located below the refrigerating compartment, and an access opening is provided at a front end of any one of the plurality of storage compartments.

The refrigeration device is used for supplying cold air to the storage compartments.

The at least one door body is connected to the box body and used to open and close an access opening corresponding to the any one of the plurality of storage compartments. The door body includes a door front wall, a door rear wall, a door side wall, a first side edge W, and a second side edge N.

The door front wall is disposed away from the box body in a case where the door body is closed, the door rear wall is disposed opposite to the door front wall and proximate to the box body, and the door side wall is disposed proximate to a hinge assembly and is connected to the door front wall.

The first side edge W is provided by an intersection of the door front wall and the door side wall of the door body.

The second side edge N is provided by an intersection of the door side wall and the door rear wall. In a case where the door body is closed, the first side edge W is located at a side of the second side edge N away from the box body.

The hinge assembly includes a hinge plate fixedly connected to the box body. The hinge plate includes a connecting portion connected to the box body, an extending portion extending from the connecting portion towards a front side and in a shape of a horizontal plate, and a first hinge shaft and a second hinge shaft integrally provided on the extending portion. In a case where the door body is in a closed state, the first hinge shaft is located at a side of the second hinge shaft proximate to the door side wall and proximate to the door rear wall.

The mounting block includes a plate body and a first trajectory groove and a second trajectory groove provided on the plate body. A lower end surface of the door body is provided with an accommodating groove, and the mounting block is located in the accommodating groove and is fixedly connected to the door body.

The first hinge shaft is adapted to the first trajectory groove, and the second hinge shaft is adapted to the second trajectory groove. During a process of the door body rotating to open or close, the first hinge shaft moves relative to the first trajectory groove, and the second hinge shaft moves relative to the second trajectory groove.

The first trajectory groove includes a curved groove segment. An end of the curved groove segment extends in a direction proximate to the first side edge W, and a distance between the curved groove segment and the door side wall is decreased along a direction from the door rear wall to the door front wall. An end of the second trajectory groove is farther away from the door rear wall and the door side wall than another end of the second trajectory groove.

A center trajectory line of the first trajectory groove is referred to as a first trajectory line S, and a center trajectory line of the second trajectory groove is referred to as a second trajectory line K. A center axis of the first hinge shaft is referred to as a positioning center axis P, and a center axis of the second hinge shaft is referred to as a guiding center axis Q.

In a case where the door body is in the closed state, the positioning center axis P is located at a first positioning point $P_1$ of the first trajectory line S, and the guiding center axis Q is located at a first guiding point $Q_1$ of the second trajectory line K. In a case where the door body is opened to a maximum angle $G_{max}$, the positioning center axis P is located at a sixth positioning point $P_6$ of the first trajectory line S, and the guiding center axis Q is located at a sixth guiding point $Q_6$ of the second trajectory line K.

The first positioning point $P_1$ is an end point that the positioning center axis P reaches away from the door side wall when the positioning center axis P moves along the first trajectory line S; the sixth positioning point $P_6$ is an end point that the positioning center axis P reaches proximate to the door side wall when the positioning center axis P moves along the first trajectory line S; the first guiding point $Q_1$ is an end point that the guiding center axis Q reaches away from the door side wall when the guiding center axis Q moves along the second trajectory line K; and the sixth guiding point $Q_6$ is an end point that the guiding center axis Q reaches proximate to the door side wall when the guiding center axis Q moves along the second trajectory line K.

A distance between the first positioning point $P_1$ and the door front wall is referred to as $D_1$, and a distance between the sixth positioning point $P_6$ and the door front wall is referred to as $D_2$.

A distance between the first guiding point $Q_1$ and the door front wall is referred to as $Z_1$, and a distance between the sixth guiding point $Q_6$ and the door front wall is referred to as $Z_2$, and $Z_1<D_2$.

In a case where the door body is in the closed state, a distance between the first hinge shaft and the second hinge shaft in a first direction parallel to the door side wall is referred to as $L_1$, and $L_1$ is equal to a difference between $D_1$ and $Z_1$. $L_1$ is any value in a range from 2.5 mm to 10 mm.

A distance between the first hinge shaft and the second hinge shaft in a second direction perpendicular to the door side wall is referred to as $L_2$, and $L_2$ is any value in a range from 7.5 mm to 30 mm.

There is a first gap $J_1$ between an end surface of the first hinge shaft away from the hinge plate and a groove bottom of the first trajectory groove, and there is a second gap $J_2$ between an end surface of the second hinge shaft away from the hinge plate and a groove bottom of the second trajectory groove. The second gap $J_2$ is greater than or equal to the first gap $J_1$.

The mounting block further includes a lock hook disposed on the plate body and located at a side of the plate body away from the door side wall. The lock hook includes a hooking portion extending to a side away from the door side wall and bent to a side proximate to the door rear wall. The lock hook is provided with an opening facing towards the plate body. A free end of the lock hook is closer to the door rear wall than a fixed end of the lock hook.

A side of the hinge plate away from the first body side wall is provided with a blocking portion. A side of the blocking portion proximate to the box body is provided with a hook gap.

In a case where the door body is in the closed state, the free end of the lock hook is accommodated in the hook gap, so that the lock hook is locked with the hinge plate to lock the door body. In a case where the door body is opened, the lock hook is deformed due to force and is disengaged from the blocking portion.

A position, proximate to the first body side wall, of an end of the hinge plate away from the box body is provided with a limiting surface.

A lower end portion of a door body proximate to the hinge assembly is provided with a limiting portion. The limiting portion includes an embedded portion and a limiting bar. The limiting portion is a sheet metal member.

The embedded portion is plate-shaped. The mounting block is located at a side of the embedded portion away from the door body, and the mounting block is used to clamp and fix the embedded portion on the door body.

The limiting bar extends out of a surface of the door body from an edge of the embedded portion proximate to the door front wall towards a side away from the door body the surface of the door body.

In a case where the door body is opened from the closed state to the maximum angle $G_{max}$, the limiting bar abuts against the limiting surface to prevent the door body from rotating.

An angle bisecting plane of an included angle provided by the door front wall and the door side wall is referred to as an angle bisecting plane H. In a case where the door body is closed, a central axis of the first hinge shaft is located at a side of the angle bisecting plane H away from the door side wall.

BRIEF DESCRIPTION OF THE DRAWINGS

In order to describe the technical solutions of the embodiments of the present disclosure more clearly, accompanying drawings to be used in some embodiments of the present disclosure will be introduced briefly below. However, the accompanying drawings to be described below are merely accompanying drawings of some embodiments of the present disclosure, and a person having ordinary skill in the art may obtain other drawings according to these drawings. In addition, the accompanying drawings to be described below may be regarded as schematic diagrams and are not limitations on an actual size of a product, an actual process of a method, and an actual timing of a signal to which the embodiments of the present disclosure relate.

DETAILED DESCRIPTION

Figure 1:
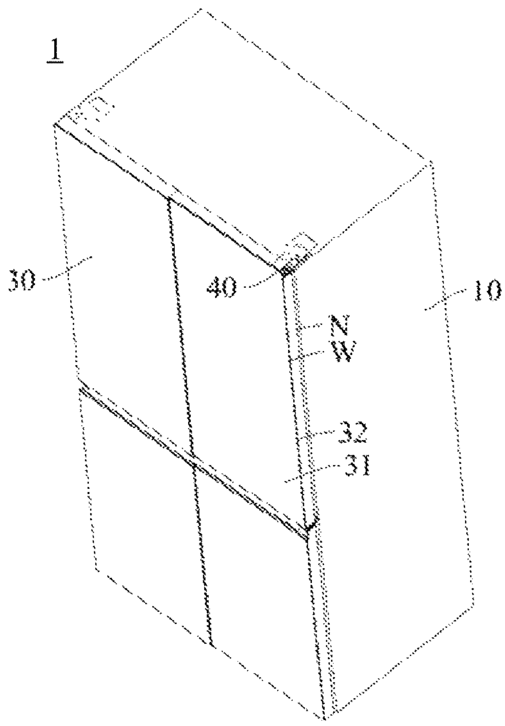
FIG. 1 is a perspective view of a refrigerator, in accordance with some embodiments.

The technical solutions in some embodiments of the present disclosure will be described clearly and completely with reference to the accompanying drawings. However, the described embodiments are merely some but not all of embodiments of the present disclosure. All other embodiments obtained by a person of ordinary skill in the art based on embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

The terms "first" and "second" are used for descriptive purposes only, and are not to be construed as indicating or implying a relative importance or implicitly indicating a number of indicated technical features. Thus, features defined by "first" or "second" may explicitly or implicitly include one or more of the features. In the description of the embodiments of the present disclosure, the term "a plurality of" or "the plurality of" means two or more unless otherwise specified.

In the description of some embodiments, the expressions "coupled," "connected," and derivatives thereof may be used. The term "connected" should be understood in a broad sense. For example, the term "connected" may represent a fixed connection, a detachable connection, or a one-piece connection, or may represent a direct connection, or may represent an indirect connection through an intermediate medium. The term "coupled" may be used in the description of some embodiments to indicate that two or more components are in direct physical or electrical contact with each other. The term "coupled" or "communicatively coupled," however, may also mean that two or more components are not in direct contact with each other, but still cooperate or interact with each other. The embodiments disclosed herein are not necessarily limited to the content herein.

The phrase "at least one of A, B, and C" has the same meaning as the phrase "at least one of A, B, or C", both including the following combinations of A, B, and C: only A, only B, only C, a combination of A and B, a combination of A and C, a combination of B and C, and a combination of A, B, and C.

The phrase "A and/or B" includes following three combinations: only A, only B, and a combination of A and B.

The use of the phrase "applicable to" or "configured to" herein means an open and inclusive expression, which does not exclude devices that are applicable to or configured to perform additional tasks or steps.

In addition, the use of the phrase "based on" is meant to be open and inclusive, since a process, step, calculation, or other action that is "based on" one or more of the stated conditions or values may, in practice, be based on additional conditions or values other than those stated.

The term such as "about," "substantially," or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

The term such as "parallel," "perpendicular," or "equal" as used herein includes a stated condition and a condition similar to the stated condition. A range of the similar condition is within an acceptable deviation range, and the acceptable deviation range is determined by a person of ordinary skill in the art, considering measurement in question and errors associated with measurement of a particular quantity (i.e., the limitations of a measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°. The term "equal" includes absolute equality and approximate equality, and an acceptable range of deviation of the approximate equality may be that, for example, a difference between the two that are equal is less than or equal to 5% of either of the two.

Hereinafter, the embodiments of the present application will be described in detail with reference to the accompanying drawings. In the accompanying drawings, a side of a refrigerator facing a user during use is defined as a front side, and a side opposite to the front side is defined as a rear side.

Embodiment 1

The embodiment 1 of the present disclosure provides a refrigerator 1. Referring to FIG. 1, the refrigerator 1 includes a box body 10 having a storage compartment, a door body 30 connected to the box body 10 to open and close the storage compartment, and a refrigeration device for supplying cold air to the storage compartment. The box body 10 includes an inner container defining the storage compartment, a shell connected to an outside of the inner container to form an appearance of the refrigerator, and a heat insulation layer disposed between the inner container and the shell to insulate the heat transfer of the storage compartment.

The box body 10 defines a plurality of storage compartments. In this embodiment, the plurality of storage compartments include a refrigerating compartment and a freezing compartment located below the refrigerating compartment. It will be noted that the types and arrangements of the plurality of storage compartments of the refrigerator 1 are not limited thereto.

An access opening is formed at a front end of the storage compartment, through which the user may place food into the storage compartment or take out food from the storage compartment. The door body 30 is rotatable and is disposed on the box body 10, so as to open or close the access opening of the storage compartment. For example, the door body 30 is rotatably connected to the box body 10 through a hinge assembly located at an upper portion of the refrigerator 1 and a hinge assembly located at a lower portion of the refrigerator 1.

The box body 10 includes a first body side wall (i.e., one of a left side wall and a right side wall of the box body 10) and a second body side wall (i.e., another of the left side wall and the right side wall of the box body 10) opposite to each other. The hinge assembly is disposed on the box body 10 and proximate to the first body side wall.

The door body 30 has a door front wall 31 that is away from the box body 10 in a case where the door body 30 is closed, a door rear wall 33 that is opposite to the door front wall 31, and a door side wall 32 that is proximate to the hinge assembly and connected to the door front wall 31.

For example, in a case where the hinge assembly is located at the right side of the box body 10, the right side wall of the door body 30 is the door side wall 32. In a case where the hinge assembly is located at the left side of the box body 10, the left side wall of the door body 30 is the door side wall 32.

The door front wall 31 of the door body 30 intersects with the door side wall 32 to form a first side edge W, and the door side wall 32 intersects with the door rear wall 33 to form a second side edge N. In a case where the door body 30 is closed, the first side edge W is located at a side of the second side edge N away from the box body 10.

It will be noted that in a case where the door front wall 31 and the door side wall 32 are both flat walls, an intersection line of a plane where the door front wall 31 is located and a plane where the door side wall 32 is located is a theoretical first side edge W. A rounded corner transition at the intersection of the door front wall 31 and the door side wall 32 forms a curved surface extending along a height direction of the door body 30 (i.e., an up-down direction as shown in FIG. 1). For ease of description, any straight line extending along the height direction of the door body 30 on the curved surface represents the first side edge W. Similarly, the intersection of the door rear wall 33 and the door side wall 32 is provided with a rounded corner transition, so that an intersection line of the planes where the door rear wall 33 and the door side wall 32 are located respectively may represent the second side edge N, or a straight line located proximate to and parallel to the intersection line may represent the second side edge N.

Figure 2:
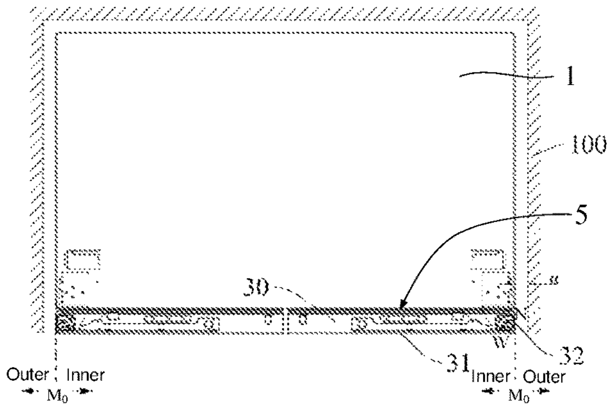
FIG. 2 is a top view of a refrigerator, in accordance with some embodiments.
Figure 3:
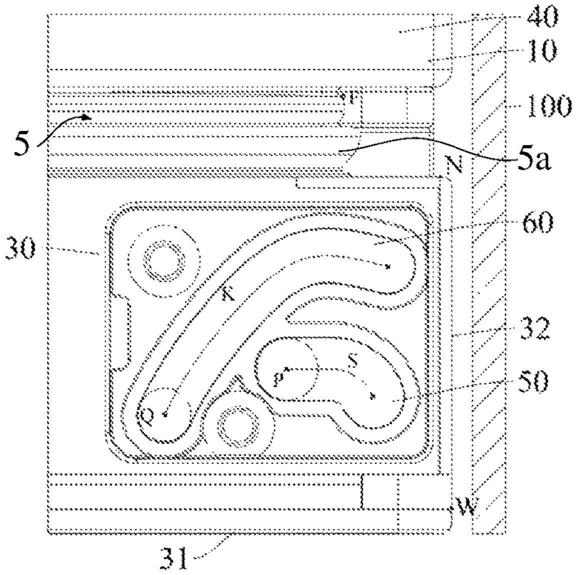
FIG. 3 is a schematic structural diagram of a hinge assembly of a refrigerator, in accordance with some embodiments.

As shown in FIGS. 2 and 3, a door seal 5 is disposed on the rear side wall of the door body 30. In a case where the door body 30 is closed, the door seal 5 surrounds the access opening and is fit with the front end surface of the box body 10, so as to effectively seal the connected position between the door body 30 and the box body 10 and ensure that the door body 30 seals the access opening, thereby avoiding cold air leakage. For example, the door seal 5 is ring-shaped.

Figure 4:
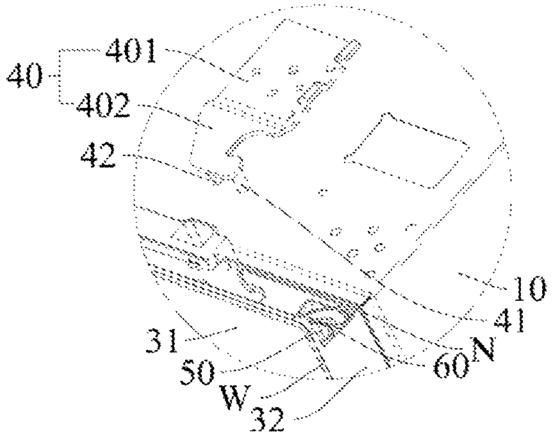
FIG. 4 is an exploded view of a hinge assembly at an upper right corner of a refrigerator, in accordance with some embodiments.

Referring to FIGS. 2 to 4, the hinge assembly includes a first hinge shaft 41 (i.e., a main hinge shaft) and a second hinge shaft 42 (i.e., an auxiliary hinge shaft) located at a side of the first hinge shaft 41 away from the first body side wall. An end portion of the door body 30 proximate to the hinge assembly is provided with a first trajectory groove 50 and a second trajectory groove 60. The first hinge shaft 41 is adapted to the first trajectory groove 50, and the second hinge shaft 42 is adapted to the second trajectory groove 60. During a process of the door body 30 being rotated to open or close, the first hinge shaft 41 moves relative to the first trajectory groove 50, and the second hinge shaft 42 moves relative to the second trajectory groove 60.

The hinge assembly includes a hinge plate 40 fixedly connected to the box body 10. The hinge plate 40 includes a first connecting portion 401 connected to the box body 10, and a horizontal plate-shaped extending portion 402 extending from the first connecting portion 401 to the front side (i.e., a preset direction). The first connecting portion 401 may be connected to the box body 10 through fasteners such as screws, pins, and bolts.

For example, referring to FIG. 4, for the hinge assembly located at the upper end of the door body 30, the hinge assembly includes a hinge plate 40 connected to the upper end of the box body 10, and the first hinge shaft 41 and the second hinge shaft 42 are connected to the hinge plate 40, so as to form the limiting shafts for guiding the movement of the door body 30. The hinge plate 40, the first hinge shaft 41, and the second hinge shaft 42 may be integrally formed, or may be provided separately and assembled with each other.

The first hinge shaft 41 and the second hinge shaft 42 are disposed on the extending portion 402 and extend vertically downward.

For the hinge assembly located at the lower end of the door body 30, the first connecting portion 401 is connected to the front end surface of the box body 10. The first hinge shaft 41 and the second hinge shaft 42 are disposed on the hinge plate 40 and extend upward.

Corresponding to the positions of the hinge plates 40, both the upper end and the lower end of the door body 30 are provided with the first trajectory groove 50 and the second trajectory groove 60. For example, two first trajectory grooves 50 located at the upper end and the lower end of the door body 30 have corresponding positions in the height direction of the refrigerator 1, and two second trajectory grooves 60 have corresponding positions in the height direction of the refrigerator 1, so as to ensure the consistent movement of the upper end and the lower end of the door body 30, so that the door body 30 may be opened or closed smoothly.

In this embodiment, with continued reference to FIG. 2, the plane where the side wall (i.e., the first body side wall) of the box body 10 proximate to the hinge plate 40 is defined as a datum plane $M_0$. In a case where the refrigerator 1 is received in the cabinet 100, a side of the datum plane $M_0$ proximate to the cabinet 100 is defined as an outer side, and an opposite side proximate to the storage compartment is defined as an inner side.

For example, in a case where the door body 30 is closed, the plane where the door front wall 31 is located is substantially flush with a plane where a front end surface of the cabinet 100 is located (i.e., a distance between the two planes is less than 2 mm). In order to place the refrigerator 1 in the cabinet 100 for use, a gap a is generally reserved between the cabinet 100 and the first body side wall (i.e., the datum plane $M_0$) of the refrigerator 1. For example, a width of the gap a is in a range from 3 to 5 (i.e., $\alpha \in [3, 5]$), and a unit is mm.

It can be understood that in order to ensure that the door body 30 of the refrigerator 1 is capable of being opened normally, the first side edge W may not exceed the datum plane $M_0$ too much during the rotation of the door body 30, so as to avoid the first side edge W from colliding with the cabinet 100, thereby causing the door body 30 to fail to open normally.

In summary, if the door body 30 may move towards the inner side during rotation, the first side edge W will not exceed the datum plane $M_0$ too much. For example, in a case where the hinge plate 40 is disposed at the right side of the door body 30, the inner side is the left side of the datum plane $M_0$, and the door body 30 needs to move to the left during rotation. In a case where the hinge plate 40 is disposed at the left side of the door body 30, the inner side is the right side of the datum plane $M_0$, and the door body 30 needs to move to the right during rotation.

In this embodiment, as shown in FIG. 3, the first trajectory groove 50 includes a straight groove segment and a curved groove segment connected to each other, and the straight groove segment is located at a side of the curved groove segment away from the door side wall 32.

For example, the straight groove segment extends towards a direction proximate to the door side wall 32, an end of the curved groove segment is connected to the straight groove segment, and another end of the curved groove segment extends towards a direction proximate to the first side edge W. The curved groove segment protrudes towards the second side edge N. For example, along a direction from the door rear wall 33 to the door front wall 31, a distance between the curved groove segment and the door side wall 32 gradually decreases. In this way, during the opening process of the door body 30, the door body 30 first moves the inner side and then moves forward while rotating, thereby preventing the door body 30 from interfering with the cabinet 100 and preventing the door body 30 from squeezing the door seal 5, so as to reduce the wear of the door seal 5.

For example, the straight groove segment is parallel to the door front wall 31.

A central trajectory line of the first trajectory groove 50 is referred to as a first trajectory line S, and the first trajectory groove 50 is defined by a shape of the first trajectory groove 50. The first trajectory line S includes a straight trajectory segment and a curved trajectory segment connected by smooth transition. The straight trajectory segment extends along the direction proximate to the door side wall 32, and the curved trajectory segment is located at a side of the straight trajectory segment proximate to the door side wall 32 and protrudes towards the direction proximate to the second side edge N.

In this embodiment, the straight trajectory segment is parallel to the door front wall 31 and the curved trajectory segment is set as a right circular arc.

The second trajectory groove 60 is a curved groove. An end of the second trajectory groove 60 is further away from the door rear wall 33 and further away from the door side wall 32 than another end of the second trajectory groove 60. The second trajectory groove 60 protrudes towards the direction proximate to the door rear wall 33. A center trajectory line of the second trajectory groove 60 is referred to as a second trajectory line K. The second trajectory line K is defined by a shape of the second trajectory groove 60. The second trajectory line K is curved and protrudes towards the direction proximate to the door rear wall 33.

For example, along the direction from the end of the second trajectory groove 60 away from the door side wall 32 to the door side wall 32, a distance between the second trajectory line K and the door front wall 31 first increases and then decreases.

For example, the first trajectory groove 50 is located at a side of the second trajectory groove 60 proximate to the door front wall 31 and the door side wall 32, so that the door body 30 may move a certain distance to the inner side while rotating, thereby compensating for the displacement of the first side edge W towards the outer side caused by the rotation of the door body 30, which may reduce the distance of the first side edge W exceeding the datum plane $M_0$ and avoid the interference between the first side edge W and the cabinet 100 in a case where the door body 30 is opened.

Since there is a relative motion relationship between the first trajectory groove 50 and the first hinge shaft 41, and between the second trajectory groove 60 and the second hinge shaft 42, if the first trajectory groove 50 and the second trajectory groove 60 are used as stationary reference objects during the process of the door body 30 being opened, it is equivalent to the first hinge shaft 41 moving in the first trajectory groove 50 and the second hinge shaft 42 moving in the second trajectory groove 60. For ease of description, the present disclosure uses the first trajectory groove 50 and the second trajectory groove 60 as the stationary reference objects, and the first hinge shaft 41 and the second hinge shaft 42 move relative to the reference object.

In this embodiment, a central axis of the first hinge shaft 41 is referred to as a positioning central axis P, and a central axis of the second hinge shaft 42 is referred to as a guiding central axis Q. In a projection of a plane where a top wall of the box body 10 is located, a line segment PQ is referred to as an axis line segment PQ.

As shown in FIGS. 5 to 10, the movement of the first hinge shaft 41 along the first trajectory groove 50 is equivalent to the movement of the positioning center axis P along the first trajectory line S, and the movement of the second hinge shaft 42 along the second trajectory groove 60 is equivalent to the movement of the guiding central axis Q moves along the second trajectory line K, so that the door body 30 may move a certain distance towards the inner side while rotating, thereby compensating for the displacement of the first side edge W towards the outer side caused by the rotation of the door body 30 and preventing the door body 30 from interfering with the cabinet 100 when being opened.

Since the first hinge shaft 41 and the second hinge shaft 42 are fixed on the hinge plate 40, the movement of the door body 30 relative to the box body 10 is equivalent to the relative motion between the two in the plane (or, a plane parallel to the top wall of the box body 10) where the top wall of the box body 10 is located. In the plane where the top wall of the box body 10 is located, the movement of the axis line segment PQ relative to the trajectory groove disposed on the door body 30 is equivalent to the movement of the hinge plate 40 relative to the door body 30, and is further equivalent to the movement of the box body 10 relative to the door body 30. According to the relative nature of movement, the movement of the door body 30 relative to the box body 10 may be derived from the movement of the box body 10 relative to the door body 30.

For ease of explanation in the following description, the movement of the axis line segment PQ relative to the door body 30 in the plane where the top wall of the box body 10 is located is selected to represent the movement of the box body 10 (i.e., the hinge plate 30) relative to the door body 30.

Figure 5:
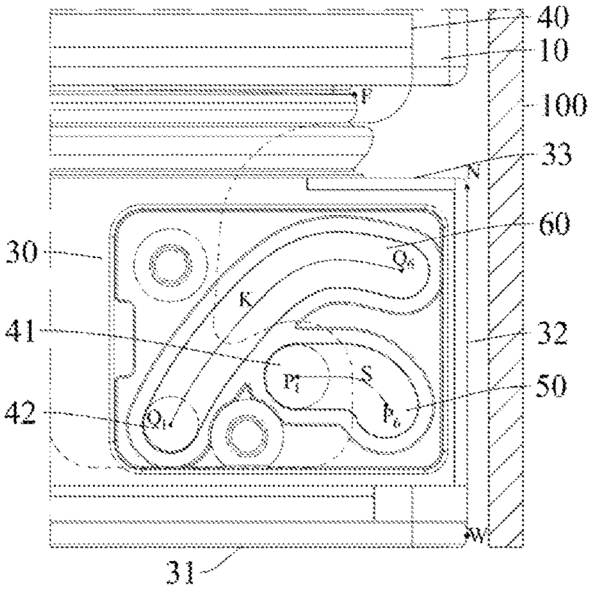
FIG. 5 is a structural diagram of a hinge assembly in a case where a door body is in a closed state in an embodiment 1 of a refrigerator, in accordance with some embodiments.

As shown in FIG. 5, the first trajectory line S includes a first positioning point $P_1$ away from the door side wall 32 and a sixth positioning point $P_6$ proximate to the door side wall 32. The first trajectory line S first extends from the first positioning point $P_1$ along a straight line towards a direction proximate to the door side wall 32, and then extends along a curve to the sixth positioning point $P_6$.

For example, the first trajectory line S first extends from the first positioning point $P_1$ along a straight line towards a direction proximate to the door side wall 32, and then extends along a curve towards a direction proximate to the door side wall 32 and the door front wall 31 to the sixth positioning point $P_6$. A distance between the first positioning point $P_1$ and the door front wall 31 is referred to as $D_1$, a distance between the sixth positioning point $P_6$ and the door front wall 31 is referred to as $D_2$, and $D_1$ is greater than $D_2$ (i.e., $D_1>D_2$).

For example, the sixth positioning point $P_6$ is located at a side of the first positioning point $P_1$ proximate to the door side wall 32 and away from the door front wall 31. That is, the first trajectory line S first extends from the first positioning point $P_1$ along a straight line towards the direction proximate to the door side wall 32, and then extends along the curve towards the direction proximate to the door side wall 32 and away from the door front wall 31 to the sixth positioning point $P_6$.

Hereinafter, the following will be illustrated by taking an example in which the first trajectory line S first extends from the first positioning point $P_1$ along a straight line towards the direction proximate to the door side wall 32, and then extends along the curve towards the direction proximate to the door side wall 32 and proximate to the door front wall 31 to the sixth positioning point $P_6$.

Referring to FIG. 5, the second trajectory line K includes a first guiding point $Q_1$ away from the door side wall 32 and a sixth guiding point $Q_6$ proximate to the door side wall 32. The sixth guiding point $Q_6$ is located at a side of the first guiding point $Q_1$ away from the door front wall 31 and proximate to the door side wall 32. The second trajectory line K extends from the first guiding point $Q_1$ along a curve towards the direction away from the door front wall 31 and proximate to the door side wall 32 to the sixth guiding point $Q_6$.

A distance between the first guiding point $Q_1$ and the door front wall 31 is referred to as $Z_1$, and a distance between the sixth guiding point $Q_6$ and the door front wall 31 is referred to as $Z_2$. For example, $Z_1<D_2<D_1<Z_2$. The above arrangement causes the second trajectory groove 60 to effectively limit the movement of the second hinge shaft 42, so as to drive the first hinge shaft 41 to move in the first trajectory groove 50. Therefore, the door body 30 may move a certain distance towards the inner side during the opening process of the door body 30, and the stability of the door body 30 while rotating to open may be ensured.

As shown in FIG. 5, in this embodiment, in a case where the door body 30 is in the closed state, the central axis (i.e., the positioning central axis P) of the first hinge shaft 41 is located at the first positioning point $P_1$ of the first trajectory line S, and the center axis (i.e., the guiding center axis Q) of the second hinge shaft 42 is located at the first guiding point $Q_1$ of the second trajectory line K. That is, in a case where the door body 30 is in the closed state, the first hinge shaft 41 is located at the side of the second hinge shaft 42 proximate to the door side wall 32 and proximate to the door rear wall 33.

Referring to FIG. 5, the door body 30 is in the closed state, and a distance between the first hinge shaft 41 and the second hinge shaft 42 in a first direction parallel to the door side wall 32 is referred to as $L_1$. $L_1$ is equal to a difference between $D_1$ and $Z_1$ (i.e., $L_1=D_1-Z_1$), and $L_1$ is in a range from 2.5 mm to 10 mm (i.e., 2.5 mm$\leq L_1 \leq$10 mm). A distance between the first hinge shaft 41 and the second hinge shaft 42 in a second direction perpendicular to the door side wall 32 is referred to as $L_2$, and $L_2$ is in a range from 7.5 mm to 30 mm (i.e., 7.5 mm$\leq L_2 \leq$30 mm). For example, in a case where $L_1$=5 mm and $L_2$=15 mm, a thickness of the door body 30 is in a range from 44 mm to 53 mm, so that the distance of the first side edge W exceeding the datum plane $M_0$ is small during the opening process of the door body 30. For example, the distance is less than 3 mm.

For example, $L_1$ is 2.5 mm, 5 mm, 7.5 mm, or 10 mm, $L_2$ is 7.5 mm, 15 mm, 25 mm, or 30 mm.

In this embodiment, it will be illustrated by taking an example in which the maximum angle $G_{max}$ (i.e., the fifth angle) that the refrigerator is capable of opening is greater than 90°. During a process that the door body 30 is opened from the closed state to the maximum angle $G_{max}$, in a case where the door body 30 is rotated and opened to different angles, the positions of the first hinge shaft 41 relative to the first trajectory groove 50 and the positions of the second hinge shaft 42 relative to the second trajectory groove 60 are as follows.

In the following description, φ represents an opening angle of the door body 30. In a case where the door body 30 is closed, the opening angle φ is 0° (i.e., φ=0°). In a case where the door body 30 is opened relative to the box body 10 to open the access opening, the opening angle φ is a positive number.

As shown in FIG. 5, in a case where φ=0°, the door body 30 is in a closed state. The positioning center axis P is located at the first positioning point $P_1$ of the first trajectory line S, and the guiding center axis Q is located at the first guiding point $Q_1$ of the second trajectory line K.

Figure 6:
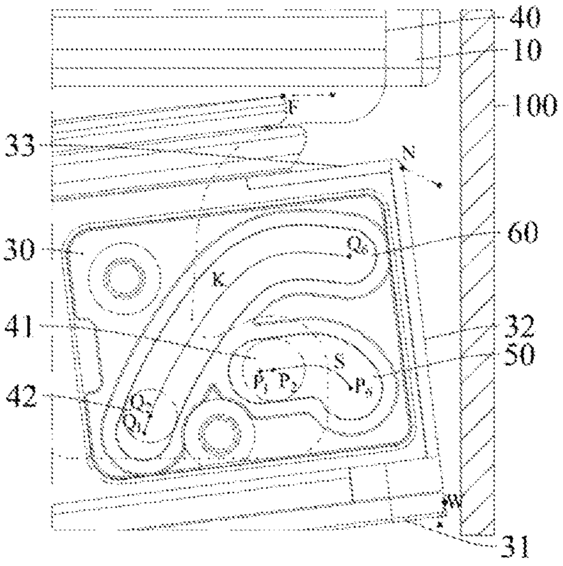
FIG. 6 is a structural diagram of a hinge assembly in a case where a door body is opened to $\varphi=G_1$ in an embodiment 1 of a refrigerator, in accordance with some embodiments.

As shown in FIG. 6, in a case where α is greater than 0° and is less than $G_2$ (i.e., φ∈(0°, $G_2$)), the door body 30 is opened from the closed state to any angle less than $G_2$. During this process, the first hinge shaft 41 moves along the straight trajectory segment of the first trajectory line S towards the direction proximate to the door side wall 32, and the second hinge shaft 42 moves along the curved second trajectory line K towards the direction proximate to the door side wall 32 and away from the door front wall 31.

As above, in a case where the opening angle φ of the door body 30 is greater than 0° and is less than $G_2$, a movement trend of the door body 30 remains unchanged, and the difference is that in a case where the door body 30 is opened to different angles, the positions of the first hinge shaft 41 relative to the straight trajectory segment of the first trajectory line S are different, and the positions of the second hinge shaft 42 relative to the second trajectory line K are different.

Figure 13:
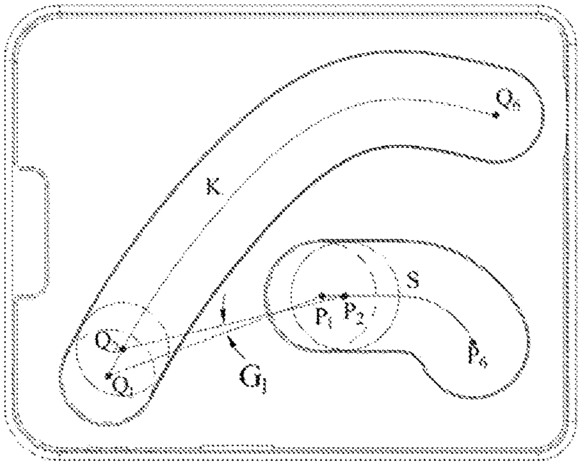
FIG. 13 is a schematic diagram showing a position of a first hinge shaft relative to a first trajectory groove and a position of a second hinge shaft relative to a second trajectory groove in a case where a door body is opened to $\varphi=G_1$ in an embodiment 1 of a refrigerator, in accordance with some embodiments.

In this way, in a case where the opening angle φ of the door body 30 is greater than 0° and is less than $G_2$, any angle in the range from 0° to $G_2$ may be selected to represent the relative position of the first hinge shaft 41 and the first trajectory groove 50, and the relative position of the second hinge shaft 42 and the second trajectory groove 60 when the door body 30 is opened to the interval (0°, $G_2$). As shown in FIGS. 6 and 13, φ=$G_1$ ($G_1$∈(0°, $G_2$)) represents the positions within the opening angle range for comparison with when the door body 30 is opened to other angles.

As shown in FIGS. 6 and 13, in a case where the door body 30 is opened to $G_1$, the positioning central axis P is located at a second positioning point $P_2$ of the first trajectory line S, and the second positioning point $P_2$ is located at a side of the first positioning point $P_1$ proximate to the door side wall 32. The guiding central axis Q is located at a second guiding point $Q_2$ of the second trajectory line K, and the second guiding point $Q_2$ is located at a side of the first guiding point $Q_1$ proximate to the door side wall 32 and away from the door front wall 31.

Figure 7:
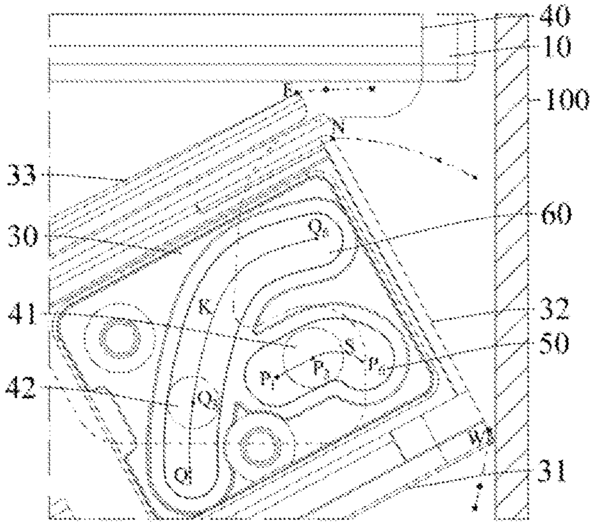
FIG. 7 is a structural diagram of a hinge assembly in a case where a door body is opened to $\varphi=G_2$ in an embodiment 1 of a refrigerator, in accordance with some embodiments.
Figure 14:
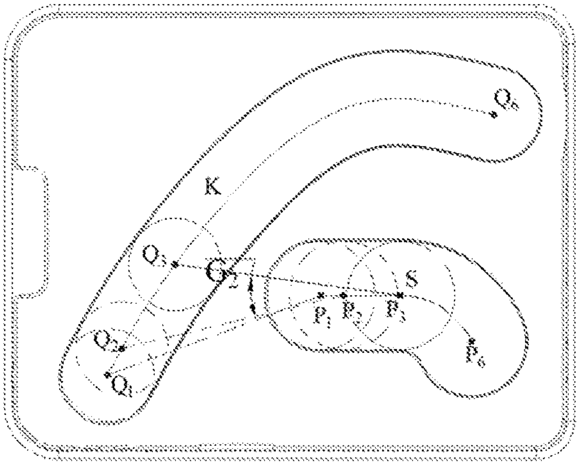
FIG. 14 is a schematic diagram showing a position of a first hinge shaft relative to a first trajectory groove and a position of a second hinge shaft relative to a second trajectory groove in a case where a door body is opened to $\varphi=G_2$ in an embodiment 1 of a refrigerator, in accordance with some embodiments.

As shown in FIGS. 7 and 14, in a case where φ is equal $G_2$ (i.e., φ=$G_2$), the door body 30 is rotated to open to $G_2$. The positioning central axis P is located at a third positioning point $P_3$ of the straight trajectory segment of the first trajectory line S, and the third positioning point $P_3$ is located at a side of the second positioning point $P_2$ proximate to the door side wall 32. The third positioning point $P_3$ is an end point of the straight trajectory segment proximate to the door side wall 32. That is, the third positioning point $P_3$ is a terminal point of the first hinge shaft 41 moving in the straight line towards the direction proximate to the door side wall 32 relative to the first trajectory groove 50.

The guiding central axis Q is located at a third guiding point $Q_3$ of the second trajectory line K, and the third guiding point $Q_3$ is located at a side of the second guiding point $Q_2$ proximate to the door side wall 32 and away from the door front wall 31. For example, $G_2$ is any value in a range from 26° to 30° (i.e., $G_2$∈[26°, 30°]). In summary, during the process that the door body 30 is opened from the closed state to $G_2$, the first hinge shaft 41 moves along the straight line towards the direction proximate to the door side wall 32, and the second hinge shaft 42 moves along the curve towards the direction proximate to the door side wall 32 and away from the door front wall 31.

Figure 8:
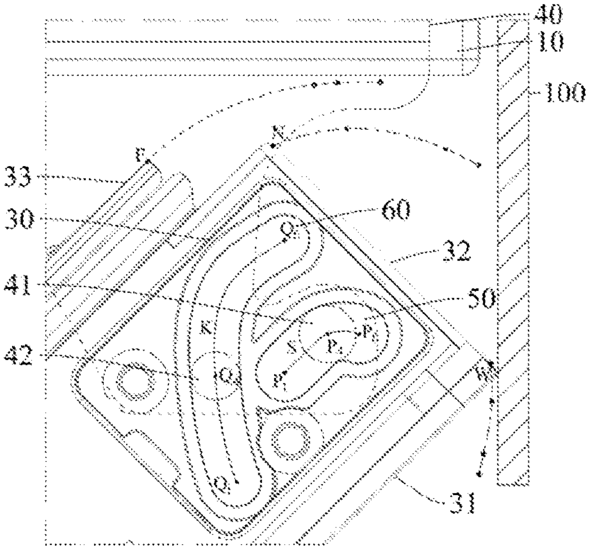
FIG. 8 is a structural diagram of a hinge assembly in a case where a door body is opened to $\varphi=G_3$ in an embodiment 1 of a refrigerator, in accordance with some embodiments.

As shown in FIG. 8, in a case where φ is greater than $G_2$ and is less than $G_4$ (i.e., φ∈($G_2$, $G_4$)), in a case where φ∈($G_2$, $G_4$), the door body 30 is opened from $G_2$ to any angle less than $G_4$. During this process, the first hinge shaft 41 moves along the curved trajectory segment of the first trajectory line S towards the direction proximate to the door side wall 32 and proximate to the door front wall 31, and the second hinge shaft 42 moves along the second trajectory line K towards the direction proximate to the door side wall 32 and away from the door front wall 31.

As above, in a case where the opening angle φ of the door body 30 is greater than $G_2$ and is less than $G_4$, a movement trend of the door body 30 remains unchanged, and the difference is that in a case where the door body 30 is opened to different angles, the positions of the first hinge shaft 41 relative to the curved trajectory segment of the first trajectory line S are different, and the positions of the second hinge shaft 42 relative to the second trajectory line K are different. Similarly, in a case where the opening angle φ of the door body 30 is greater than $G_2$ and is less than $G_4$, any opening angle in the range from $G_2$ to $G_4$ may be selected to represent the relative position of the first hinge shaft 41 and the first trajectory groove 50, and the relative position of the second hinge shaft 42 and the second trajectory groove 60 when the door body 30 is opened to this interval. For example, as shown in FIG. 15, (φ=$G_3$ ($G_3$∈($G_2$, $G_4$)) represents the position when the door body 30 is opened to this angle range, for comparison with when the door body 30 is opened to other angles.

Figure 15:
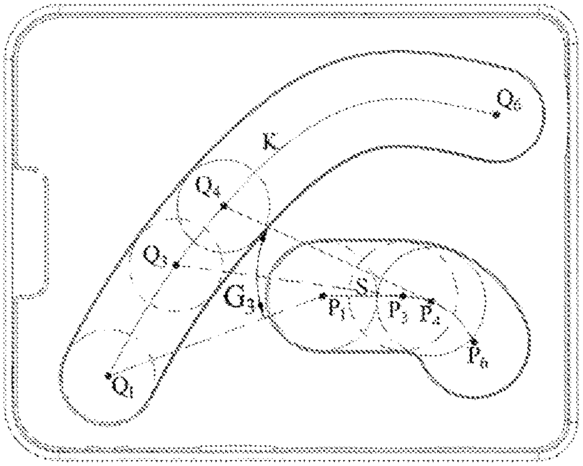
FIG. 15 is a schematic diagram showing a position of a first hinge shaft relative to a first trajectory groove and a position of a second hinge shaft relative to a second trajectory groove in a case where a door body is opened to $\varphi=G_3$ in an embodiment 1 of a refrigerator, in accordance with some embodiments.

Referring to FIGS. 8 and 15, in a case where the door body 30 is opened to $G_3$, the positioning central axis P is located at a fourth positioning point $P_4$ of the first trajectory line S, and the fourth positioning point $P_4$ is located at a side of the third positioning point $P_3$ proximate to the door side wall 32 and proximate to the door front wall 31. The guiding center axis Q is located at the fourth guiding point $Q_4$ of the second trajectory line K, and the fourth guiding point $Q_4$ is located at a side of the third guiding point $Q_3$ proximate to the door side wall 32 and away from the door front wall 31. For example, $G_3$ is any value in a range from 43° to 47° (i.e., $G_3$∈[43°, 47°]). In this embodiment, $G_3$ is set to be 45° (i.e., $G_3$=45°).

Figure 9:
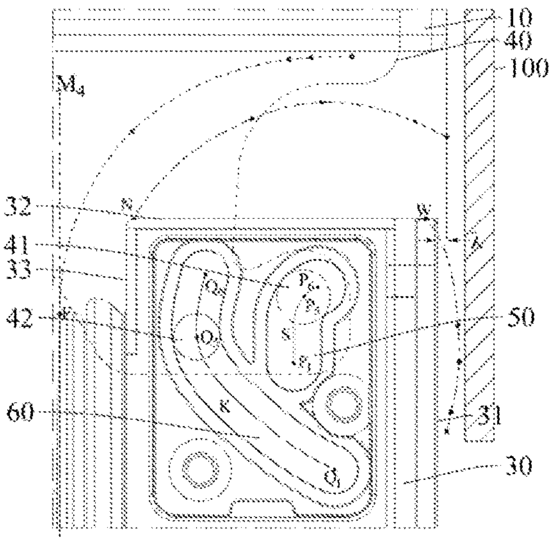
FIG. 9 is a structural diagram of a hinge assembly in a case where a door body is opened to $\varphi=G_4$ in an embodiment 1 of a refrigerator, in accordance with some embodiments.
Figure 16:
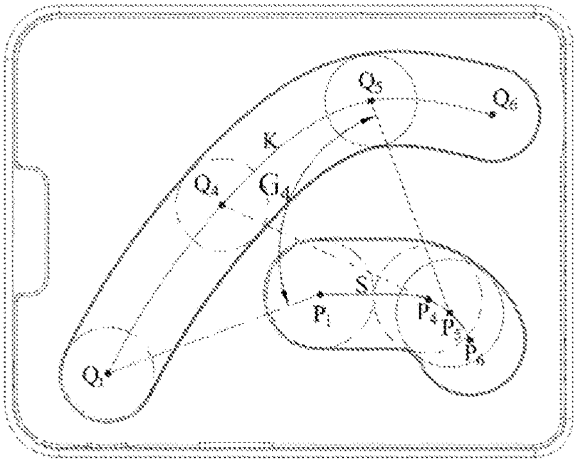
FIG. 16 is a schematic diagram showing a position of a first hinge shaft relative to a first trajectory groove and a position of a second hinge shaft relative to a second trajectory groove in a case where a door body is opened to $\varphi=G_4$ in an embodiment 1 of a refrigerator, in accordance with some embodiments.

As shown in FIGS. 9 and 16, in a case where φ is equal to $G_4$ (i.e., (φ=$G_4$), the door body 30 is rotated and opened to $G_4$. The positioning central axis P is located at a fifth positioning point $P_5$ of the curved trajectory segment of the first trajectory line S, and the fifth positioning point $P_5$ is located at a side of the fourth positioning point $P_4$ proximate to the door side wall 32 and proximate to the door front wall 31. The guiding central axis Q is located at a fifth guiding point $Q_5$ of the second trajectory line K, and the fifth guiding point $Q_5$ is located on a side of the fourth guiding point $Q_4$ proximate to the door side wall 32 and away from the door front wall 31. For example, $G_4$ is any value in a range from 880 to 920 (i.e., $G_4$∈[880, 92°]).

In this embodiment, $G_4$ is equal to 90° (i.e., φ=$G_4$=90°). In a case where the door body is opened to 90°, the position of the first hinge shaft 41 relative to the first trajectory groove 50 is located at a side of the position of the first hinge shaft 41 relative to the first trajectory groove 50 in a case where the door body 30 is closed proximate to the door side wall 32. That is, the fifth positioning point $P_5$ is located at the side of the first positioning point $P_1$ proximate to the door side wall 32.

Figure 10:
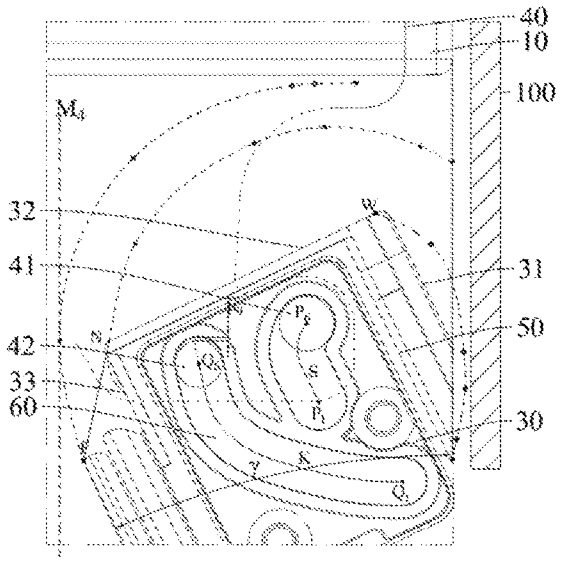
FIG. 10 is a structural diagram of a hinge assembly in a case where a door body is opened to $\varphi=G_{max}$ in an embodiment 1 of a refrigerator, in accordance with some embodiments.

As shown in FIG. 10, in a case where φ is greater than $G_4$ and is less than $G_{max}$ (i.e., φ∈(G4, $G_{max}$]), the door body 30 is rotated and opened from $G_4$ to $G_{max}$. During this process, the first hinge shaft 41 moves along the curved trajectory segment of the first trajectory line S towards the direction proximate to the door side wall 32 and proximate to the door front wall 31, and the second hinge shaft 42 moves along the second trajectory line K towards a direction proximate to the door side wall 32 and proximate to the door front wall 31. In this embodiment, $G_{max}$ is equal to 116° (i.e., $G_{max}$=116°).

As above, in a case where the opening angle φ of the door body 30 is greater than $G_4$ and is less than $G_{max}$, a movement trend of the door body 30 remains unchanged. In a case where the door body 30 is opened to different angles in the range from $G_4$ to $G_{max}$, the positions of the first hinge shaft 41 relative to the curved trajectory segment of the first trajectory line S are different, and the positions of the second hinge shaft 42 relative to the second trajectory line K are different.

Figure 17:
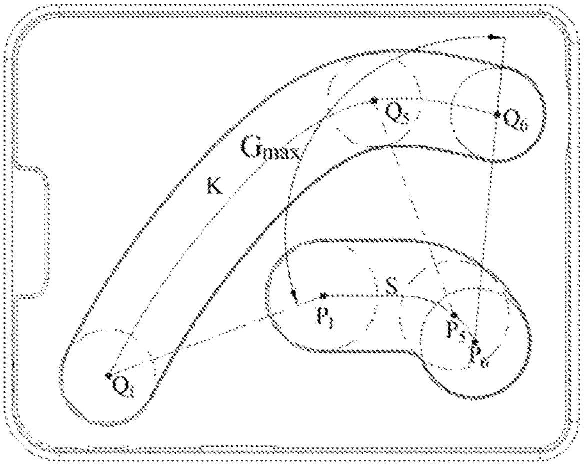
FIG. 17 is a schematic diagram showing a position of a first hinge shaft relative to a first trajectory groove and a position of a second hinge shaft relative to a second trajectory groove in a case where a door body is opened to $\varphi=G_{max}$ in an embodiment 1 of a refrigerator, in accordance with some embodiments.

Similarly, in a case where the opening angle φ of the door body 30 is greater than $G_4$ and is less than $G_{max}$, any opening angle in this range may be selected to represent the relative position of the first hinge shaft 41 and the first trajectory groove 50, and the relative position of the second hinge shaft 42 and the second trajectory groove 60 when the door body 30 is opened to this interval. For example, as shown in FIG. 17, φ=$G_{max}$ ($G_{max}$∈($G_4$, $G_{max}$]) represents the position when the door body 30 is opened to this angle range, for comparison with when the door body 30 is opened to other angles.

In a case where the door body 30 is opened to $G_{max}$ ($G_{max}$>90°), the positioning central axis P is located at a sixth positioning point $P_6$ of the first trajectory line S, and the sixth positioning point $P_6$ is located at a side of the fifth positioning point $P_5$ proximate to the door side wall 32 and proximate to the door front wall 31. The guiding central axis Q is located at a sixth guiding point $Q_6$ of the second trajectory line K, and the sixth guiding point $Q_6$ is located at a side of the fifth guiding point $Q_5$ proximate to the door side wall 32 and proximate to the door front wall 31.

In this embodiment, $0°<G_1<G_2<G_3<G_4<G_{max}$. The first positioning point $P_1$, the second positioning point $P_2$, the third positioning point $P_3$, the fourth positioning point $P_4$, the fifth positioning point $P_5$, and the sixth positioning point $P_6$ are distributed along the first trajectory line S in sequence. The second positioning point $P_2$, the third positioning point $P_3$, and the fourth positioning point $P_4$ are distributed along the straight trajectory segment towards the direction proximate to the door side wall 32, and the fourth positioning point $P_4$, the fifth positioning point $P_5$, and the sixth positioning point $P_6$ are distributed along the curved trajectory segments towards the direction proximate to the door side wall 32 and proximate to the door front wall 31.

The first guiding point $Q_1$, the second guiding point $Q_2$, the third guiding point $Q_3$, the fourth guiding point $Q_4$, the fifth guiding point $Q_5$, and the sixth guiding point $Q_6$ are distributed along the first trajectory line S in sequence. The second guiding point $Q_2$, the third guiding point $Q_3$, the fourth guiding point $Q_4$, and the fifth guiding point $Q_5$ are distributed along the second trajectory line K towards the direction proximate to the door side wall 32 and away from the door front wall 31. The fifth guiding point $Q_5$ and the sixth guiding point $Q_6$ are distributed along the second trajectory line K towards the direction proximate to the door side wall 32 and proximate to the door front wall 31. It will be noted that in this embodiment, $G_1$, $G_2$, $G_3$, $G_4$, and $G_{max}$ are sequentially referred to as a first angle, a second angle, a third angle, a fourth angle, and a maximum angle.

In summary, during the process of the door body 30 being opened from the closed state to the maximum angle $G_{max}$, the first hinge shaft 41 always moves relative to the first trajectory groove 50 and always moves towards the direction proximate to the door side wall 32, and the second hinge shaft 42 always moves relative to the second trajectory groove 60 and always moves towards the direction proximate to the door side wall 32. That is, during the entire opening process of the door body 30, the first hinge shaft 41 and the second hinge shaft 42 both maintain unidirectional movement without reversing, so that the force directions of the first hinge shaft 41 and the second hinge shaft 42 are always consistent, which is conducive to improving the feeling of opening and closing the door body 30 and the user experience, and extending the service life of the first trajectory groove 50 and the second trajectory groove 60. In addition, during the opening process of the door body 30, the first hinge shaft 41 and the second hinge shaft 42 keep moving, so that the change of the acceleration of the door body 30 is small, which is conducive to improving the smoothness of the opening of the door body 30.

It will be noted that some embodiments of the present disclosure are not limited to the above arrangement. In some embodiments, during the process of the door body 30 being opened from $G_4$ to $G_{max}$, the second hinge shaft 42 moves towards the direction proximate to the door side wall 32 relative to the second trajectory groove 60, and the first hinge shaft 41 retreats relative to the first trajectory groove 50. That is, the first hinge shaft 41 moves towards the direction away from the door side wall 32 relative to the first trajectory groove 50.

For example, the sixth guiding point $Q_6$ is located at a side of the fifth guiding point $Q_5$ proximate to the door side wall 32. During the opening process of the door body 30, after the guiding central axis Q moves to the fifth guiding point $Q_5$, as the door body 30 continues to open, the guiding center axis Q continues to move towards the direction proximate to the door side wall 32 to the sixth guiding point $Q_6$, and the positioning center axis P moves along the first trajectory line S towards the direction away from the door side wall 32 to the sixth positioning point $P_6$.

It can be understood that in a case where the door body 30 is opened to a specific angle (including the first angle $G_1$, the second angle $G_2$, the third angle $G_3$, the fourth angle $G_4$ and the maximum angle $G_{max}$), the positions of the two hinge shafts relative to the two trajectory grooves may be determined. Therefore, the cooperation relationships between the first hinge shaft 41 relative to the first trajectory groove 50 and the second hinge shaft 42 relative to the second trajectory groove 60 include the following conditions.

In a case where the opening angle φ of the door body 30 is less than $G_2$ (i.e., φ<$G_2$), the first hinge shaft 41 moves along the straight trajectory segment of the first trajectory groove 50. In a case where the opening angle φ of the door body 30 is equal to $G_2$ (i.e., φ=$G_2$), the first hinge shaft 41 moves to the end point (i.e., the third positioning point $P_3$) of the straight trajectory segment of the first trajectory groove 50 proximate to the door side wall 32. In a case where the opening angle φ of the door body 30 is greater than $G_2$ (i.e., φ>$G_2$), the first hinge shaft 41 moves along the curved trajectory segment of the first trajectory groove 50.

In a case where the opening angle φ of the door body 30 is less than $G_4$ (i.e., e.g., $G_{4=90}$°), the second hinge shaft 42 moves along the second trajectory groove 60 towards the direction proximate to the door side wall 32 and away from the door front wall 31. In a case where the opening angle φ of the door body 30 is greater than $G_4$ (i.e., $\varphi>G_4$), the second hinge shaft 42 moves along the second trajectory groove 60 towards the direction proximate to the door side wall 32 and proximate to the door front wall 31.

In summary, according to the movement trajectories of the first hinge shaft 41 and the second hinge shaft 42, $\varphi=G_2$ and $\varphi=G_4$ may divide the opening process of the door body 30 from the closed state to $G_{max}$ into three phases. Hereinafter, the relative movement in the three phases will be described from the perspective of the cooperation relationship between the first hinge shaft 41 and the first trajectory groove 50 and between the second hinge shaft 42 and the second trajectory groove 60.

In the first phase, as shown in FIG. 14, the door body 30 is rotated and opened from the closed state to $G_2$.

For example, the door body 30 is opened from 0° to $G_2$ through $G_1$. During this process, the positioning center axis P moves from the first positioning point $P_1$ along the straight trajectory segment of the first trajectory line S towards the direction proximate to the door side wall 32, and the guiding center axis Q moves from the first guiding point $Q_1$ along the second trajectory line K towards the direction proximate to the door side wall 32 and away from the door front wall 31.

For example, the positioning center axis P moves from the first positioning point $P_1$ along the straight trajectory segment of the first trajectory line S to the third positioning point $P_3$ through the second positioning point $P_2$, and the guiding center axis Q moves from the first guiding point $Q_1$ along the second trajectory line K to the third guiding point $Q_3$ through the second guiding point $Q_2$.

Referring to FIG. 14, in the first phase, with the first trajectory groove 50 and the second trajectory groove 60 as reference objects, during the process of the door body 30 being opened from 0° to $G_2$, the axis line segment PQ is rotated clockwise from $P_1Q_1$ and moves towards the outer side to $P_2Q_2$ and $P_3Q_3$ (i.e., $P_1Q_1 \rightarrow P_2Q_2 \rightarrow P_3Q_3$) in sequence.

The first trajectory groove 50 and the second trajectory groove 60 are disposed on the door body 30, and the axis line segment PQ represents the movement of the hinge plate 40 disposed on the box body 10. Therefore, if the door body 30 is used as the stationary reference object, during the process of the door body 30 being opened from the closed state to $G_2$, the box body 10 (or the hinge plate 40) keeps rotating clockwise relative to the door body 30 and moves a certain distance towards the outer side. According to the relativity of motion, in a case where the box body 10 is used as the stationary reference object (or the hinge plate 40 is used as the stationary reference object), during the process of the door body 30 being opened from the closed state to $G_2$, the door body 30 (or the first trajectory groove 50 and the second trajectory groove 60) is rotated counterclockwise relative to the box body 10 and moves a certain distance towards the inner side.

That is, the door body 30 moves a certain distance to the inner side when being opened, so that the displacement of the first side edge W to the outer side caused by the rotation of the door body 30 may be compensated, and the interference between the door body 30 and the cabinet 100 may be avoided.

In the second phase, as shown in FIGS. 15 and 16, the door body 30 is rotated and opened from $G_2$ to $G_4$.

The door body 30 is opened from $G_2$ to $G_4$ through $G_3$. During this process, the positioning center axis P moves from the third positioning point $P_3$ along the curved trajectory segment of the first trajectory line S towards the direction proximate to the door side wall 32 and proximate to the door front wall 31, and the guiding center axis Q moves from the third guiding point $Q_3$ along the second trajectory line K towards the direction proximate to the door side wall 32 and away from the door front wall 31.

For example, the positioning center axis P moves from the third positioning point $P_3$ along the curved trajectory segment of the first trajectory line S to the fifth positioning point $P_5$ through the fourth positioning point $P_4$, and the guiding center axis Q moves from the third guiding point $Q_3$ along the second trajectory line K to the fifth guiding point $Q_5$ through the fourth guiding point $Q_4$.

In the third phase, as shown in FIG. 17, the door body 30 is rotated and opened from $G_4$ to $G_{max}$.

During this process, the positioning central axis P moves from the fifth positioning point $P_5$ along the curved trajectory segment of the first trajectory line S towards the direction proximate to the door side wall 32 and proximate to the door front wall 31, and the guiding central axis Q moves from the fifth positioning point $P_5$ along the second trajectory line K towards the direction proximate to the door side wall 32 and proximate to the door front wall 31.

For example, the positioning center axis P moves from the fifth positioning point $P_5$ along the curved trajectory segment of the first trajectory line S to the sixth positioning point $P_6$, and the guiding center axis Q moves from the fifth guiding point $Q_5$ along the second trajectory line K to the sixth guiding point $Q_6$.

With reference to the motion trajectories of the first hinge shaft 41 and the second hinge shaft 42 in the second phase and the third phase, during the process of the door body 30 being rotated and opened from $G_2$ to $G_{max}$, the first trajectory groove 50 and the second trajectory groove 60 are used as the stationary reference objects, and the axis line segment PQ is rotated clockwise from $P_3Q_3$ and moves towards the outer side through $P_4Q_4$ and $P_5Q_5$ to $P_6Q_6$ (i.e., $P_3Q_3 \rightarrow P_4Q_4 \rightarrow P_5Q_5 \rightarrow P_6Q_6$).

It can be understood that the first trajectory groove 50 and the second trajectory groove 60 are disposed on the door body 30, and therefore, the axis line segment PQ represents the movement of the hinge plate 40 disposed on the box body 10. Therefore, if the door body 30 is used as the stationary reference object, during the process of the door body 30 being opened from $G_2$ to $G_{max}$, the box body 10 (or the hinge plate 40) keeps rotating clockwise relative to the door body 30 and moves to the outer side.

According to the relativity of motion, in a case where the box body 10 is used as the stationary reference object (or the hinge plate 40 is used as the stationary reference object), during the process of the door body 30 being opened from $G_2$ to $G_{max}$, the door body 30 (or the first trajectory groove 50 and the second trajectory groove 60) is rotated counterclockwise relative to the box body 10 and moves towards the inner side. That is, the door body 30 moves a certain distance towards the inner side while being opened.

During the above opening process in the second phase and the third phase, the door body 30 is rotated and opened from $G_2$ to $G_{max}$, and the first hinge shaft 41 moves along the curved trajectory segment of the first trajectory groove 50.

In summary, during the process of the door body 30 being opened from the closed state to $G_{max}$, the door body 30 is rotated around a dynamically changing point, so as to cause the door body 30 to move towards the inner side. In addition, in a case where the box body 10 is used as the stationary reference object, the door body 30 always has a tendency to move towards the inner side, so as to compensate for the displacement of the first side edge W towards the outer side caused by the rotation of the door body 30, thereby preventing the door body 30 from interfering with the cabinet 100 when the door body 30 is opened.

In this embodiment, during the process of the door body 30 being opened from the closed state to $G_{max}$, the door body 30 always moves towards the inner side relative to the position of the central axis P of the first hinge shaft 41 when the door body 30 is closed. That is, in a case where the first hinge shaft 41 is used as the stationary reference object, during the process of the door body 30 being opened from the closed state to $G_{max}$, the door body 30 always moves towards the inner side relative to the central axis P of the first hinge shaft 41.

In a case where the door body 30 (or the first trajectory groove 50 and the second trajectory groove 60) is used as the stationary reference object, the position of the first hinge shaft 41 when the door body 30 is closed is referred to as a first initial position. Then, during the process of the door body 30 being opened from the closed state to $G_{max}$, a distance between the first hinge shaft 41 and the first initial position gradually increases. That is, during the process of the door body 30 being opened from the closed state to $G_{max}$, the first hinge shaft 41 always moves relative to the door body 30 towards the direction proximate to the door side wall 32.

For example, during the process of the door body 30 being opened from $G_2$ to $G_{max}$, the first hinge shaft 41 moves along the curved trajectory segment of the first trajectory line S towards the direction proximate to the door side wall 32 and proximate to the door front wall 31. When the door body 30 is rotated and opened for a unit angle, a speed at which the first hinge shaft 41 moves towards the direction proximate to the door front wall 31 is substantially equal to a speed at which the first hinge shaft 41 moves towards the direction proximate to the door side wall 32 (that is, a difference between the two speeds is less than 1 mm).

In some embodiments, in the first phase, the first hinge shaft 41 moves in a straight line along the straight groove segment of the first trajectory groove 50, and the door body 30 moves a distance $\xi_1$ to the inner side when being rotated and opened for a unit angle. In the second phase and the third phase, the first hinge shaft 41 moves along a curve along the curved groove segment of the first trajectory groove 50, and the door body 30 moves a distance $\xi_2$ to the inner side when being rotated and opened for a unit angle. For example, $\xi_1>\xi_2$.

In this way, in the first phase of the opening process of the door body 30, the door body 30 moves a large distance towards the inner side when being opened for a unit angle, so that the door body 30 may quickly and fully move towards the inner side in the first phase. Therefore, the displacement of the first side edge W towards the outer side caused by the rotation of the door body 30 may be effectively compensated, and the interference between the door body 30 and the cabinet 100 may be prevented.

In the first phase, the first hinge shaft 41 quickly moves towards the direction proximate to the door side wall 32 to quickly separate the door seal 5 from the front end surface of the box body 10, thereby effectively reducing the squeeze on the door seal 5. In addition, the arrangement of trajectory grooves with the above trajectory characteristics is compact and has high movement efficiency.

In this embodiment, the essence of the door body 30 of the refrigerator moving towards the inner side is that the first trajectory groove 50 moves towards the inner side. Therefore, in the first phase, the efficiency of the lateral movement of the first trajectory groove 50 is high, and the door body 30 moves quickly towards the inner side, which is conducive to reducing the difficulty of designing and arranging the trajectory grooves.

In some embodiments, as shown in FIG. 3, the door seal 5 includes a side seal 5*a* proximate to the door side wall 32. In a case where the door body 30 is closed, a distance between the first initial position and the plane where the door side wall 32 is located is greater than a distance between the side seal 5*a* and the plane where the door side wall 32 is located.

In some embodiments, during the process of the door body 30 being opened from the closed state to $G_1$, an average change amount of a distance between the central axis of the first hinge shaft 41 and the edge of the side seal 5*a* away from the door side wall 32 when the door body 30 is opened for a unit angle is referred to as $\zeta_1$. During the process of the door body 30 being opened from $G_1$ to $G_2$, an average change amount of the distance between the central axis of the first hinge shaft 41 and the edge of the side seal 5*a* away from the door side wall 32 when the door body 30 is opened for a unit angle is referred to as $\zeta_2$. For example, $\zeta_1>\zeta_2$.

That is, a change rate of the distance between the central axis of the first hinge shaft 41 and the edge of the side seal 5*a* away from the door side wall 32 during the process of the door body 30 being opened from the closed state to $G_1$ is greater than a change rate of the distance between the central axis of the first hinge shaft 41 and the edge of the side seal 5*a* away from the door side wall 32 during the process of the door body 30 being opened from the $G_1$ to $G_2$. That is, during the movement process of the door body 30 being opened from the closed state to $G_1$, the lateral distance between the central axis of the first hinge shaft 41 and the edge of the side seal 5*a* away from the door side wall 32 is quickly decreased. Compared with the movement process of the door body 30 being opened from the closed state to $G_1$, the decreasing speed in the lateral distance between the central axis of the first hinge shaft 41 and the edge of the side seal 5*a* away from the door side wall 32 is decreased during the process of the door body 30 being opened from $G_1$ to $G_2$ is slowed down.

In the above arrangement, the first hinge shaft 41 moves quickly relative to the straight trajectory segment of the first trajectory groove 50, which may effectively reduce the compression of the side seal 5*a* perpendicular to the plane where the access opening is located during the opening process of the door body 30 and reduce the resistance when the door body 30 is opened. In addition, the transition of the door body 30 being opened from the closed state to $G_1$ in the first phase to being opened from $G_1$ to $G_2$ in the second phase is smooth, the door body 30 may not jump, and the smoothness is high.

In some embodiments, the curvature changes of the second trajectory line K of the second trajectory groove 60 during the first phase and the second phase are consistent. That is, the curvature changes of a curve segment $Q_1Q_2$ and a curve segment $Q_2Q_3$ on the first trajectory line K are consistent.

For example, the second trajectory groove 60 is a quasi elliptical arc groove, and the second trajectory line K is in a shape of a quasi elliptical arc. It will be noted that the quasi elliptical arc groove is a groove having a center trajectory line (e.g., the second trajectory line K) of a quasi ellipse. The arc of the quasi elliptical includes a standard elliptical arc (i.e., a portion of a standard ellipse) and a non-standard elliptical arc that are different from the standard elliptical arc but still have elliptical arc trajectory characteristics due to manufacturing, assembly errors, or slight deformation. That is, a groove whose center trajectory line is capable of being approximated as an elliptical arc is the quasi elliptical arc groove.

In some embodiments, during a phase (i.e., the first phase) that the first hinge shaft 41 moves along a straight line along the straight groove segment of the first trajectory groove 50, an average movement speed of the first hinge shaft 41 relative to the straight groove segment of the first trajectory groove 50 is referred to as a first average speed $v_1$. During a phase (i.e., the second phase and the third phase) that the first hinge shaft 41 moves along a curve along the curved groove segment of the first trajectory groove 50, an average movement speed of the first hinge shaft 41 relative to the curved groove segment of the first trajectory groove 50 is referred to as a second average speed $v_2$. For example, $v_1>v_2$.

That is, the average movement speed of the first hinge shaft 41 during the process of the door body 30 being opened from the closed state to the second angle $G_2$ is greater than that of the first hinge shaft 41 during the process of the door body 30 being opened from the second angle $G_2$ to the maximum angle $G_{max}$. The above arrangement may reduce the movement speed of the door body 30 in the second phase and the third phase, so that the door body may be opened quickly. Therefore, the hinge shafts may be prevented from impacting the trajectory grooves in a case where the door is opened with a great force, so as to extend the service life of the trajectory grooves.

In some embodiments, $G_2$ is set to be 45° (i.e., $G_2$=45°). That is, in a case where the door body 30 is opened from the closed state to 45°, the first hinge shaft 41 moves along a straight line, and the first hinge shaft 41 cooperates with the second hinge shaft 42 to cause the lateral displacement of the door body 30, that is, cause the door body 30 to move towards the inner side. In a case where the door body 30 is opened from the closed state to 45°, the door body 30 mainly moves towards the inner side. For example, the straight groove segment of the first trajectory groove 50 is parallel to the door front wall 31, so as to improve the efficiency of the door body 30 moving towards the inner side.

During the opening process of the door body 30, a distance between a point of the door body 30 proximate to the plane where the access opening is located and the plane where the access opening is located is referred to as a minimum distance $L_{min}$. In a case where the door body 30 is opened to the angle φ, the minimum distance is $L_{min}$ (φ), and in a case where the door body 30 is opened to 90°, the minimum distance $L_{min}$ (90°) is the greatest. That is, in a case where the door body 30 is opened to 90°, the minimum distance $L_{min}$ (90°) between the door body 30 and the plane where the access opening is located is the greatest. In this embodiment, in a case where the door body 30 is opened to 90°, the door side wall 32 is substantially parallel (that is, an angle between the door side wall 32 and the plane where the access opening is located is less than 3°) to the plane where the access opening is located.

In a case where the door body 30 is installed in the cabinet 100, if the door body 30 is only rotated with the central axis of the fixed first hinge shaft 41 as a rotational axis during the process of the door body 30 being opened from 90° to the maximum angle $G_{max}$, a maximum angle, limited by the cabinet 100, at which the door body 30 is capable of being opened is referred to as $G'_{max}$.

In this embodiment, in a case where the door body 30 is opened to 90°, the door side wall 32 is parallel to the plane where the access opening is located, and the door front wall 31 is substantially parallel to the datum plane $M_0$. During the process of the door body 30 being opened from 90° to the maximum angle $G_{max}$, the first hinge shaft 41 moves towards a direction proximate to the first side edge W (i.e., proximate to the door front wall 31 and proximate to the door side wall 32), so that the door body 30 has a tendency to move towards the inner side and a front side (a side away from the access opening), that is, the door body 30 moves away from the cabinet 100 and away from the box body 10.

In this embodiment, in a case where the refrigerator is installed in the cabinet 100, the maximum angle at which the door body 30 is capable of being opened is $G_{max}$ due to the limitation of the cabinet 100. In this case, the door body 30 moves towards the inner side and towards the front side during the process of the door body 30 being opened from 90° to the maximum angle $G_{max}$, so as to reduce the limiting effect of the cabinet 100 on the door body 30, thereby increasing the maximum opening angle of the door body 30. That is, $G_{max}>G'_{max}$.

In a case where the refrigerator is not embedded in the cabinet 100, the opening of the door body 30 is not limited by the cabinet 100. For example, the maximum angle at which the door body 30 is capable of being opened is a sum of $G_{max}$ and ΔG (i.e., $G_{max}$+ΔG). For example, ΔG is greater than 0° (i.e., ΔG>0°). For example, $G_{max}$ is any value from 90° to 105°, and ΔG is any value from 8° to 12°.

In some embodiments, in a case where the door body 30 is closed, the door side wall 32 of the door body 30 is located at the side of the datum plane $M_0$ proximate to the cabinet 100, that is, located at the outer side of the datum plane $M_0$.

During a foaming process of the box body 10, it is prone to cause the box body 10 to bulge, making a front surface of the box body 10 unsightly. Therefore, in order to ensure an artistic appearance, the door side wall 32 is disposed at the outer side of the datum plane $M_0$ in a case where the door body 30 is closed, so that the box body 10 may be shielded. In this embodiment, in a case where the door body 30 is closed, a distance between the plane where the door side wall 32 is located and the datum plane $M_0$ is referred to as α', and α' is set to any value between 1 mm and 2 mm.

For example, in a case where the door body 30 is opened to 90°, a plane where a surface of the door seal 5 away from the door front wall 31 is located is substantially parallel to the datum plane $M_0$. It will be noted that in the present disclosure, if an included angle between two planes is less than 3°, the relationship between the two planes may be regarded as "parallel" or "substantially parallel." That is, the "substantially parallel" includes the mathematical definition parallel and also includes the relationship between two surfaces with an included angle greater than 0° and less than 3°.

In this embodiment, referring to FIG. 3, the door seal 5 includes the side seal 5*a* proximate to the door side wall 32. An edge of the door seal 5 (or the side seal Sa) proximate to the door side wall 32 and away from the door front wall 31 is referred to as a side sealing edge F. An included angle between a plane where the surface of the door seal 5 away from the door front wall 31 is located and the first body side wall is referred to as a second included angle γ.

During the process that the door body 30 continues to be opened from 90° to the maximum angle $G_{max}$, the second included angle γ shows an increasing trend, and the side sealing edge F gradually moves away from the plane where the surface of the door seal 5 away from the door front wall 31 is located in a case where the door body 30 is opened to 90°.

That is, during the process that the door body 30 continues to be opened from 90° to the maximum angle $G_{max}$, the included angle between the plane where the surface of the door seal 5 away from the door front wall 31 is located and the first body side wall increases monotonically, and a distance between the side sealing edge F and the plane where the surface of the door seal 5 away from the door front wall 31 is located in a case where the door body 30 is opened to 90° increases monotonically.

In addition, during the process that the door body 30 continues to open from 90° to the maximum angle $G_{max}$, the second side edge N is closer to the datum plane $M_0$ than the side sealing edge F. That is, as the opening angle of the door body 30 increases during the process that the door body 30 being opened from 90° to the maximum angle $G_{max}$, the blocking of the access opening by the door seal 5 gradually is decreased, and the blocking of the access opening by the door body 30 gradually is decreased.

The above arrangement enables the door body 30 of the refrigerator 1 installed in the cabinet 100 to be opened to a greater angle (e.g., greater than 90°), so that the user may easily access the items stored on the shelves of the door body 30, and the blocking of the access opening by the door body 30 may be reduce. In this way, the size of the drawer installed in the storage compartment may be increased, and the space utilization of the storage compartment may be increased.

For example, the refrigerator 1 is installed in the cabinet 100. In a case where the door body 30 is opened to the maximum angle $G_{max}$, the door front wall 31 is in contact with the cabinet 100. In this case, in the projection on a plane where the top wall of the box body 10 is located, a straight line defined by the side sealing edge F and the second side edge N is substantially parallel to the plane where the surface of the door seal 5 away from the door front wall 31 is located in a case where the door body 30 is opened to 90°.

That is, an included angle between a straight line where the side sealing edge F of the door seal 5 proximate to the door side wall and away from the door front wall, and the second side edge N of the door body 30 is located in a case where the door body 30 is opened to the maximum angle $G_{max}$, and a plane where the surface of the door seal 5 away from the door front wall 31 is located in a case where the door body is opened to 90° is any value from 0° to 3°. The above limitation may avoid increasing the blocking of the access opening by the door body 30 due to the rotational movement of the second side edge N and may further increase the maximum angle $G_{max}$ at which the door body 30 is capable of being opened.

In this embodiment, in a case where the door body 30 is opened to 90°, the plane where the surface of the door seal 5 away from the door front wall 31 is located is referred to as a fourth reference plane $M_4$. The fourth reference plane $M_4$ remains stationary relative to the box body 10 and does not move with the movement of the door body 30. In a case where the door body 30 is opened to the maximum angle $G_{max}$, the second side edge N is located between the fourth reference plane $M_4$ and the datum plane $M_0$. That is, a distance between the second side edge N and the fourth reference plane $M_4$ is greater than 0.

That is, in a case where the door body 30 is opened to the maximum angle $G_{max}$, the second side edge N is located between the fourth reference plane $M_4$ and the datum plane $M_0$. That is, a distance between the second side edge N and the fourth reference plane $M_4$ is greater than 0. For example, in a case where the door body 30 is opened to the maximum angle $G_{max}$, the door sealing edge F is located between the second side edge N and the fourth reference plane $M_4$.

In summary, as shown in FIG. 10, in a case where the door body 30 is opened to the maximum angle $G_{max}$, in the projection of the plane where the top wall of the box body 10 is located, the second side edge N is located at a side of the side sealing edge F away from the fourth reference plane $M_4$, an included angle between a straight line $F_N$ determined by a projection point F and a projection point N and the fourth reference plane $M_4$ is less than 15°. Or, the straight line $F_N$ is substantially parallel to the fourth reference plane $M_4$ (the included angle is less than 3°).

For example, as shown in FIGS. 5 to 11, the door body 30 has the second side edge N and the first side edge W. In a case where the door body 30 is in a closed state relative to the box body 10, the second side edge N is closer to the box body 10 than the first side edge W.

Figure 11:
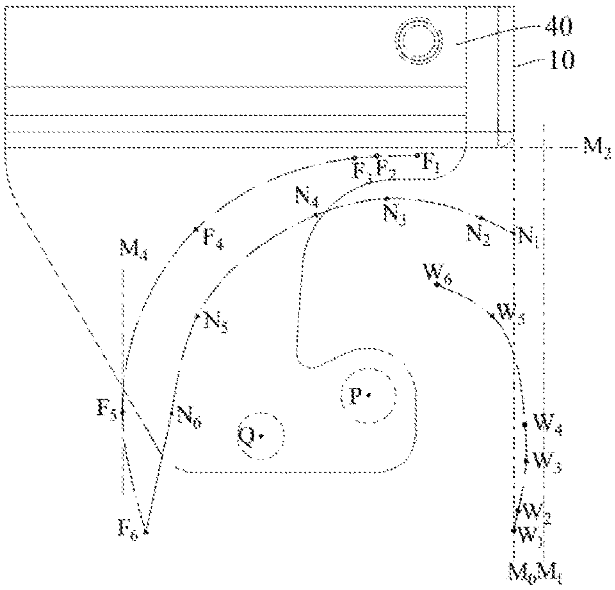
FIG. 11 is a schematic diagram of motion trajectories of a first side edge W and a second side edge N relative to a hinge assembly in an embodiment 1 of a refrigerator, in accordance with some embodiments.
Figure 12:
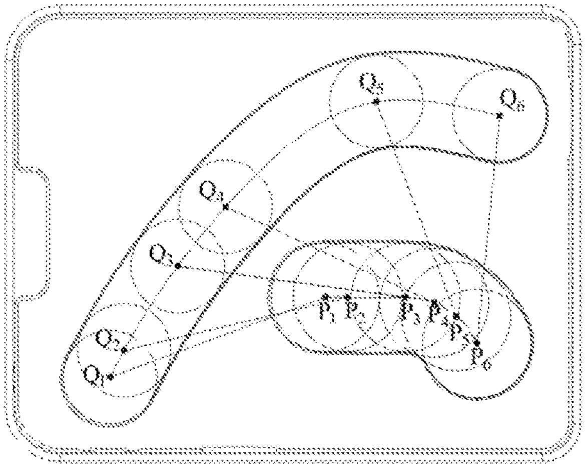
FIG. 12 is a schematic diagram showing a movement condition of a first hinge shaft relative to a first trajectory groove and a movement condition of a second hinge shaft relative to a second trajectory groove in an embodiment 1 of a refrigerator, in accordance with some embodiments.

In this embodiment, a first reference plane $M_1$ and a second reference plane $M_2$ are further defined. As shown in FIG. 11, the first reference plane $M_1$ is a plane parallel to the datum plane $M_0$ and perpendicular to the plane where the access opening is located. The first reference plane $M_1$ is located at the outer side of the datum plane $M_0$, and a distance between the two planes is a. That is, the first reference plane $M_1$ is a plane where the inner wall of the cabinet 100 proximate to the box body 10 is located. The second reference plane $M_2$ is a plane where the access opening of the storage compartment is located.

The first reference plane $M_1$ and the second reference plane $M_2$ are reference planes that remain stationary relative to the box body 10. That is, the first reference plane $M_1$ and the second reference plane $M_2$ do not move with the movement of the door body 30 during the opening process of the door body 30 relative to the box body 10. It will be noted that the second reference plane $M_2$ is the plane where the access opening defined by the box body 10 is located, and it will not change due to other components such as a deformable door seal being provided at the access opening of the box body.

During the process of the door body 30 being opened from the closed state to the maximum angle $G_{max}$, the first side edge W first moves towards a direction proximate to the first reference plane $M_1$ and proximate to the second reference plane $M_2$, and then moves towards a direction away from the first reference plane $M_1$ and proximate to the second reference plane $M_2$. The second side edge N first moves towards a direction away from the first reference plane $M_1$ and proximate to the second reference plane $M_2$, and then moves towards a direction away from the first reference plane $M_1$ and away from the second reference plane $M_2$.

As above, during the process of the door body 30 being opened from the closed state to the maximum angle $G_{max}$, a curve trajectory formed by the movement of the first side edge W is a smooth curve, and a curve trajectory formed by the movement of the second side edge N is a smooth curve.

During the process of the door body 30 being opened from the closed state to the second angle $G_2$, a first direction included angle between the movement direction of the first side edge W and the first reference plane $M_1$ shows a decreasing trend, and a second direction included angle between the movement direction of the second side edge N and the second reference plane $M_2$ shows a decreasing trend.

During the process of the door body 30 being opened from the second angle $G_2$ to the maximum angle $G_{max}$ (e.g., $G_{max} \geq 90°$), a third direction included angle between the movement direction of the first side edge W and the first reference plane $M_1$ shows an increasing trend, and a fourth direction included angle between the movement direction of the second side edge N and the second reference plane $M_2$ also shows a decreasing trend.

During the process of the door body 30 being opened from the closed state to 90°, the side sealing edge F moves (always maintained) towards the direction away from the first reference plane $M_1$ and the second reference plane $M_2$. During the process of the door body 30 being opened from 90° to the maximum angle $G_{max}$, the side sealing edge F moves towards the direction proximate to the first reference plane $M_1$ and away from the second reference plane $M_2$. That is, in a case where the door body 30 is opened to 90°, the distance between the side sealing edge F and the first reference plane $M_1$ reaches a maximum value.

For example, during the process of the door body 30 being opened from the closed state to the maximum angle $G_{max}$, the movement trajectory of the side sealing edge F is substantially a circular arc. That is, during the opening process of the door body 30, the side sealing edge F moves substantially in a circular arc. It will be noted that the "approximate circular arc" includes a mathematically defined standard arc, as well as an arc with minor deviations from a standard circular arc. For example, the minor deviation is limited to be less than 1 mm.

Figure 18:
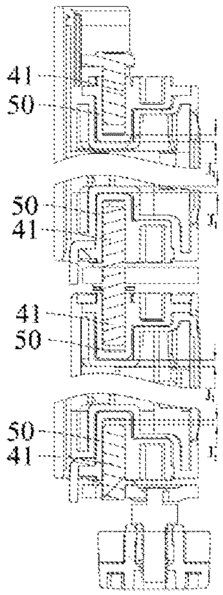
FIG. 18 is a schematic diagram showing a cooperation relationship between a first hinge shaft and a first trajectory groove in an embodiment 1 of a refrigerator, in accordance with some embodiments.
Figure 19:
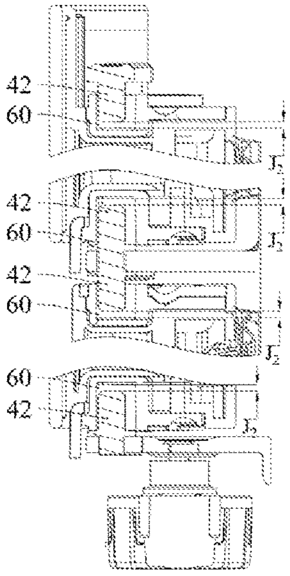
FIG. 19 is a schematic diagram showing a cooperation relationship between a second hinge shaft and a second trajectory groove in an embodiment 1 of a refrigerator, in accordance with some embodiments.

In some embodiments, as shown in FIGS. 18 and 19, there is a first gap $J_1$ between an end surface of the first hinge shaft 41 away from the hinge plate 40 and a groove bottom of the first trajectory groove 50. The first gap $J_1$ is any value from 1.5 mm to 3.5 mm. There is a second gap $J_2$ between an end surface of the second hinge shaft 42 away from the hinge plate 40 and a groove bottom of the second trajectory groove 60. The second gap $J_2$ is any value from 1.5 mm to 2.5 mm.

When the hinge shaft and trajectory groove are assembled, a tolerance of ±1 mm is reserved. The above arrangement are conducive to manufacturing and process adjustment. During product assembly, the upper end and the lower end of the door body 30 are prone to misalignment, and a gasket needs to be installed between the hinge shaft and the trajectory groove for adjustment.

For example, the first gap $J_1$ is 2 mm, and the second gap $J_2$ is greater than or equal to the first gap $J_1$. In this way, when moving upward, the door body 30 is first in contact with the first hinge shaft 41, thereby improving stability. For example, the second gap $J_2$ is equal to the first gap $J_1$, and the first gap $J_1$ is equal to 2 mm. In this way, when moving upward, the door body 30 is simultaneously in contact with the first hinge shaft 41 and the second hinge shaft 42.

In some embodiments, in a case where the door body 30 is opened, a moving direction of the first hinge shaft 41 relative to the first trajectory groove 50 is referred to as a first displacement direction, and a moving direction of the second hinge shaft 42 relative to the second trajectory groove 60 is referred to as a second displacement direction. An included angle between the first displacement direction and the second displacement direction is referred to as a displacement included angle ω. During the process of the door body 30 being opened from the closed state to 90°, the displacement angle ω remains unchanged or changes within a preset range. For example, during the process of the door body 30 being opened from the closed state to 90°, the average change amount of the displacement angle ω is in a range from 0° to 8°.

The above arrangement enables the displacement angle to fluctuate within a small range, that is, to remain relatively constant. In this way, in a case where the user opens the door with a constant force (about 5N), the reaction force (that is, a sum of the forces received by the hinge shafts during movement) of the hinge shafts (the first hinge shaft 41 and the second hinge shaft 42) does not change much, which may effectively reduce the wear of the trajectory groove.

In some embodiments, the door body 30 is rotated around a changing point during the opening process. The changing point is traceable, and its trajectory is (X, Y).

For example, X=(X1+X2+X3+X4)/4, Y=(Y1+Y2+Y3+Y4)/4.

X represents a distance between the changing point and the door side wall 32; Y represents a distance between the changing point and the door front wall 31.

X1 represents a distance between the center point of the first hinge shaft 41 in the first trajectory groove 50 and the door side wall 32 in a case where the door is closed; X2 represents a distance between the center point of the second hinge shaft 42 in the second trajectory groove 60 and the door side wall 32 in a case where the door is closed; X3 represents a distance between the center point of the first hinge shaft 41 in the first trajectory groove 50 and the door side wall 32 in a case where the door body is rotated and opened; X4 represents a distance between the center point of the second hinge shaft 42 in the second trajectory groove 60 and the door side wall 32 in a case where the door body is rotated and opened.

Y1 represents a distance between the center point of the first hinge shaft 41 in the first trajectory groove 50 and the door front wall 31 in a case where the door is closed; Y2 represents a distance between the center point of the second hinge shaft 42 in the second trajectory groove 60 and the door front wall 31 in a case where the door is closed; Y3 represents a distance between the center point of the first hinge shaft 41 in the first trajectory groove 50 and the door front wall 31 in a case where the door body is rotated and opened; Y4 represents a distance between the center point of the second hinge shaft 42 in the second trajectory groove 60 and the door front wall 31 in a case where the door body is rotated and opened.

Figure 20:
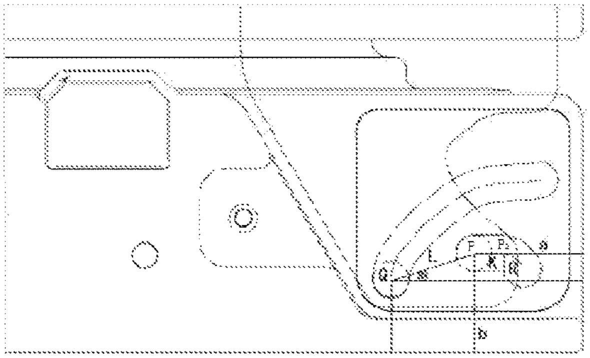
FIG. 20 is a partial view of a door body in a closed state in an embodiment 1 of a refrigerator, in accordance with some embodiments.

Referring to FIG. 20, the center point of the first hinge shaft 41 in the first trajectory groove 50 is the positioning center axis P, and the center point of the second hinge shaft 42 in the second trajectory groove 60 is the guiding center axis Q. In a case where the door is closed, the distance between point P and the door side wall 32 is a, a distance between point P and the door front wall 31 is b, a distance between point P and point Q is L, and an included angle between the line connecting PQ and the second reference plane $M_2$ is m.

The following will be illustrated by taking an example in which a length of the straight trajectory segment of the first trajectory line K is K', and the curved trajectory segment is a circular arc (a radius is R). The straight trajectory segment and the curved trajectory segment are connected at point $P_2$ and the curved trajectory segment is tangent to the straight trajectory segment. In a case where the first hinge shaft 41 moves to point $P_2$, the rotational angle of the door body 30 is a second opening angle s. The hinge shaft 41 retreats in the first trajectory groove 50 in a case where the door body is rotated to a third opening angle t.

It will be noted that the second opening angle s corresponds to the second angle $G_2$ in the embodiment 1. In this embodiment, for ease of description, the second opening angle is represented by s. There is no corresponding relationship between the third opening angle t and the third angle $G_3$ in any one of the above embodiments.

In a case where the door body 30 is in the closed state, the position of point P is (a, b), and the position of point $P_2$ is (a+L×cos m, b−L×sin m).

Figure 21:
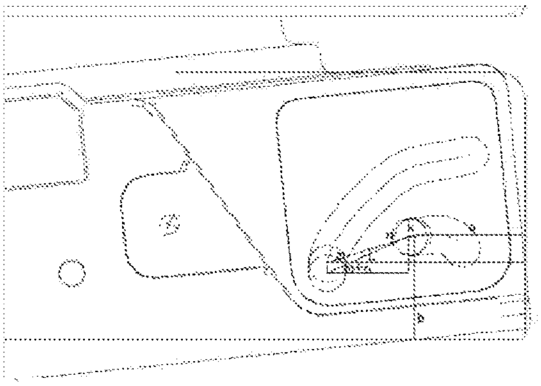
FIG. 21 is a partial view of a door body when being opened to a first opening angle s in an embodiment 1 of a refrigerator, in accordance with some embodiments.

Referring to FIG. 21, ①: in a case where the rotational angle of the door body is n (0≤n≤s), and the moving distance of point P is k (0<k≤K'):

the position of point P before rotation includes: X1=a, Y1=b;

the position of point Q before rotation includes: X2=a+L×cos m, Y2=b−L×sin m;

the position of point P after rotation includes: X3=a+k×cos n, Y3=b−k×sin n;

the position of point Q after rotation includes: X4=a+k×cos n+L×cos(n+m), Y4=b−k×sin n−sin(n+m).

Figure 22:
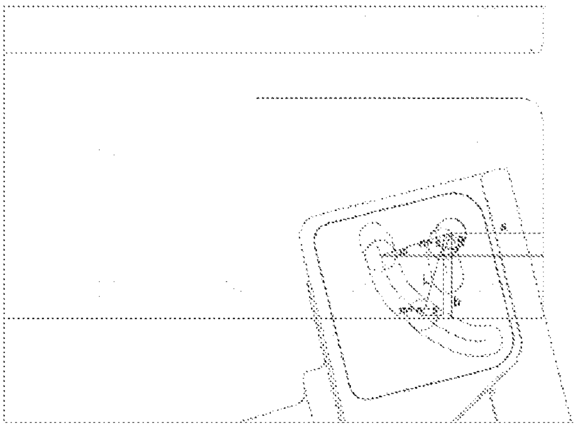
FIG. 22 is a partial view of a door body when being opened to a third opening angle t in an embodiment 1 of a refrigerator, in accordance with some embodiments.

Referring to FIG. 22, ②: in a case where the rotational angle of the door body is n (s≤n≤t), the distance between the point P before the rotation and the point P after the rotation may be found to be 2R×[sin(n−s)/2];

the position of point P after rotation includes: X3=a, Y3=b;

the position of point Q after rotation includes: X4=a+L×cos m; Y4=b−L×sin m;

the position of point P before rotation includes: X1=a+2R×[sin(n−s)/2]×[cos(3n−s)/2], Y1=b−2R×[sin(n−s)/2]×[sin (3n−s)/2]; and the position of point Q before rotation includes: X2=a+2R×[sin(n−s)/2]×[cos(3n−s)/2]+L×cos(n+m−s), Y2=b−2R×[sin (n−s)/2]×[sin(3n−s)/2]−L×sin(n+m−s).

Figure 23:
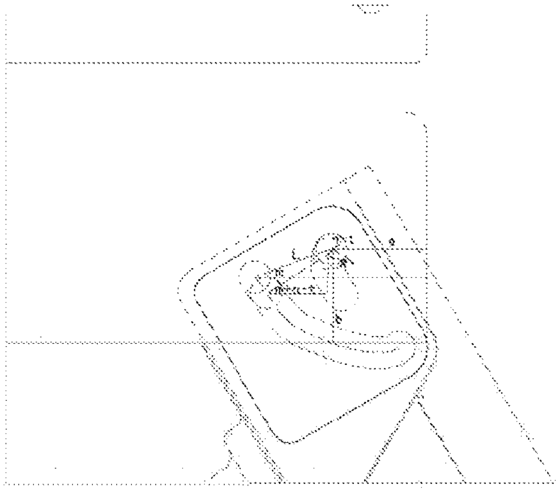
FIG. 23 is a partial view of a door body when being opened to a maximum angle in an embodiment 1 of a refrigerator, in accordance with some embodiments.

Referring to FIG. 23, @: in a case where the rotational angle of the door body is n (n≥t), the distance between the point P before the rotation and the point P after the rotation may be found to be 2R×[sin(n−t)/2];

the position of point P before rotation includes: X1=a, Y1=b;

the position of point Q before rotation includes: X2=a+L×cos m; Y2=b−L×sin m;

the position of point P after rotation includes: X3=a−2R×[sin(n−t)/2]×[cos(180°−(3n−t)/2)], Y3=b+2R×[sin(n−t)/2]×[sin(180−(3n−t)/2)]; and the position of point Q after rotation includes: X4=a−2R×[sin(n−t)/2]×[cos(180°−(3n−t)/2)]+L×cos(m+n−t), Y4=b+2R×[sin(n−t)/2]×[sin(180−(3n−t)/2)]−L×sin (m+n−t).

In a case where the rotational angle is s, k is equal to K', and the changing point satisfies ① and ②, therefore, s can be obtained;

In a case where the rotational angle is t, the changing point satisfies ② and ③, therefore, t can be obtained.

In summary, during the process of the door body 30 being opened from the closed state to $G_{max}$, the door body 30 is rotated around a dynamically changing point so that the door body 30 moves towards the inner side.

Embodiment 2

The hinge assembly in the embodiment 2 has the same principle as the hinge assembly in the embodiment 1. The difference is that the shape of the first trajectory groove 50 and the second trajectory groove 60 is limited in the embodiment 2.

In this embodiment, the first trajectory line S and the second trajectory line K are regular curves.

Referring to FIGS. 3, 5 to 10, and 12 to 17, the curved trajectory segment of the first trajectory line S and the second trajectory line K are both smooth curves, and the curved trajectory segment and the straight trajectory segment of the first trajectory line S are smoothly transitioned and connected. For example, the curved trajectory segment of the first trajectory line S is tangent to the straight trajectory segment.

Correspondingly, the groove wall of the curved groove segment of the first trajectory groove 50 is a smooth curved surface, and the groove wall of the second trajectory groove 60 is also a smooth curved surface. The groove wall of the straight groove segment and the groove wall of the curved groove segment of the first trajectory groove 50 are smoothly transitioned and connected. For example, the planar groove wall of the straight groove segment of the first trajectory groove 50 is tangent to the curved groove wall of the curved groove segment.

The above arrangement enables the first hinge shaft 41 to move smoothly relative to the first trajectory groove 50 and the second hinge shaft 42 to move smoothly relative to the second trajectory groove 60, thereby improving the smoothness of opening the door body 30 and extending the service life of the hinge shaft. During the opening process of the door body 30, the movement of the first hinge shaft 41 relative to the first trajectory groove 50 is continuous and uninterrupted, and the movement of the second hinge shaft 42 relative to the second trajectory groove 60 is continuous and uninterrupted.

In this embodiment, the movement of the first hinge shaft 41 relative to the first trajectory groove 50 and the movement of the second hinge shaft 42 relative to the second trajectory groove 60 are equivalent to a movement of a roller relative to a cam. For the cam mechanism with the roller follower, the dimension of the radius of the roller often affects the shape of the actual contour curve of the cam, and therefore, the roller radius needs to be selected reasonably.

Figure 24:
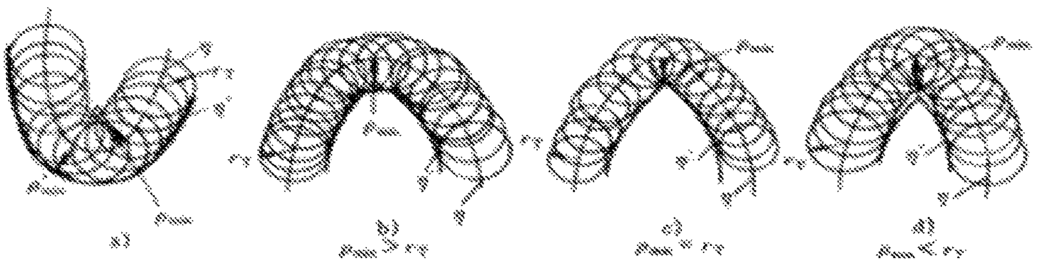
FIG. 24 is a schematic diagram showing a movement condition of a roller along a convex curve in an embodiment 2 of a refrigerator, in accordance with some embodiments.

As shown in a) in FIG. 24, in a case where a theoretical contour curve of the cam is a concave curve, ρ' is equal to a sum of ρ and $r_T$ (i.e., $\rho'=\rho+r_T$), and therefore, the dimension of $r_T$ is not limited by ρ. In this case, regardless of the dimension of the roller radius, the working contour of the cam is always a smooth curve.

ρ is a theoretical contour radius; ρ' is an actual contour radius; and $r_T$ is the roller radius.

In a case where the theoretical contour curve of the cam is a convex curve, ρ is equal to a difference between ρ' and $r_T$ (i.e., $\rho=\rho'-r_T$):

(1) As shown in b) in FIG. 24, in a case where $\rho_{min}$ is greater than $r_T$ ($\rho_{min}>r_T$), and ρ' is greater than 0 (ρ'>0), the actual contour curve is a smooth curve. $\rho_{min}$ is the minimum curvature radius of the convex portion of the theoretical contour curve (i.e., the curvature radius of the sharpest portion).

(2) As shown in c) in FIG. 24, in a case where $\rho_{min}$ is equal to $r_T$ ($\rho_{min}=r_T$), and ρ' is equal to 0 (ρ'=0), a sharp point is generated on the actual contour curve of the cam. The sharp point is extremely prone to wear, and prone to change the motion law of the cam, which may not be used.

(3) As shown in d) in FIG. 24, in a case where is less than $r_T$ ($\rho_{min}<r_T$), and ρ' is less than 0 (ρ'<0), the actual contour curve will cross, and the actual contour curve above the intersection point will be cut off during processing, resulting in the inability to implement the motion law of this portion.

Therefore, in order for the cam contour to neither become sharp nor intersect at any position, the roller radius $r_T$ needs to be less than the minimum curvature radius $\rho_{min}$ of the convex portion of the theoretical contour curve. For example, $r_T\leq 0.8\rho_{min}$. If this requirement may not be satisfy, the radius of the cam base circle is increased and the cam contour curve is redesigned.

Based on this, in this embodiment, the curved trajectory segment of the first trajectory line S corresponds to the cam theoretical contour curve of the first trajectory groove 50, and the cam theoretical contour curve is an convex curve (the curved groove segment is protrudes towards the direction proximate to the door side wall 32). The groove wall of the first trajectory groove 50 proximate to the door front wall 31 is the actual contour curve. The radius $r_T$ of the first hinge shaft 41 satisfies the setting of (1) ($\rho_{min}>r_T$), so as to ensure that the groove wall of the first trajectory groove 50 proximate to the door front wall 31 is a smooth curve.

In this embodiment, the second trajectory line K corresponds to the cam theoretical contour curve of the second trajectory groove 60, and the cam theoretical contour curve is a convex curve (the second trajectory groove protrudes towards the direction away from the door front wall). The groove wall of the second trajectory groove 60 proximate to the door front wall 31 is the actual contour curve. The radius $r_T$ of the second hinge shaft 42 satisfies the setting of (1) ($\rho_{min}>r_T$), so as to ensure that the groove wall of the second trajectory groove 60 proximate to the door front wall 31 is a smooth curve, which enables the first hinge shaft 41 to move smoothly and reduces the wear of the second trajectory groove 60.

That is, the second trajectory groove 60 is essentially configured as a cam, which may effectively avoid the defects of discontinuous movement and easy wear caused by the concave structure. In summary, in this embodiment, the curved trajectory segment of the first trajectory line S, and the second trajectory line K are both configured as convex cam curves.

For example, the curved trajectory segment of the first trajectory line S and at least a portion of the second trajectory line K may also be configured as a concave curve. For example, in a case where the first trajectory line S is set to first extend from the first positioning point $P_1$ along a straight line towards the direction proximate to the door side wall 32, and then extend along a curve towards the direction proximate to the door side wall 32 and away from the door front wall 31 to the sixth positioning point $P_6$, a portion of the second trajectory line K proximate to the door side wall 32 may be set as a curve extending towards a direction proximate to the door side wall 32 and away from the door front wall 31. In this case, the curved trajectory segment of the first trajectory line S and the portion of the second trajectory line K proximate to the door side wall 32 are set as concave curves, so that the first hinge shaft 41 and the second hinge shaft 42 move smoothly along them.

Embodiment 3

Figure 25:
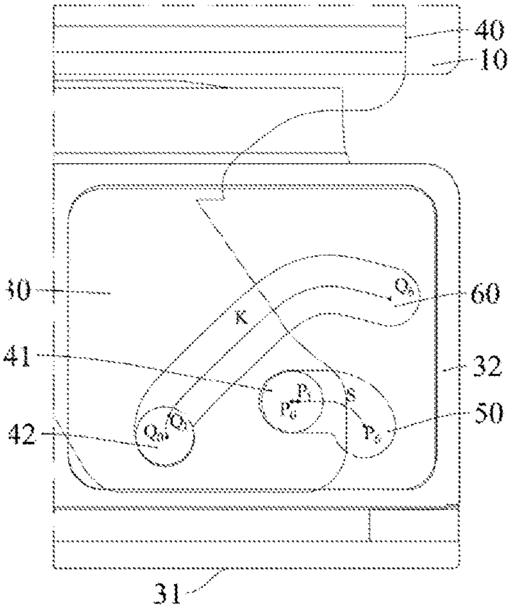
FIG. 25 is a schematic diagram showing a position of a first hinge shaft relative to a first trajectory groove and a position of a second hinge shaft relative to a second trajectory groove in a case where a door body is closed in an embodiment 3 of a refrigerator, in accordance with some embodiments.
Figure 26:
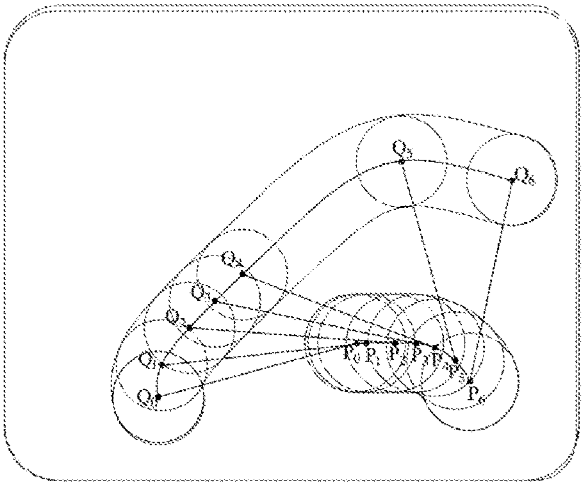
FIG. 26 is a schematic diagram showing a movement condition of a first hinge shaft relative to a first trajectory groove and a movement condition of a second hinge shaft relative to a second trajectory groove in an embodiment 3 of a refrigerator, in accordance with some embodiments.
Figure 27:
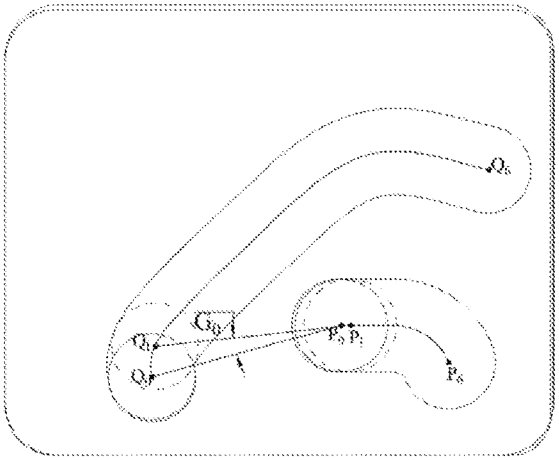
FIG. 27 is a schematic diagram showing a position of a first hinge shaft relative to a first trajectory groove and a position of a second hinge shaft relative to a second trajectory groove in a case where a door body is closed from $\varphi=G_0$ to a close state in an embodiment 3 of a refrigerator, in accordance with some embodiments.

The arrangement of the embodiment 3 is the same as that of the embodiment 1 and/or the embodiment 2. The difference is that compared with the case of the above embodiment 1 and embodiment 2, as shown in FIGS. 25 to 27, the second trajectory line K includes a seventh guiding point $Q_0$ located at a side of the first guiding point $Q_1$ away from the door side wall 32 and away from the door rear wall 33, and the first trajectory line S includes a seventh positioning point $P_0$ located at a side of the first positioning point $P_1$ away from the door side wall 32.

In a case where the door body 30 is closed, the central axis (i.e., the positioning central axis P) of the first hinge shaft 41 is located at the seventh positioning point $P_0$, and the central axis (i.e., the guiding central axis Q) of the second hinge shaft 42 is located at the seventh guiding point $Q_0$. In a case where the door body 30 is opened to $G_0$, the central axis (i.e., the positioning central axis P) of the first hinge shaft 41 is located at the first positioning point $P_1$, and the central axis (i.e., the guiding central axis Q) of the second hinge shaft 42 is located at the first guiding point $Q_1$.

During a process of the door body 30 being opened from the closed state to $G_0$, the first hinge shaft 41 moves in a straight line from the seventh positioning point $P_0$ to the first positioning point $P_1$ towards the direction proximate to the door side wall 32, and the second hinge shaft 42 moves from the seventh guiding point $Q_0$ to the first guiding point $Q_1$.

For example, during a process of the door body 30 being opened from the closed state to $G_0$, if the door body 30 (or, the first trajectory groove 50 and the second trajectory groove 60) is used as a stationary reference object, the second hinge shaft 42 performs an approximate rotational movement with the central axis of the first hinge shaft 41 as a rotational axis in a case where the door body 30 is closed.

It will be noted that the approximate rotational movement includes the standard defined rotational movement around an axis and further includes the rotational movement of the second hinge shaft 42 in a case where the first hinge shaft 41 is slightly displaced relative to the first trajectory groove 50 in the above process.

For example, the approximate rotational movement includes a rotational movement of the second hinge shaft 42 with the central axis of the moving first hinge shaft 41 as the rotational axis, and when the door body 30 is rotated by a unit angle, the displacement distance of the central axis of the first hinge shaft 41 is less than 0.5 mm.

For example, the approximate rotational movement includes that the displacement of the first hinge shaft 41 relative to the first trajectory groove 50 is less than 0.2 mm during the process of the door body 30 being opened from the closed state to $G_0$. That is, the "approximate rotational movement" includes the case where the first hinge shaft 41 moves slightly relative to the first trajectory groove 50.

For example, $G_0$ is any value between 7° and 10°.

For example, a length of the line segment $P_0P1$ on the first trajectory arc K is in a range from 0 mm to 0.2 mm.

In an initial phase (that is, the door body 30 is opened from the closed state to $G_0$) of opening the door body 30, the door body 30 mainly performs the rotational movement, so that the mutual suction force between the door body 30 and the box body 10 may be quickly overcome, and the door body 30 is separated from the box body 10.

It will be noted that the process of the door body 30 being opened from $G_0$ to $G_{max}$ is the same as the first phase to the third phase in the embodiment 1, and details will not be repeated herein.

Embodiment 4

The main difference between the embodiment 4 and the embodiment 3 is that the door body 30 is provided with a flipping beam 9.

Figure 28:
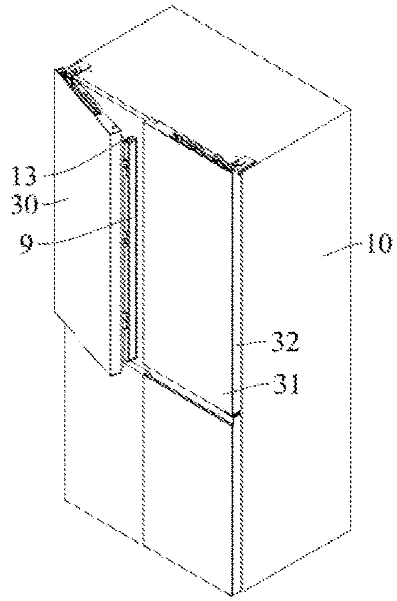
FIG. 28 is a schematic diagram showing relative positions of a flipping beam and a box body in a case where a door body is opened in an embodiment 4 of a refrigerator, in accordance with some embodiments.
Figure 29:
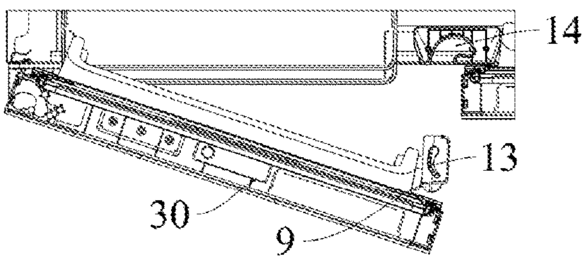
FIG. 29 is a schematic diagram showing relative positions of a flipping beam and a box body from another perspective in a case where a door body is opened in an embodiment 4 of a refrigerator, in accordance with some embodiments.

As shown in FIGS. 28 and 29, the refrigerator 1 includes two opposite door bodies 30, and the two opposite door bodies 30 cooperate together to open or close the access opening.

The flipping beam 9 is disposed on an inner lining surface of one door body 30 and is proximate to the other door body 30. A guiding groove 14 is disposed on a top wall of the storage compartment of the refrigerator. The flipping beam 9 may be slidably engaged with the guiding groove 14, so as to implement the switching of different angles between the flipping beam 9 and the corresponding door body 30. In a case where the two door bodies 30 are closed, the flipping beam 9 closes a gap between the two door bodies 30 and the box body 10, so as to effectively prevent cold air from overflowing.

For example, the refrigerator 1 further includes a guiding block 13, which is disposed on the top of the flipping beam 9 and corresponds to the position of the guiding groove 14.

Under the limitation of the trajectories in the embodiment 4, during a process from which the guiding block 13 of the door body 30 starts to enter the guiding groove 14 on the box body 10 until the flipping beam 9 completes the flipping, the door body 30 (or, the first trajectory groove 50 and the second trajectory groove 60) serves as stationary reference object, and the second hinge shaft 42 performs approximate rotational movement with the central axis of the first hinge shaft 41 as the rotational axis.

That is, the process of the door body 30 rotating and closing from $G_0$ to the closed state corresponds to the process from which the guiding block 13 is in contact with the guiding groove 14 until the flipping beam 9 completes the flipping.

Under the limitation of the trajectory characteristics of the embodiment 3, in a case where the door body 30 is closed from any angle greater than $G_0$ to $G_0$, the guiding block 13 at the top of the flipping beam 9 is in contact with the guiding groove 14 on the box body 10, and the guiding block 13 starts to enter the guiding groove 14. In a case where the door body 30 is closed, the flipping beam 9 completes the flipping.

The arrangement of the embodiment 4 ensures that the force promoting the flipping of the flipping beam 9 on the door body 30 will not be offset as the door body 30 moves to the outer side, thereby preventing the guiding block 13 from getting stuck due to incomplete flipping after entering the guiding groove 14, effectively ensuring that the door body 30 is closed in place and ensuring the effectiveness of the low-temperature storage of the refrigerator.

Embodiment 5

The principle of the embodiment 5 is the same as that of the embodiment 1 to the embodiment 4, and the main difference is that the case where the door body 30 is continued to be closed from the closed state towards the box body 10 is limited.

Figure 30:
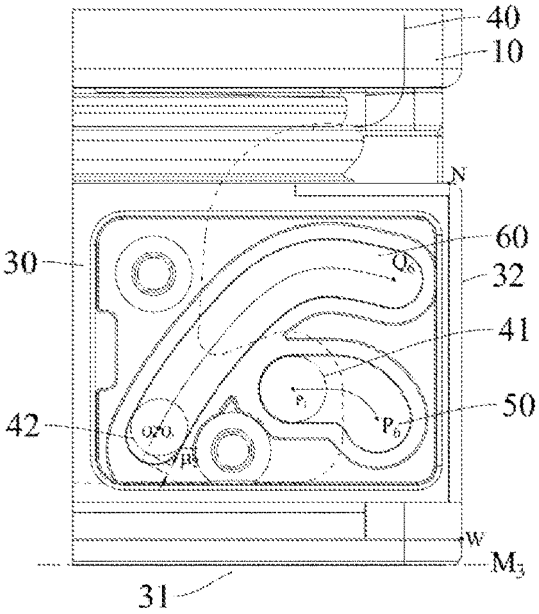
FIG. 30 is a schematic diagram showing a positional relationship of a first hinge shaft relative to a first trajectory groove and a second hinge shaft relative to a second trajectory groove in a case where a door body is closed in an embodiment 5 of a refrigerator, in accordance with some embodiments.
Figure 31:
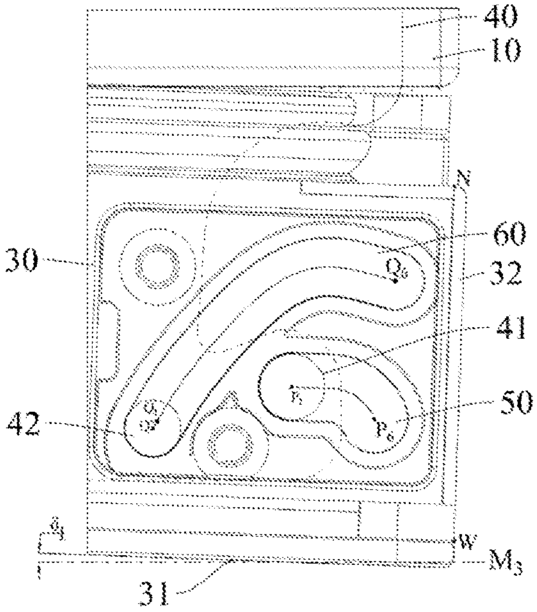
FIG. 31 is a schematic diagram showing a positional relationship of a first hinge shaft relative to a first trajectory groove and a second hinge shaft relative to a second trajectory groove in a case where a door body is squeezing a door seal in an embodiment 5 of a refrigerator, in accordance with some embodiments.
Figure 32:
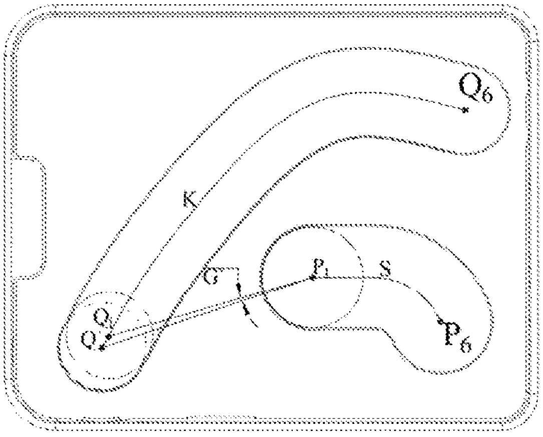
FIG. 32 is a schematic diagram showing a positional relationship of a first hinge shaft relative to a first trajectory groove and a second hinge shaft relative to a second trajectory groove in a case where a door body continues to move in a closed direction from a closed state in an embodiment 5 of a refrigerator, in accordance with some embodiments.

In this embodiment, as shown in FIGS. 30 to 32, in a case where the door body 30 is closed, a plane that passes through the first side edge W and is parallel to the second reference plane $M_2$ is referred to as a third reference plane $M_3$. The third reference plane $M_3$ and the datum plane $M_0$ intersect at the theoretical first side edge W in a case where the door body 30 is closed. The third reference plane $M_3$ does not move during the opening or closing process of the door body 30 relative to the box body 10 and is a reference plane that remains stationary relative to the box body 10.

In this embodiment, referring to FIG. 30, in a case where the door body 30 is in the closed state, the door front wall 31 is parallel to the second reference plane $M_2$. That is, the door front wall 31 is coplanar with the third reference plane $M_3$. That is, the door front wall 31 is located in the third reference plane $M_3$ in a case where the door body 30 is in the closed state, and the third reference plane $M_3$ passes through the first side edge W.

In a case where the end of the door front wall 31 away from the door side wall 32 is located at a side of the third reference plane $M_3$ away from the box body 10, an included angle between the door front wall 31 and the third reference plane $M_3$ is a positive number. In a case where the end of the door front wall 31 away from the door side wall 32 is located at a side of the third reference plane $M_3$ proximate to the box body 10, an included angle between the door front wall 31 and the third reference plane $M_3$ is a negative number.

As shown in FIG. 31, in a case where the door body 30 is in the closed state and the door seal 5 is continued to be squeezed, since the door seal 5 is a magnetic elastomer, the end of the door front wall 31 away from the door side wall 32 may move to the side of the third reference plane $M_3$ proximate to the box body 10. There is an included angle 51 between the door front wall 31 and the third reference plane $M_3$, and $\delta_1$ is less than 0° (i.e., $\delta_1<0°$). For example, in a case where the first hinge shaft 41 is in contact with the end wall of the first trajectory groove 50 away from the door side wall 32, and the second hinge shaft 42 is in contact with the end wall of the second trajectory groove 60 away from the door side wall 32, the included angle between the door front wall 31 and the third reference plane $M_3$ is $\delta_1$, and the included angle 51 is any value from −3° to 0°.

In this embodiment, in a case where the door body 30 continues to move from the closed state along the closing direction to $\delta_1$, the second hinge shaft 42 performs the approximate rotational movement with the central axis of the first hinge shaft 41 as the rotational axis. That is, in a case where the door body 30 continues to be closed from the closed state to $\delta_1$, a maximum displacement of the first hinge shaft 41 relative to the first trajectory groove 50 is less than 0.2 mm. The above arrangement may prevent the door body 30 from popping open due to the contact between the second hinge shaft 42 and the end portion of the second trajectory groove 60 away from the door side wall 32 in a case where the door body 30 is forcefully thrown against the box body 10.

For example, in a case where the door body 30 is in the closed state, there is a third gap $\mu_1$ between the first hinge shaft 41 and the end wall of the first trajectory groove 50 away from the door side wall 32, and a width of the third gap $\mu_1$ is any value from 0 mm to 0.2 mm. For example, as shown in FIG. 30, the width of the third gap $\mu_1$ is 0 mm.

There is a fourth gap $\mu_2$ between the second hinge shaft 42 and the end wall of the second trajectory groove 60 away from the door side wall 32, and a width of the fourth gap $\mu_2$ is greater than 0. The above second gap $\mu_2$ may prevent the door body 30 from popping open due to the contact between the second hinge shaft 42 and the end portion of the second trajectory groove 60 away from the door side wall 32 in a case where the door body 30 is forcefully thrown against the box body 10.

As shown in FIGS. 30 to 32, in a case where the door body 30 is in the closed state, the first hinge shaft 41 is in contact with the end wall of the first trajectory groove 50 away from the door side wall 32. In a case where the door body 30 continues to move from the closed state along the closing direction, the first hinge shaft 41 remains in contact with the first trajectory groove 50.

The second trajectory line K has a reserved guiding point Q'. In a case where the second hinge shaft 42 moves to the end portion of the second trajectory groove 60 away from the door side wall 32, the guiding center axis Q is located at the reserved guiding point Q'. A trajectory segment between the reserved guiding point Q' and the first guiding point $Q_1$ is referred to as a reserved trajectory segment $Q'Q_1$. For example, the reserved trajectory segment $Q'Q_1$ extends from the first guiding point $Q_1$ towards the direction proximate to the door front wall 31 and proximate to the door side wall 32 to the reserved guiding point Q'.

In a case where the door body 30 is closed, the first hinge shaft 41 moves to the first positioning point $P_1$, and the second hinge shaft moves to the first guiding point $Q_1$. In a case where the door body 30 continues to move in the closing direction from the closed state, the first hinge shaft 41 remains at the first positioning point $P_1$ (a distance moved relative to $P_1$ towards the direction away from the door side wall 32 is in a range from 0 mm to 0.2 mm), and the second hinge shaft 42 moves from the first guiding point $Q_1$ to the reserved guiding point Q'. The rotational angle at which the door body 30 continues to move towards the box body 10 is referred to as G'. In this embodiment, G' is greater than or equal to $\delta_1$ (i.e., $G' \geq \delta_1$), so that the second hinge shaft 42 may be prevented from being impacted by the end portion of the second trajectory groove 60 away from the door side wall 32 in a case where the door body 30 is forcefully thrown against the box body 10.

As above, during the process that the door body 30 continues to move from the closed state towards the direction proximate to the box body 10, the door body 30 (or, the first trajectory groove 50 and the second trajectory groove 60) serves as a stationary reference object, and the second hinge shaft 42 performs the approximate rotational movement with the central axis of the first hinge shaft 41 as the rotational axis.

For example, G' is equal to $\delta_1$, so that in a case where the included angle between the door front wall 31 and the third reference plane $M_3$ reaches $\delta_1$, the first hinge shaft 41 is in contact with the end wall of the first trajectory groove 50 away from the door side wall 32, and the second hinge shaft 42 is in contact with the end wall of the second trajectory groove 60 away from the door side wall 32.

Embodiment 6

The principle of the embodiment 6 is substantially the same as that of the embodiment 1 to the embodiment 5, and the difference is that the embodiment 6 has limited the arrangement of the first trajectory groove 50 and the second trajectory groove 60 on the door body 30.

Referring to FIGS. 33 to 36, the door body 30 includes a mounting block 80. The mounting block 80 is integrally formed and installed at a position on the door body 30 opposite to the hinge plate 40. The first trajectory groove 50 and the second trajectory groove 60 are formed in the mounting block 80.

Figure 33:
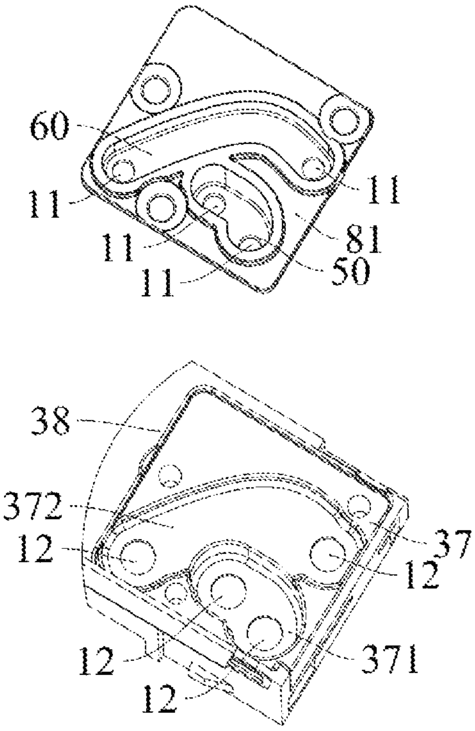
FIG. 33 is an exploded view of an upper end of a door body and a mounting block in an embodiment 6 of a refrigerator, in accordance with some embodiments.
Figure 34:
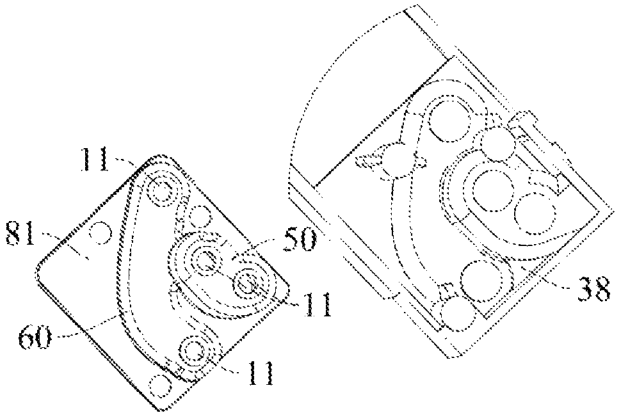
FIG. 34 is another exploded view of an upper end of a door body and a mounting block in an embodiment 6 of a refrigerator, in accordance with some embodiments.

Referring to FIGS. 33 and 34, this embodiment will be described by taking the mounting block 80 disposed at the upper end of the door body 30 as an example. In this embodiment, the mounting block 80 includes a trajectory block in which the first trajectory groove 50 and the second trajectory groove 60 are formed. The first trajectory groove 50 includes a groove bottom and a circumferential groove wall surrounding an edge of the groove bottom. The circumferential groove wall defines a groove opening disposed opposite to the groove bottom. The structure of the second trajectory groove 60 is the same as that of the first trajectory groove 50, and the difference is the shape of the grooves.

The mounting block 80 includes a plate body 81 on which the first trajectory groove 50 and the second trajectory groove 60 are disposed. A door end cover 38 located at the upper end of the door body 30 is provided with an accommodating groove 37, and the mounting block 80 is disposed in the accommodating groove 37. The plate body 81 and the door body 30 may be fixedly connected through fasteners such as screws. For example, a plurality of screw holes for connecting the plate body 81 and the accommodating groove 37 are disposed in the plate body 81 and located at the edges of the first trajectory groove 50 and the second trajectory groove 60.

The groove openings of the trajectory grooves (e.g., the first trajectory groove 50 and the second trajectory groove 60) in the mounting block 80 disposed at the upper end of the door body 30 are located above the groove bottoms.

For example, as shown in FIGS. 33 and 34, the mounting block 80 further includes a dust removal hole 11. The dust removal hole 11 is disposed in the groove bottoms of the first trajectory groove 50 and the second trajectory groove 60. For example, the mounting block 80 includes a plurality of dust removal holes 11, and the plurality of dust removal holes 11 are disposed on the end portions of the groove bottoms of the first trajectory groove 50 and the second trajectory groove 60 proximate to or away from the door side wall 32.

It can be understood that after the hinge assembly is used for a long time, dust or debris may easily accumulate in the first trajectory groove 50 and the second trajectory groove 60, thereby affecting the opening and the closing of the door body. In this embodiment, in a case where there are debris or dust in the first trajectory groove 50 and the second trajectory groove 60, the hinge shaft may move to any end of the trajectory groove through the opening and the closing of the door body, so as to drive the dust or debris to move to the positions of the dust removal holes 11 and discharge the dust or debris, which is conducive to prolonging the service life of the hinge assembly and improving the opening smoothness of the door body 30.

In some embodiments, a first receiving cavity 371 and a second receiving cavity 372 are formed on the bottom wall of the accommodating groove 37. The first trajectory groove 50 is installed in the first receiving cavity 371, and the second trajectory groove 60 is installed in the second receiving cavity 372. The plate body 81 is disposed in the accommodating groove 37 and is limited by the circumferential groove wall of the accommodating groove 37. With the above arrangement, the mounting block 80 is installed in the accommodating groove 37, which is conducive to improving the positioning speed and accuracy of the mounting block 80.

Dust collecting cavities 12 are disposed on the bottom of the first receiving cavity 371 and the second receiving cavity 372. The positions of the dust collecting cavities 12 correspond to that of the dust removal holes 11. The dust falling into the first trajectory groove 50 and the second trajectory groove 60 is discharged into the dust collecting cavity 12 through the dust removal hole 11 due to the action of the first hinge shaft 41 or the second hinge shaft 42, which is conducive to prolonging the service life of the hinge assembly and improving the opening smoothness of the door body 30.

For example, there is a first deformation gap between the first trajectory groove 50 and the cavity wall of the first receiving cavity 371, and there is a second deformation gap between the second trajectory groove 60 and the cavity wall of the second receiving cavity 372. The arrangement of the first deformation gap and the second deformation gap allows the first trajectory groove 50 and the second trajectory groove 60 to have deformation space.

It can be understood that in a case where the door body 30 is opened, the first hinge shaft 41 moves relative to the first trajectory groove 50, and the second hinge shaft 42 moves relative to the second trajectory groove 60. In this case, the first trajectory groove 50 and the second trajectory groove 60 retain a certain elastic deformation space, which may prolong the service life of the first trajectory groove 50 and the second trajectory groove 60. In addition, the door body 30 may be prevented from jamming due to excessive stiffness and processing errors of the first trajectory groove 50 and the second trajectory groove 60.

In some embodiments, the end of the hinge assembly away from the first body side wall is provided with a first cooperating portion. The mounting block 80 has a locking block, and a second cooperating portion is formed on the locking block. The second cooperating portion is used to cooperate with the first cooperating portion to implement the locking and unlocking of the door body 30 and the box body 10.

In this embodiment, the locking block and the trajectory block are integrally formed to form the mounting block 80.

As shown in FIGS. 35 to 44, this embodiment will be described by taking the mounting block 80 disposed at the lower end of the door body 30 as an example.

Figure 35:
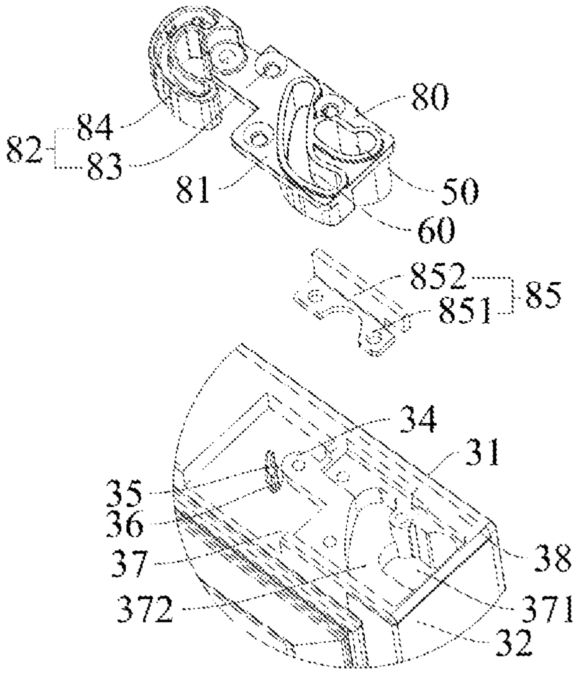
FIG. 35 is an exploded view of a lower end of a door body and a mounting block in an embodiment 6 of a refrigerator, in accordance with some embodiments.
Figure 36:
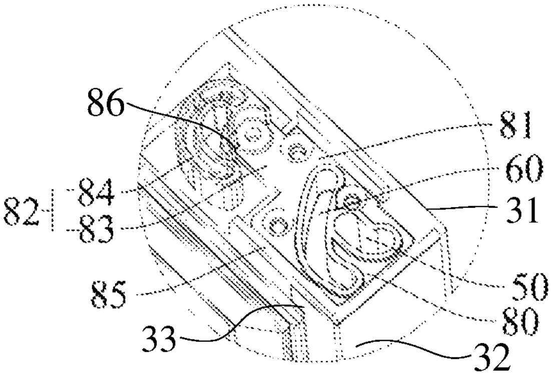
FIG. 36 is a schematic diagram showing an assembly structure of a lower end of a door body and a mounting block in an embodiment 6 of a refrigerator, in accordance with some embodiments.

For example, referring to FIGS. 35 and 36, the second cooperating portion on the locking block is configured as a locking structure. For example, the second cooperating portion includes a lock hook 82 disposed at a side of the plate body 81 away from the door side wall 32. The lock hook 82 extends towards the direction away from the door side wall 32 and is bent towards the direction proximate to the door rear wall 33 and proximate to the door side wall 32. An opening of the lock hook 82 faces towards the plate body 81 (i.e., towards the door side wall 32), and a free end of the lock hook 82 is closer to the door rear wall 33 than a fixed end of the lock hook 82.

Figure 37:
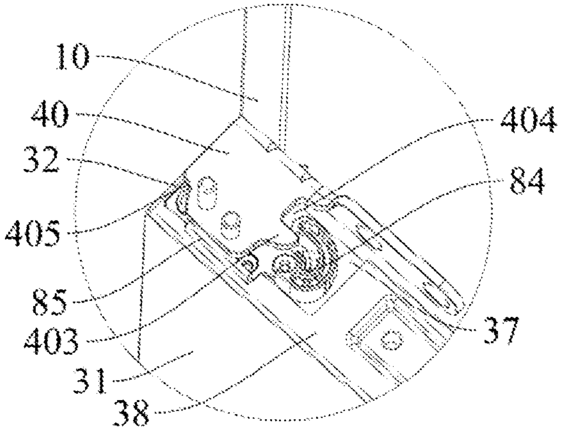
FIG. 37 is a perspective view of a cooperation between a hinge plate and a locking structure in a case where a door body is in a closed state in an embodiment 6 of a refrigerator, in accordance with some embodiments.
Figure 38:
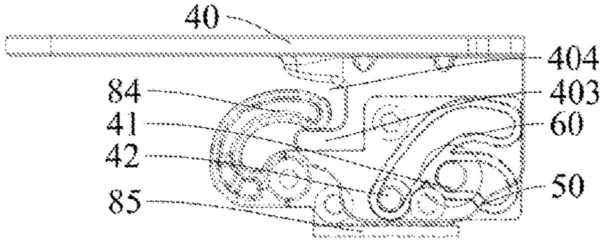
FIG. 38 is a structural diagram of a cooperation between a hinge plate and a locking structure in a case where a door body is in a closed state in an embodiment 6 of a refrigerator, in accordance with some embodiments.
Figure 39:
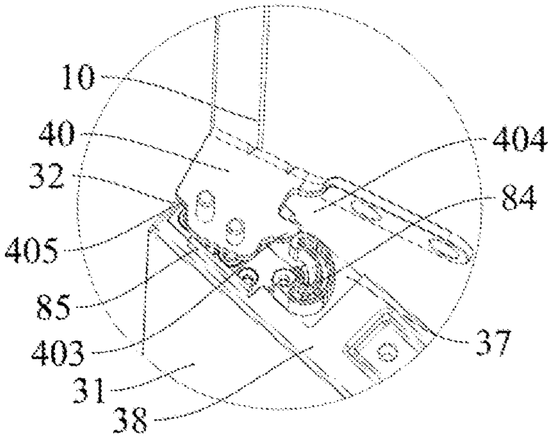
FIG. 39 is a perspective view of a hinge plate and a locking structure in a case where a door body is opened in an embodiment 6 of a refrigerator, in accordance with some embodiments.
Figure 40:
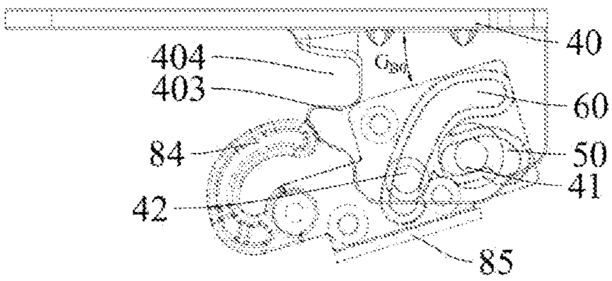
FIG. 40 is a structural diagram of a hinge plate and a locking structure in a case where a door body is opened in an embodiment 6 of a refrigerator, in accordance with some embodiments.
Figure 41:
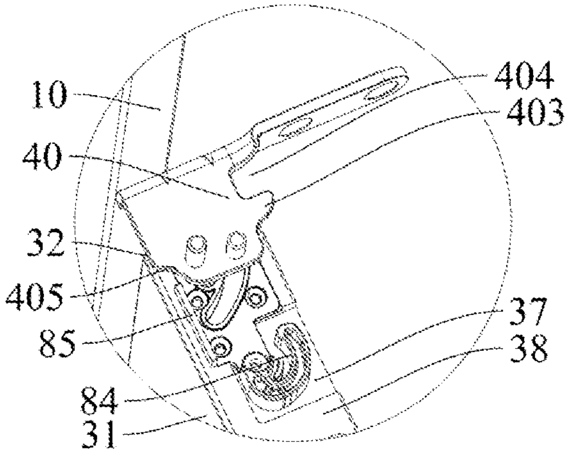
FIG. 41 is a perspective view of a hinge plate and a locking structure in a case where a door body is opened to 90° in an embodiment 6 of a refrigerator, in accordance with some embodiments.
Figure 42:
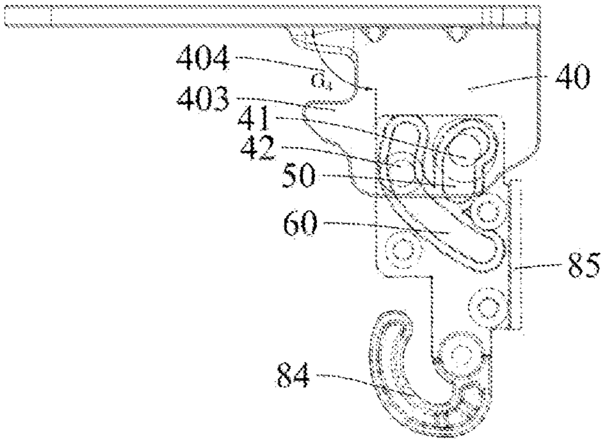
FIG. 42 is a structural diagram of a hinge plate and a locking structure in a case where a door body is opened to 90° in an embodiment 6 of a refrigerator, in accordance with some embodiments.

For example, referring to FIG. 37 and FIG. 38, the first cooperating portion is configured as a blocking portion 403, and the blocking portion 403 is disposed at a side of the hinge plate 40 away from the first body side wall. A hook gap 404 is formed at a side of the blocking portion 403 proximate to the box body. In a case where the door body 30 is in the closed state, the free end of the lock hook 82 is received in the hook gap 404, the blocking portion 403 is located in the lock hook 82, and the lock hook 82 on the door body 30 hooks the blocking portion 403 on the hinge plate 40, thereby locking the door body 30. In this way, the door body 30 may be prevented from not being tightly closed and affecting the refrigeration and freezing effect of the refrigerator.

Referring to FIGS. 38 to 42, in a case where the door body 30 is opened, the lock hook 82 is deformed due to force and overcomes the blocking of the blocking portion 403, thereby disengaging from the blocking portion 403.

For example, referring to FIGS. 35 and 36, the lock hook 82 includes a second connecting portion 83 and a hooking portion 84. The second connecting portion 83 is connected to the plate body 81, and the hooking portion 84 is connected to the second connecting portion 83 and bent towards a side proximate to the door rear wall 33 and proximate to the door side wall 32. The screws pass through the second connecting portion 83 and are inserted into the door body 30, so as to fixedly connect the second connecting portion 83 and the door body 30, thereby strengthening the connection strength between the second connecting portion 83 and the door body 30. In this way, in a case where the lock hook 82 disengages from the blocking portion 403, only the hooking portion 84 undergoes deformation.

Free ends of the hooking portion 84 and the blocking portion 403 are both arc-shaped, which facilitates the hooking portion 84 to smoothly hook or disengage from the blocking portion 403.

During the closing process of the door body 30, the free end of the hooking portion 84 gradually approaches the blocking portion 403. In a case where the hooking portion 84 abuts against the blocking portion 403, the hooking part 84 undergoes deformation due to the action of the reaction force of the blocking portion 403, so as to enable the blocking portion 403 to enter the hooking portion 84 and enable the free end of the hooking portion 84 to enter the hook gap 404. In this way, the lock hook 82 may be locked with the hinge plate 40, so as to implement the locking of the door body 30 and the box body 10.

It can be understood that the interaction between the hooking portion 84 and the blocking portion 403 during the opening process of the door body 30 is opposite to the interaction between the hooking portion 84 and the blocking portion 403 during the closing process of the door body 30, and details will not be repeated herein.

For example, in a case where the door body 30 is closed from any angle greater than a set angle (e.g., 7°) to the set angle, the door body 30 is closed due to the action of the hooking portion 84 and the blocking portion 403.

For example, in a case where the door body 30 is opened to a set unlocking angle (e.g., 5° to 8°), the hooking portion 84 is separated from the blocking portion 403.

In some embodiments, the unlocking angle is set to $G_1$, that is, in a case where the door body 30 is opened to $G_1$ and the first hinge shaft 41 moves along the straight trajectory segment of the first trajectory line S, the hooking portion 84 is separated from the blocking portion 403. Alternatively, the unlocking angle is set to $G_2$, that is, in a case where the door body 30 is opened to $G_2$ and the central axis of the first hinge shaft 41 moves along the straight trajectory segment of the first trajectory line S to the terminal point of the straight trajectory segment proximate to the door side wall 32, the hooking portion 84 is separated from the blocking portion 403.

It can be understood that in the first phase of opening the door body 30, the door body 30 mainly performs rotational movement to facilitate the separation of the lock hook 82 and the blocking portion 403.

In some embodiments, as shown in FIGS. 35 and 36, the door body 30 is provided with a first protrusion 34 and a second protrusion 35, and a gap groove 36 is formed between the first protrusion 34 and the second protrusion 35. The first protrusion 34 is substantially located at a side of the second protrusion 35 proximate to the door front wall 31 and proximate to the door side wall 32. The second connecting portion 83 includes an inserting plate 86, and the inserting plate 86 is inserted in the gap groove 36. In this way, the second connecting portion 83 may be prevented from deforming along a direction from the door front wall 31 to the door rear wall 33 by the limitation of the first protrusion 34 and the second protrusion 35.

For example, referring to FIGS. 35 and 36, the inserting plate 86 is configured as an arc plate, and the second protrusion 35 is configured as an arc plate. The first protrusion 34 is proximate to an edge of the second protrusion 35 and has the same shape as the second protrusion 35, so as to jointly define an arc-shaped gap groove 36 with the second protrusion 35. The arc-shaped inserting plate is cooperated with the arc-shaped gap groove 36, so that an area limited by the gap groove 36 to the second connecting portion 83 may be increased, which is conducive to improving the strength of the connection between the mounting block 80 and the door body 30.

It will be noted that the trajectory block and the locking block of the mounting block 80 in this embodiment are integrally formed. In some embodiments, the trajectory block and the locking block are disposed separately. For example, the first trajectory groove 50 and the second trajectory groove 60 are integrally formed on the door end cover 38, and the locking block separately forms the mounting block 80 to be installed in the accommodating groove 37.

For example, the mounting block 80 located at the upper end of the door body 30 includes the trajectory block but not the locking block. Correspondingly, in a case where the structure of the mounting block 80 is changed, the accommodating groove 37 disposed on the door body adapts to the structure of the mounting block 80 to accommodate and fix the mounting block 80.

For example, the mounting block 80 includes a separately provided trajectory block and a locking block.

In some embodiments, as shown in FIG. 28, the refrigerator 1 is configured in a form of including a cross door, that is, the refrigerator 1 includes four door bodies 30, two of which are opposite to each other, and the other two are opposite to each other. The refrigerator includes six hinge assemblies to fix the four door bodies 30 on the box body 10.

The six hinge assemblies include two upper hinge assemblies, two middle hinge assemblies, and two lower hinge assemblies. In a case where the door body 30 is opened, the trajectory block on the door body 30 is cooperated with the hinge shaft of the hinge assembly, so as to cause the door body 30 to move towards the inner side while rotating, so that the distance that the first side edge W of the door body 30 exceeds the datum plane $M_0$ is small. The middle hinge assembly includes a hinge plate and a through shaft, and the through shaft extends upward and downward from the hinge plate. The through shaft includes an upper hinge shaft and a lower hinge shaft. The upper hinge shaft is located at an upper side of the hinge plate and is cooperated with a lower end portion of the door body 30 located above the middle hinge assembly. The lower hinge shaft is located at a lower side of the hinge plate and is cooperated with an upper end portion of the door body 30 located below the middle hinge assembly.

For example, the mounting block 80 at the upper end portion of each door body 30 includes a trajectory block, and the mounting block at the lower end portion of each door body 30 includes a trajectory block and a locking block.

The above arrangement is a refrigerator in the form of the cross door, and the refrigerating compartment is located above the freezing compartment. The trajectory block at the upper end of the door body 30 for opening or closing the refrigerating compartment is the same as the trajectory block at the upper end of the door body 30 for opening or closing the freezing compartment. The trajectory block and the locking block at the lower end of the door body 30 for opening or closing the refrigerator compartment are the same as the trajectory block and the locking block at the lower end of the door body 30 for opening or closing the freezing compartment. The above arrangement increase the universality of the trajectory block and the locking block, thereby facilitating production and manufacturing and facilitating the assembly of the refrigerator 1.

It will be noted that some embodiments of the present disclosure are not limited to including four door bodies 30, but are also applicable to a refrigerator 1 including at least four door bodies 30.

In this embodiment, the mounting block 80 may be made of polyformaldehyde (POM). POM has strong friction resistance and may prolong the service life of the hinge assembly.

In this embodiment, the first trajectory groove 50, the second trajectory groove 60, and the locking structure are integrally formed to form the mounting block 80, thereby increasing the accuracy and the strength of the structure of the mounting block 80. For example, the mounting block 80 is integrally formed through injection molding.

In some embodiments, a limiting structure is disposed between the door body 30 and the hinge plate 40 for limiting the door body 30 to be opened to the maximum angle, thereby avoiding damage to the mounting block 80 in a case where the door is opened with a great force.

Figure 43:
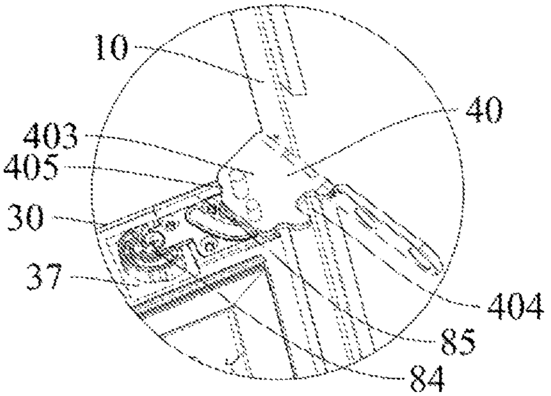
FIG. 43 is a perspective view of a hinge plate and a locking structure in a case where a door body is opened to a maximum angle in an embodiment 6 of a refrigerator, in accordance with some embodiments.
Figure 44:
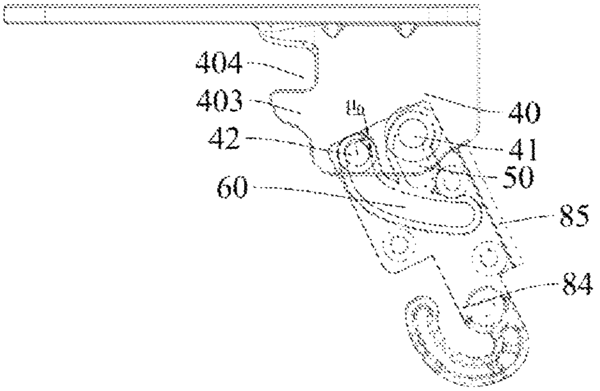
FIG. 44 is a structural diagram of a hinge plate and a locking structure in a case where a door body is opened to a maximum angle in an embodiment 6 of a refrigerator, in accordance with some embodiments.

Referring to FIGS. 43 and 44, the lower end of the door body 30 is provided with a limiting portion 85, and the limiting portion 85 is located at a front end of the mounting block 80 disposed at the lower end of the door body 30. The hinge plate 40 includes a limiting surface 405. The limiting surface 405 is disposed at an end of the hinge plate 40 away from the box body 10 and is proximate to the first body side wall. In a case where the door body 30 is rotated to the maximum angle $G_{max}$, the limiting portion 85 abuts against the limiting surface 405 of the hinge plate 40, thereby preventing the door body 30 from continuing to rotate.

Figure 45:
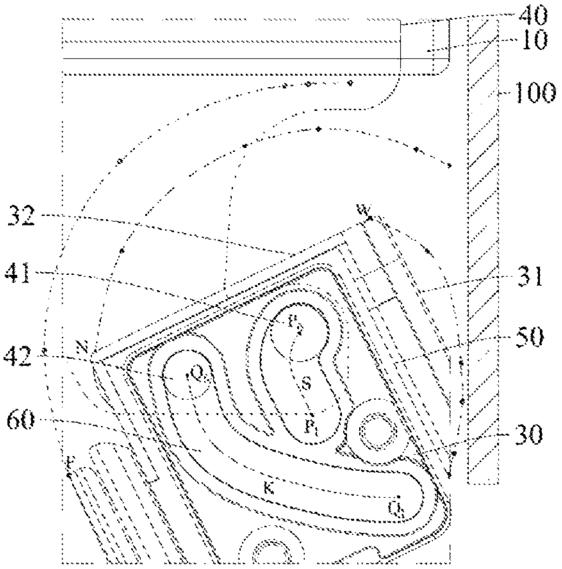
FIG. 45 is a schematic diagram showing relative positions of a first hinge shaft in contact with a first trajectory groove and a second hinge shaft in contact with a second trajectory groove in a case where a door body is opened to a maximum angle in an embodiment 7 of a refrigerator, in accordance with some embodiments.
Figure 46:
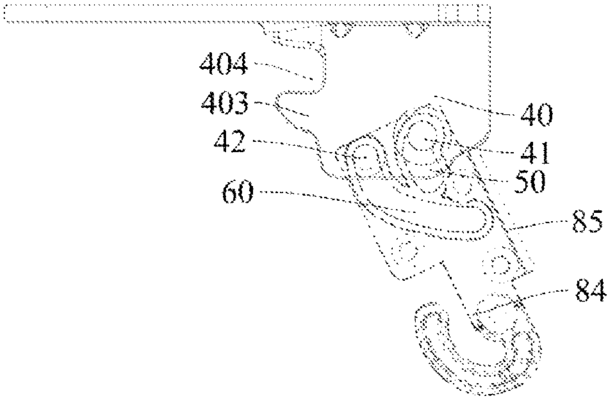
FIG. 46 is a structural diagram of a first hinge shaft in contact with a first trajectory groove and a second hinge shaft in contact with a second trajectory groove in a case where a door body is opened to a maximum angle in an embodiment 7 of a refrigerator, in accordance with some embodiments.

That is, referring to FIGS. 45 and 46, in a case where the positioning center axis P moves to the sixth positioning point $P_6$ and the guiding center axis Q moves to the sixth guiding point $Q_6$, the limiting portion 85 at the lower end of the door body 30 abuts against the limiting surface 405 of the hinge plate 40, thereby preventing the second hinge shaft 42 from interacting with the end portion of the second trajectory groove 60 proximate to the door side wall 32 and causing wear.

In this embodiment, as shown in FIGS. 35 and 36, the limiting portion 85 includes an embedded portion 851 and a limiting bar 852. The limiting portion 85 may be a sheet metal member.

The embedded portion 851 is plate-shaped and is installed in the accommodating groove 37 at the lower end of the door body 30. The plate body 81 of the mounting block 80 (the trajectory block) clamps the embedded portion 851 in the door body 30 from the lower end, so as to implement the fixation of the limiting portion 85 and the door body 30.

The limiting bar 852 is in a shape of a convex bar and is formed by the edge of the embedded portion 851 proximate to the door front wall 31 extending downward from the lower surface of the door body 30, so that in a case where the door body 30 drives the limiting portion 85 to rotate to the maximum angle, the limiting bar 852 is blocked by the limiting surface 405 of the hinge plate 40, thereby blocking the door body 30 and causing the door body 30 to stop rotating.

It can be understood that the limiting portion 85 is clamped and fixed in the door body 30 through the mounting block 80, and the connection structure between the limiting portion 85 and the door body 30 is omitted, thereby simplifying the product structure.

It will be noted that the limiting portion 85 may further be disposed at the upper end of the door body 30, and details will not be repeated herein.

In addition, with reference to the embodiment 3, the lock hook 82 is disposed on the door body 30 in the embodiment 6. In a case where the door body 30 is closed, the lock hook 82 is locked with the blocking portion 403 on the hinge plate 40. In the embodiment 3, the door body 30 is mainly rotated in the first phase, so that the lock hook 82 and the blocking portion 403 on the hinge assembly may be quickly separated, so as to quickly separate the door body 30 and the box body 10.

Embodiment 7

The embodiment 7 has the same principle as the embodiment 1 to the embodiment 6. The embodiment 7 mainly limits a setting method for the positions of the first hinge shaft 41 and the second hinge shaft 42 in a case where the door body 30 is opened to the maximum angle $G_{max}$.

In this embodiment, as shown in FIGS. 45 and 46, in a case where the door body 30 is opened to the maximum angle $G_{max}$, the first hinge shaft 41 is in contact with the end portion of the first trajectory groove 50 proximate to the door side wall 32, and the second hinge shaft 42 is in contact with the end portion of the second trajectory groove 60 proximate to the door side wall 32. The above arrangement enables the first hinge shaft 41 and the second hinge shaft 42 to move to the end portions of the first trajectory groove 50 and the second trajectory groove 60 simultaneously in a case where the door body 30 is opened to the maximum angle $G_{max}$ due to strong force. That is, the first hinge shaft 41 and the second hinge shaft 42 are interacted with the door body 30 simultaneously, which may reduce the stress on the hinge plate 40 and is conducive to improving the installation stability of the hinge assembly and the box body 10.

Embodiment 8

The embodiment 8 has the same principle as the embodiment 1 to the embodiment 7. Compared with the embodiment 7, and the embodiment 8 mainly limits another setting method for the positions of the first hinge shaft 41 and the second hinge shaft 42 in a case where the door body 30 is opened to the maximum angle $G_{max}$.

As shown in FIGS. 43 and 44, a limiting portion 85 is disposed at the lower end of the door body 30, and the limiting portion 85 is proximate to the door front wall 31. A position of the hinge plate 40 away from the box body 10 and proximate to the first body side wall is provided with a limiting surface 405. In a case where the door body 30 is rotated to the maximum angle $G_{max}$, the limiting portion 85 abuts against the limiting surface 405 of the hinge plate 40, thereby preventing the door body 30 from continuing to rotate.

In a case where the door body 30 is opened to the maximum angle $G_{max}$, the first hinge shaft 41 is in contact with the end portion of the first trajectory groove 50 proximate to the door side wall 32, there is a separation gap $\mu_0$ (i.e., the gap, see FIG. 44) between the second hinge shaft 42 and the end portion of the second trajectory groove 60 proximate to the door side wall 32, and the width of the separation gap $\mu_0$ is greater than 0 (i.e., $\mu_0>0$). In this way, in a case where the door body 30 is opened to the maximum angle $G_{max}$ due to a strong force, the limiting portion 85 is in contact with the hinge plate 40, the first hinge shaft 41 is in contact with (there is an interaction force) the end portion of the first trajectory groove 50, and the second hinge shaft 42 is not in contact with (no interaction force) the end portion of the second trajectory groove 60. The first hinge shaft 41 is closer to the limiting portion 85 than the second hinge shaft 42. The above arrangement may reduce the bending moment and stress on the hinge plate 40, which is conducive to improving the installation stability of the hinge assembly and the box body 10.

Embodiment 9

Figure 47:
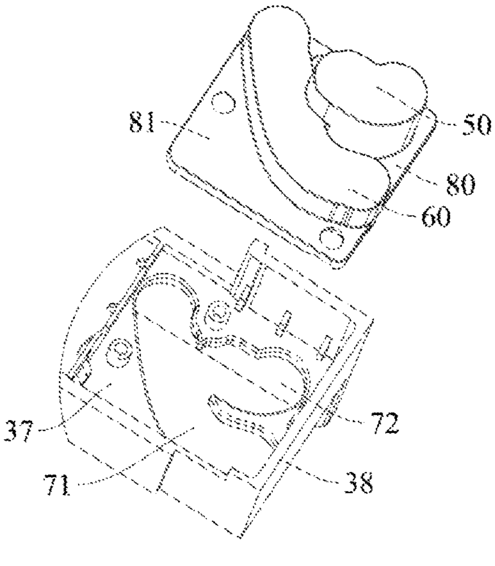
FIG. 47 is an exploded view of an upper end of a door body and a mounting block in an embodiment 9 of a refrigerator, in accordance with some embodiments.

The difference between the embodiment 9 and the above-mentioned embodiment 6 is the structural arrangement of the mounting block 80. In this embodiment, the mounting block 80 is divided into a trajectory block and a locking block. As shown in FIG. 47, the trajectory block is installed at a side of the door end cover 38 proximate to the inner cavity of the door body 30. As in the above embodiment, the trajectory block is installed on a position on the door body 30 opposite to the hinge plate 40, and the first trajectory groove 50 and the second trajectory groove 60 are formed in the trajectory block.

Referring to FIGS. 47 to 50, the embodiment takes the trajectory block disposed on the upper end of the door body 30 as an example for description. The trajectory block includes the first trajectory groove 50 and the second trajectory groove 60. The first trajectory groove 50 includes the groove bottom and the circumferential groove wall surrounding the edge of the groove bottom. The circumferential groove wall defines the groove opening disposed opposite to the groove bottom. The structure of the second trajectory groove 60 is the same as that of the first trajectory groove 50, and the difference is the shape of the grooves.

The trajectory block includes a plate body 81 in which the first trajectory groove 50 and the second trajectory groove 60 are formed. An accommodating groove 37 is formed on a side of the door end cover 38 located at the upper end of the door body 30 away from the hinge assembly. The plate body 81 is disposed in the accommodating groove 37, and the plate body 81 is cooperated with the circumferential groove wall of the accommodating groove 37. In this embodiment, the accommodating groove 37 is provided with a clamping member for fixing the plate body 81, so as to fixedly connect the trajectory block and the door body 30. For example, the plate body 81 and the door end cover 38 may further be fixedly connected through fasteners such as screws.

A position of the door end cover 38 proximate to the hinge assembly is provided with a first through hole 71 and a second through hole 72. A shape of the first through hole 71 is substantially the same as the shape of the groove opening of the first trajectory groove 50, and the shape of the second through hole 72 is substantially the same as the shape of the groove opening of the second trajectory groove 60. The trajectory block is installed at a side of the door end cover 38 away from the hinge assembly. That is, the trajectory block is installed inside the door body 30.

Figure 48:
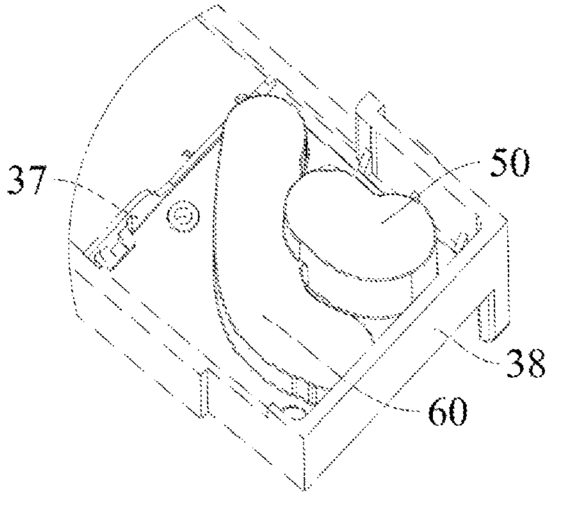
FIG. 48 is a schematic diagram showing an assembly structure of an upper end of a door body and a mounting block in an embodiment 9 of a refrigerator, in accordance with some embodiments.
Figure 49:
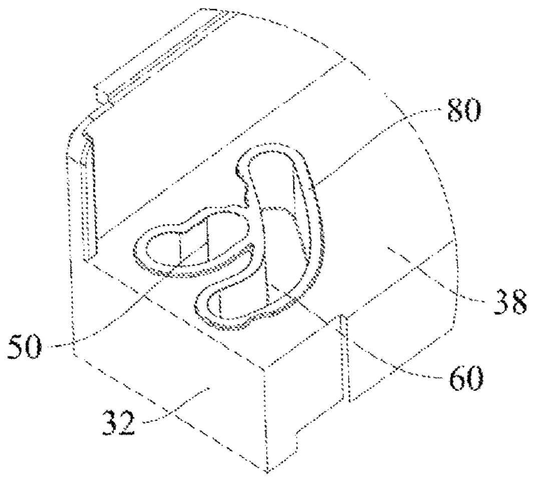
FIG. 49 is a schematic diagram showing an assembly structure of an upper end of a door body and a mounting block from another perspective in an embodiment 9 of a refrigerator, in accordance with some embodiments.

For example, referring to FIGS. 47 and 48, the plate body 81 of the trajectory block is cooperated with the end wall of the door end cover 38 proximate the hinge assembly, and is fixedly connected to the door body 30 through the clamping member. It will be noted that the trajectory block and the hinge assembly are respectively located at both sides of the end wall of the door end cover 38. The groove opening of the first trajectory groove 50 corresponds to the first through hole 71, and the groove opening of the second trajectory groove 60 corresponds to the second through hole 72. A side of the end wall of the door end cover 38 away from the hinge assembly is provided with a plurality of fixing columns, and a plurality of fixing holes matching with the fixing columns are formed on the plate body 81. The trajectory block may be quickly positioned on the door end cover 38 by installing the fixing columns in the fixing holes of the plate body 81.

Figure 50:
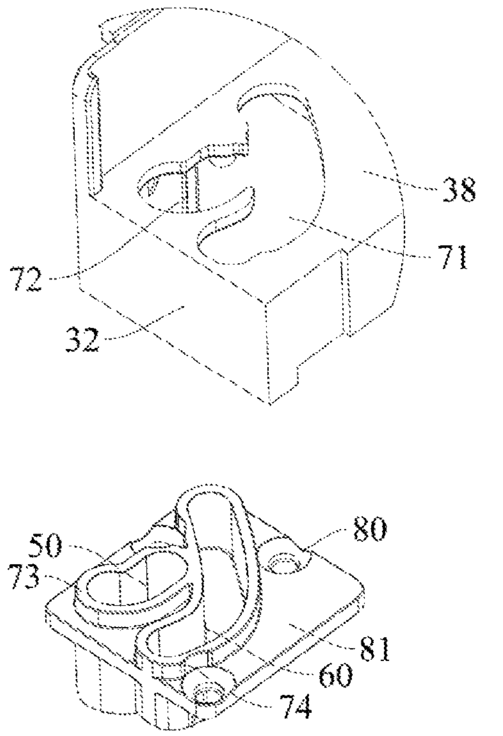
FIG. 50 is an exploded view of an upper end of a door body and a mounting block in an embodiment 9 of a refrigerator, in accordance with some embodiments.

In some embodiments, as shown in FIG. 50, the first trajectory groove 50 includes a first annular plate 73 located at a side of the plate body 81 away from the groove bottom of the first trajectory groove 50, and the first annular plate 73 defines the groove opening of the first trajectory groove 50. The second trajectory groove 60 includes a second annular plate 74 located at a side of the plate body 81 away from the groove bottom of the second trajectory groove 60. The second annular plate 74 defines the groove opening of the second trajectory groove 60.

The first annular plate 73 is installed in the first through hole 71, and the second annular plate 74 is installed in the second through hole 72. The plate body 81 is cooperated with the end plate of the door body 30 proximate to the hinge assembly. It is possible to accurately position and assemble the trajectory block and the door body 30 by combining the cooperation of the fixing holes on the plate body 81 and the fixing columns on the door end cover 38. The above assembly method of the trajectory block and the door end cover 38 in this embodiment enables the trajectory block to be hidden inside the door body 30, thereby improving the aesthetics of the door body 30 and reducing a cooperation gap between the door body 30 and the trajectory block, so as to facilitate cleaning the door body 30.

In some embodiments, the refrigerator includes at least two door bodies 30 arranged in pairs. The trajectory block is disposed at the upper end and/or the lower end of the door body 30. A trajectory block at an upper end of a door body 30 of the refrigerator 1 proximate to the first body side wall is the same as a trajectory block at a lower end of a door body 30 of the refrigerator 1 proximate to the second body side wall. A trajectory block at a lower end of the door body 30 of the refrigerator 1 proximate to the first body side wall is the same as a trajectory block at an upper end of the door body 30 of the refrigerator 1 proximate to the second body side wall.

It can be understood that the two door bodies 30 provided above need to be connected to the box body 10 through four trajectory blocks. A trajectory block located at an upper end of one door body 30 is the same as a trajectory block located at a lower end of another door body 30. In this way, the refrigerator 1 in this embodiment only needs to be provided with two structures of trajectory blocks with only trajectory grooves to satisfy the installation requirements, so as to improve the universality of the trajectory blocks and other components, which is conducive to reducing the manufacturing cost of the refrigerator 1.

Figure 51:
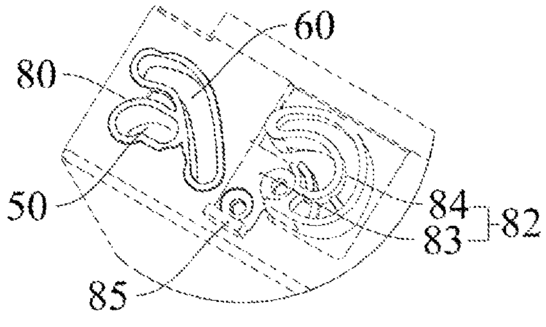
FIG. 51 is a schematic diagram showing an assembly structure of a lower end of a door body, a trajectory block and a locking block in an embodiment 9 of a refrigerator, in accordance with some embodiments.
Figure 52:
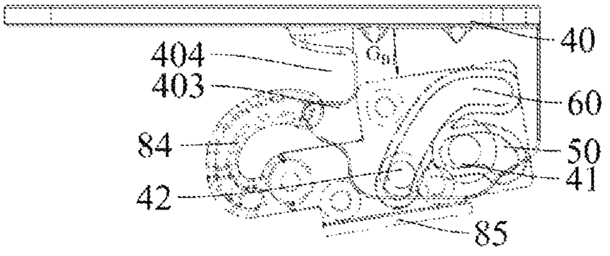
FIG. 52 is a structural diagram of a lower end of a door body, a trajectory block and a locking block in a case where a door body is closed to $G_{B1}$ in an embodiment 9 of a refrigerator, in accordance with some embodiments.

For example, as shown in FIGS. 51 and 52, the lower end of the door body 30 is provided with a locking block formed with a lock hook 82. The locking block is located at a side of the trajectory block away from the door side wall 32 and is installed in the accommodating groove 37 located at a side of the first through hole 71 and the second through hole 72 away from the door side wall 32.

The lock hook 82 includes a second connecting portion 83 and a hooking portion 84. The second connecting portion 83 is connected to the accommodating groove 37, and the hooking portion 84 is connected to the second connecting portion 83 and bent towards the side proximate to the door rear wall 33 and proximate to the door side wall 32. The screws pass through the second connecting portion 83 and are connected to the door body 30, so as to strengthen the connection strength between the second connecting portion 83 and the door body 30. In this way, in a case where the lock hook 82 disengages from the blocking portion 403, only the hooking portion 84 undergoes deformation.

It will be noted that the locking block in this embodiment is installed at a side of the door end cover 38 proximate to the hinge, that is, the locking block is fixedly installed on the door body 30 from the outside of the door body 30. The locking block in this embodiment has the same arrangement as the lock hook 82 in the above embodiment 6, and details will not be repeated herein. With reference to the embodiment 6, the hooking portion 84 is cooperated with the blocking portion 403, so as to implement unlocking or locking of the door body 30 and the box body 10.

That is, in this embodiment, the trajectory block is only provided with the trajectory grooves, and the trajectory block is installed at a side of the door end cover 38 away from the hinge assembly. Then, the lock hook 82 forms the locking block separately and is installed at the side of the door end cover 38 proximate to the hinge.

Embodiment 10

The arrangement of the embodiment 10 is the same as that of the embodiment 1 to the embodiment 9, and the difference is that in this embodiment, as shown in FIG. 29, the refrigerator 1 includes two door bodies 30 disposed oppositely, and the two door bodies 30 are cooperated with each other to open or close the access opening.

In a case where the two door bodies 30 are closed, a flipping beam 9 is disposed on the inner lining surface of one door body 30 proximate to another door body 30. The top wall of the storage compartment of the refrigerator 1 is provided with a guiding groove 14. The flipping beam 9 may be slidably engaged with the guiding groove 14, so as to implement the switching of different angles between the flipping beam 9 and the door body 30.

For example, referring to FIG. 29, in a case where the door body 30 is in an open state, the flipping beam 9 is substantially perpendicular to the door body 30. In a case where the door body 30 is closed, the flipping beam 9 is substantially parallel to the door body 30 and closes the gap between the two door bodies 30 and the box body 10, so as to effectively prevent cold air from overflowing.

For example, the flipping beam 9 includes a flipping beam back cover, which is rotatably connected to the door body 30 through a first door hinge and a second door hinge. And the flipping beam back cover is elastically connected to the two door hinges (i.e., the first door hinge and the second door hinge) through torsion springs. The first door hinge is located above the second door hinge. A guiding block 13 is fixed on the top of the flipping beam back cover. The guiding block 13 serves as a rotating component of the flipping beam 9 and is cooperated with the guiding groove 14, so as to implement the switching of different angles between the flipping beam 9 and the door body 30.

The first door hinge, the second door hinge, and the flipping beam back cover are all provided with through holes for inserting the torsion springs, and the torsion springs are used to connect the two door hinges to the flipping beam back cover. For example, the first door hinge and the flipping beam back cover are connected through a first torsion spring, and the second door hinge is connected to the flipping beam back cover through a second torsion spring. In a case where the flipping beam 9 is rotated around the two door hinges, the first torsion spring and the second torsion spring store elastic energy or release elastic energy, so that the flipping beam back cover is rotated stably or reset in time.

In a case where the door body 30 is opened, the flipping beam 9 is tightly attached to sides of the two door hinges fixed to the inner lining of the door body 30 due to the torsion force of the torsion springs (the first torsion spring and the second torsion spring).

Generally, during the closing process of the door body 30, the two hinge shafts move in corresponding trajectory grooves, and the door body 30 moves a certain distance to the outer side relative to the hinge assembly, so that the force that causes the flipping beam 9 to flip will be offset (or partially offset) as the door body 30 moves towards the outer side. Therefore, it may cause the guiding block 13 at the top of the flipping beam 9 to fail to complete the flip and be stuck after entering the guiding groove 14, thereby resulting in the door body 30 not being fully closed.

Figure 53:
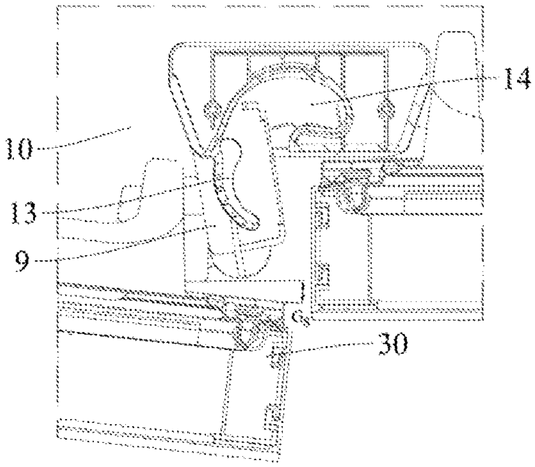
FIG. 53 is a structural diagram of a lower end of a door body, a trajectory block and a locking block in a case where a door body is closed to $G_S$ in an embodiment 9 of a refrigerator, in accordance with some embodiments.
Figure 54:
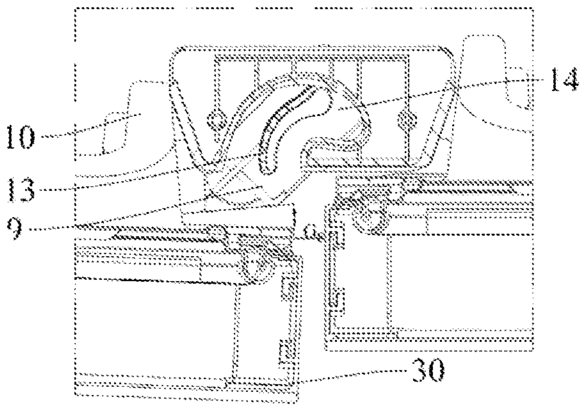
FIG. 54 is a structural diagram of a lower end of a door body, a trajectory block and a locking block in a case where a door body is closed to $G_F$ in an embodiment 9 of a refrigerator, in accordance with some embodiments.

As shown in FIGS. 53 and 54, when closing the door body 30, a closing force $F_W$ needs to be applied to the door body 30, and the door body 30 is gradually closed due to the action of the closing force $F_W$. In a case where the door body 30 is closed to the angle $G_S$ (i.e., a second cooperating angle), the guiding block 13 at the top of the flipping beam 9 is in contact with the guiding groove 14. During the process that the door body 30 continues to be closed (from angle $G_S$), the guiding block 13 starts to flip due to the pressure of the groove wall of the guiding groove 14, and the torsion springs are compressed in a radial direction thereof. In a case where the flipping beam 9 is flipped through the angle $G'_F$, a critical value of the torsion springs is reached. The torsion springs start to stretch after reaching the critical value and are cooperated with the pressure of the groove wall of the guiding groove 14 to quickly flip the flipping beam 9 in place until the door body 30 is completely closed. In a case where the door body 30 is completely closed, the torsion force of the torsion springs is released, and the torsion springs reach a relaxed state again. The flipping beam 9 is in contact with a seal disposed on the door body 30, which may effectively prevent cold air from overflowing between the two door bodies 30.

As above, corresponding to the flipping beam 9 flipping to $G'_F$, the closing angle of the door body 30 is $G_F$ (i.e., a second critical angle), and $G_S$ is greater than $G_F$ (i.e., $G_S>G_F$). For example, $G'_F$ is equal to 45°, that is, in a case where the flipping beam 9 is flipped to 45°, the critical value of the torsion springs is reached. $G_S$ is set to any value from 6° to 12°, and $G_F$ is set to any value from 3° to 5°. In a case where the door body 30 is closed to $G_F$, the flipping beam 9 is flipped. In the above phase after the flipping beam 9 is flipped to $G'_F$, the torsion springs stretch to release the torsion force. The torsion force released by the torsion springs in this phase is referred to as a flipping force $F_N$, and the flipping beam 9 is flipped in place due to the action of the flipping force $F_N$.

It will be noted that during the above flipping process of the flipping beam 9, the closing force $F_W$ may only continue until the door body 30 is closed to the angle $G_F$. That is, after the door body 30 is rotated and closed to the critical value of the torsion springs, the flipping beam 9 may automatically complete the flipping even if the closing force $F_W$ is removed.

In summary, during the process of the door body 30 being closed from $G_S$ to $G_F$, the torsion springs are compressed, and the hooking portion 84 undergoes elastic deformation due to the combined action of the closing force $F_W$ and the pressure of the groove wall of the guiding groove 14. In addition, in the closing phase after the door body 30 is closed to $G_F$, the flipping beam 9 completes flipping due to the combined action of the flipping force $F_N$ generated by the torsion springs and the pressure of the groove wall of the guiding groove 14.

Combined with the arrangement of the locking structure in the embodiment 6 or the embodiment 9, as shown in FIGS. 38 and 52, when closing the door body 30, the user applies a closing force $F_W$ to the door body 30, and the door body 30 is gradually closed due to the action of the closing force $F_W$. As the door body 30 is rotated and closed, the free end of the hooking portion 84 gradually approaches the blocking portion 403, and in a case where the door body 30 is closed to $G_{B0}$ (i.e., a first cooperating angle, see FIG. 40), the hooking portion 84 abuts against the blocking portion 403. As the door body 30 continues to be closed (due to the action of the closing force $F_W$), the blocking portion 403 is interacted with the hooking portion 84, the hooking portion 84 is elastically deformed, and the movable hooking portion 84 gradually enters the hook gap 404 (i.e., the blocking portion 403 enters the hooking portion 84).

In a case where the door body 30 continues to be closed to $G_{B1}$ (i.e., a first critical angle), the amount of elastic deformation of the hooking portion 84 reaches a preset threshold. That is, the amount of the elastic deformation of the hooking portion 84 reaches a maximum amount of deformation during the closing process of the door body 30. After the door body 30 continues to be closed to $G_{B1}$, the elastic energy stored in the elastic deformation of the hooking portion 84 is released, which, combined with the force exerted by the blocking portion 403, causes the hooking portion 84 to return to the relaxed state and drive the hooking portion 84 to further enter the hook gap 404, so that the door body 30 is automatically closed, and the lock hook 82 and the blocking portion 403 are locked, thereby implementing the locking of the door body 30 and the box body 10.

For example, $G_{B0}$ is greater than $G_{B1}$ (i.e., $G_{B0}>G_{B1}$). For example, $G_{B0}$ is set to any value from 15° to 20°, and $G_{B1}$ is set to any value from 3° to 8°. As mentioned above, in the phase after the door body 30 is closed to $G_{B1}$, the hooking portion 84 releases elastic energy. The force released by the hooking portion 84 in this phase is referred to as the locking force $F_S$. The locking force $F_S$ may prompt the door body 30 to close.

It will be noted that during the above closing process of the door body 30, the closing force $F_W$ may only continue until the door body 30 is closed to $G_{B1}$. That is, after the door body 30 is rotated and closed to the maximum amount of the elastic deformation of the hooking portion 84, the door body 30 may be automatically closed even if the closing force $F_W$ is removed.

In addition, in a case where the closing force $F_W$ is removed after the door body 30 is closed to $G_{B1}$, the door body 30 still has an inertial force $F_G$, so that the door body 30 maintains a movement tendency.

In summary, it can be seen that during the process the door body 30 being closed from $G_{B0}$ to $G_{B1}$, the hooking portion 84 undergoes elastic deformation due to the combined action of the closing force $F_W$ and the blocking portion 403. In a case where the door body 30 is closed to $G_{B1}$, the elastic deformation amount of the hooking portion 84 reaches the maximum amount of deformation during the closing process of the door body 30. During the process that the door body 30 continues to be closed from $G_{B1}$, the elastic force of the hooking portion 84 is released. Due to the combined action of the locking force $F_S$, the elastic force of the hooking portion 84, the force of the blocking portion 403 and the inertial force $F_G$, the door body 30 is closed quickly.

For example, the closing process of the door body 30 separately provided with the flipping beam or the hooking portion 84 has been illustrated above. Hereinafter, a closing process of a door body 30 provided with the flipping beam and the hooking portion 84 simultaneously will be illustrated.

Figure 55:
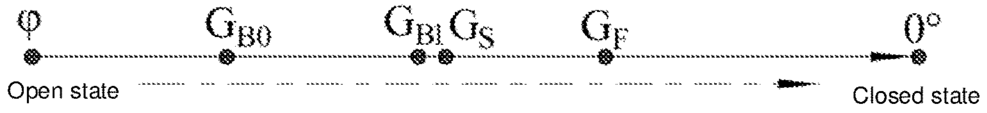
FIG. 55 is an schematic diagram showing a state of a lock hook and a blocking portion, and a state of a guiding block and a guiding groove in a case where $G_{B1}$ is greater than $G_S$ ($G_{B1}>G_S$) in an embodiment 10 of a refrigerator, in accordance with some embodiments.

As shown in FIG. 55, $G_{B1}$ is set to be greater than $G_S$ (i.e., $G_{B1}>G_S$). In a case where the door body 30 is closed to $G_{B1}$, that is, in a case where the elastic deformation amount of the hooking portion 84 reaches the maximum amount of deformation, the guiding block 13 at the top of the flipping beam 9 is not in contact with the guiding groove 14.

In this embodiment, the closing force $F_W$ starts from when the door body starts to be closed and continues until the door body is closed to $G_{B1}$, that is, after the door body 30 is closed to $G_{B1}$, the user may remove the closing force $F_W$, and the door body 30 will be automatically closed.

In a case where the door body 30 continues to be closed from $G_{B1}$ to $G_S$, the guiding block 13 is in contact with the guiding groove 14. During the process of the door body 30 continuing to be closed from $G_S$ to $G_F$, the door body 30 is closed due to the combined action of the locking force $F_S$, the elastic force of the hooking portion 84, the force of the blocking portion 403, and the inertial force $F_G$, the flipping beam 9 starts to flip due to the locking force $F_S$, the inertial force $F_G$, and the pressure of the groove wall of the guiding groove 14, and the torsion spring is compressed along the radial direction thereof.

During the process of the door body 30 continuing to be closed from $G_F$, the door body 30 continues to be closed due to the combined action of the locking force $F_S$, the elastic force of the hooking portion 84, the force of the blocking portion 403, and the inertial force $F_G$, and the flipping beam 9 is quickly flipped in place due to the combined action of the locking force $F_S$, the flipping force $F_N$, the inertial force $F_G$, and the pressure of the groove wall of the guiding groove 14.

In the above embodiment, $G_{B1}$ is set to be greater than $G_S$ (i.e., $G_{B1}>G_S$). In a case where the door body 30 is closed to $G_{B1}$ and the elastic deformation amount of the hooking portion 84 reaches the maximum amount of deformation, the guiding block 13 at the top of the flipping beam 9 is not in contact with the guiding groove 14. In this case, the locking force $F_S$ generated by the locking structure and the inertial force $F_G$ of the door body 30 may be utilized to promote the flipping of the flipping beam 9, so as to reduce the counteraction of the force that causes the flipping beam 9 to flip due to the rotation and the movement of the door body 30 towards the outer side during the closing process of the door body 30 and avoid the flipping beam 9 from being unable to effectively flip in place.

As above, during the closing process of the door body 30, the blocking portion and the locking structure after the door body 30 is closed to $G_{B1}$, the locking force $F_S$ continuously decays as the closing angle of the door body 30 is decreased.

For example, $G_{B1}$ is set to be equal to $G_S$. That is, in a case where the door body 30 is closed to $G_{B1}$ ($G_S$), the elastic deformation amount of the hooking portion 84 reaches the maximum amount of deformation, and the guiding block 13 starts to contact the guiding groove 14. In this way, the locking force $F_S$ generated by the locking structure and the inertial force $F_G$ of the door body 30 may be fully utilized to promote the flipping of the flipping beam 9, so as to reduce the counteraction of the force that causes the flipping beam 9 to flip due to the rotation and the movement of the door body 30 towards the outer side during the closing process of the door body 30 and avoid the flipping beam 9 from being unable to effectively flip in place.

For example, $G_{B1}$ is set to be in a range from $G_S$ to $G_S$+3° (i.e., $G_{B1}$ e [$G_S$, $G_S$+3°]), so as to avoid the excessive attenuation of the locking force $F_S$, which may cause the flipping beam 9 to fail to flip in place effectively after the door body 30 is closed to $G_{B1}$.

Combined with the embodiment 4, $G_S$ in this embodiment is equal to $G_0$. Based on the trajectory characteristics of the trajectory groove in the embodiment 4, in a case where the elastic deformation amount of the hooking portion 84 reaches the maximum amount of deformation, the guiding block 13 is not in contact with the guiding groove 14. During the process from that the guiding block 13 is in contact with the guiding groove 14 to the flipping beam 9 being flipped in place, the second hinge shaft 42 performs approximate rotational movement with the central axis of the first hinge shaft 41 as the rotational axis.

In this embodiment, based on the trajectory of the trajectory groove in the embodiment 1, in a case where the door body 30 is closed to $G_{B1}$, the first hinge shaft 41 is located at a first contact positioning point relative to the first trajectory groove 50, and the second hinge shaft 42 is located at a first contact guiding point relative to the second trajectory groove 60.

In a case where the door body 30 is closed to $G_S$, the first hinge shaft 41 is located at a second contact positioning point relative to the first trajectory groove 50, and the second hinge shaft 42 is located at a second contact guiding point relative to the second trajectory groove 60. It can be understood that in a case where $G_{B1}$ is set to be equal to $G_S$, the second contact positioning point is coincided with the first contact positioning point.

In a case where the door body 30 is closed to $G_F$, the first hinge shaft 41 is located at a third contact positioning point relative to the first trajectory groove 50, and the second hinge shaft 42 is located at a third contact guiding point relative to the second trajectory groove 60.

The first contact positioning point, the second contact positioning point, and the third contact positioning point are all located on the straight trajectory segment of the first trajectory line S, and the first contact positioning point, the second contact positioning point, the third contact positioning point and the first positioning point $P_1$ are arranged towards the direction away from the door side wall 32 in sequence. The first contact guiding point, the second contact guiding point, and the third contact guiding point are all located on the second trajectory line K, and the first contact guiding point, the second contact guiding point, the third contact guiding point, and the first guiding point $Q_1$ are arranged towards the direction proximate to the door front wall 31 and away from the door side wall 32 in sequence.

Figure 56:
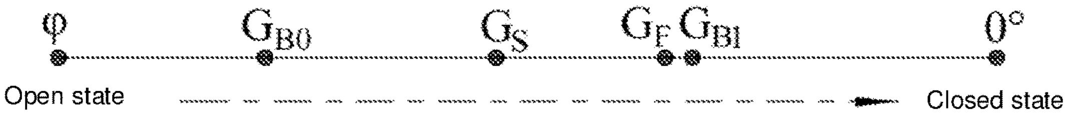
FIG. 56 is an schematic diagram showing a state of a lock hook and a blocking portion, and a state of a guiding block and a guiding groove in a case where $G_{B1}$ is less than $G_F$ ($G_{B1}<G_F$) in an embodiment 10 of a refrigerator, in accordance with some embodiments.

For example, as shown in FIG. 56, $G_F$ is set to be greater than $G_{B1}$, that is, in a case where the door body 30 is closed to $G_F$, the flipping beam 9 is flipped until the torsion springs reach the critical value, and the elastic deformation amount of the hooking portion 84 does not reach the maximum amount of deformation.

In this embodiment, the closing force $F_W$ starts from when the door body 30 starts to be closed and continues until the door body 30 is closed to $G_{B1}$. That is, in a case where the door body 30 is closed to $G_{B1}$, the closing force $F_W$ is removed and the door body 30 may be automatically closed in place.

In a case where the door body 30 continues to be closed from $G_F$ to $G_{B1}$, the door body 30 is rotated due to the combined action of the closing force $F_W$, the elastic force of the hooking portion 84 and the force of the blocking portion 403, and the flipping beam 9 is flipped due to the combined action of the closing force $F_W$, the flipping force $F_N$ and the pressure of the groove wall of the guiding groove 14. In a case where the door body 30 is closed to $G_{B1}$, the elastic deformation amount of the hooking portion 84 reaches the maximum amount of deformation.

In a case where the door body 30 continues to be closed from $G_{B1}$, the door body 30 is closed due to the combined action of the locking force $F_S$, the elastic force of the hooking portion 84 and the force of the blocking portion 403. The flipping beam 9 is flipped due to the combined action of the locking force $F_S$, the flipping force $F_N$, and the pressure of the groove wall of the guiding groove 14.

It can be understood that during the closing process of door body 30, after being closed to $G_F$, the movement of door body 30 towards the outer side may cause the flipping force $F_N$ to continuously decay. After the door body 30 is closed to $G_{B1}$, the locking force $F_S$ continuously decays as the closing angle of door body 30 is decreased.

Therefore, for example, $G_{B1}$ may be set to be in a range from $G_F-1°$ to $G_F$ (i.e., $G_{B1} \in (G_F-1°, G_F])$, so as to avoid excessive attenuation of the flipping force $F_N$ and the locking force $F_S$. In this way, the door body 30 may be quickly closed in place and the flipping beam 9 may be quickly flipped in place.

In this embodiment, combined with the trajectory of the trajectory groove in the embodiment 1, the positions of the first hinge shaft 41 and the second hinge shaft 42 relative to the first trajectory groove 50 and the second trajectory groove 60, respectively, during the closing process of the door body 30, are as follows.

In a case where the door body 30 is closed to $G_{B1}$, the first hinge shaft 41 is located at the first contact positioning point relative to the first trajectory groove 50, and the second hinge shaft 42 is located at the first contact guiding point relative to the second trajectory groove 60.

In a case where the door body 30 is closed to $G_F$, the first hinge shaft 41 is located at the third contact positioning point relative to the first trajectory groove 50, and the second hinge shaft 42 is located at the third contact guiding point relative to the second trajectory groove 60.

The first contact positioning point and the third contact positioning point are both located on the straight trajectory segment of the first trajectory line S, and the third contact positioning point, the first contact positioning point and the first positioning point $P_1$ are arranged in the direction away from the door side wall 32 in sequence. The first contact guiding point and the third contact guiding point are both located on the second trajectory line K, and the third contact guiding point, the first contact guiding point, and the first guiding point $Q_1$ are arranged in the direction away from the door side wall 32 and proximate to the door front wall 31 in sequence.

In this embodiment, $G_S$ is set to be equal to $G_{B0}$, that is, in a case where the guiding block 13 is in contact with the guiding groove 14, the hooking portion 84 is in contact with the blocking portion 403. Due to the action of the closing force $F_W$, the torsion springs of the flipping beam 9 and the hooking portion start to deform synchronously to accumulate elastic energy, and then release the elastic energy one after another. In this way, the synchronization of the movement of the torsion spring and the hooking portion may be effectively improved, the time for the user to apply the closing force $F_W$ during the opening process of the door body 30 is reduced, which may improve the user experience.

Figure 57:
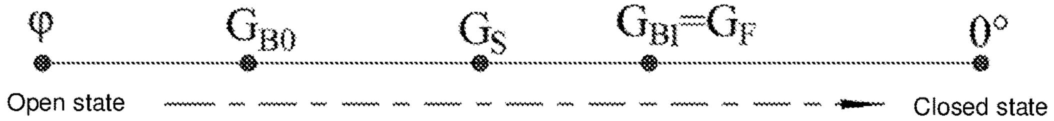
FIG. 57 is an schematic diagram showing a state of a lock hook and a blocking portion, and a state of a guiding block and a guiding groove in a case where $G_{B1}$ is equal to $G_F$ in an embodiment 10 of a refrigerator, in accordance with some embodiments.

For example, as shown in FIG. 57, $G_{B1}$ is set to be equal to $G_F$, that is, in a case where the door body 30 is closed to $G_{B1}$, the elastic deformation amount of the hooking portion 84 reaches the maximum amount of deformation, and the flipping beam 9 is flipped until the torsion springs reach the critical value.

In this embodiment, the closing force $F_W$ starts from when the door body 30 starts to be closed and continues until the door body 30 is closed to $G_{B1}$ ($G_F$). That is, in a case where the door body 30 is closed to $G_{B1}$, the closing force $F_W$ is removed and the door body 30 is automatically closed in place.

During the process of the door body 30 being closed from $G_{B0}$ to $G_{B1}$, the door body 30 continues to be closed due to the combined action of the closing force $F_W$, the elastic force of the hooking portion 84 and the force of the blocking portion 403, the flipping beam 9 is flipped due to the combined action of the closing force $F_W$ and the pressure of the groove wall of the guiding groove 14, and the torsion springs are compressed to store elastic potential energy.

In a case where the door body 30 is closed to $G_{B1}$ ($G_F$), the elastic deformation amount of the hooking portion 84 reaches the maximum amount of deformation, and the flipping beam 9 is flipped until the torsion springs reach the critical value.

In a case where the door body 30 continues to be closed from $G_{B1}$ ($G_F$), the door body 30 continues to be closed due to the action of the locking force $F_S$, the elastic force of the hooking portion 84, and the blocking portion 403. The flipping beam 9 is flipped in place due to the combined action of the locking force $F_S$, the flipping force $F_N$, and the pressure of the groove wall of the guiding groove 14.

In the above embodiment, $G_{B1}$ is set to be equal to $G_F$. That is, in a case where the door body 30 is closed to $G_{B1}$ ($G_F$), and the elastic deformation amount of the hooking portion 84 reaches the maximum amount of deformation, the flipping beam 9 is flipped until the torsion springs reach the critical value, the mutual promotion effect of the flipping force $F_N$ and the locking force $F_S$ may be fully utilized, so as to enable the door body 30 to be quickly closed in place and the flipping beam 9 to be quickly flipped in place. Therefore, during the closing process of the door body 30, the counteraction of the force that causes the flipping beam 9 to flip due to the rotation and the movement of the door body 30 towards the outer side may be reduced, and the flipping beam 9 may be avoided from being unable to effectively flip.

As above, during the closing process of the door body 30, after the door body 30 is closed to $G_{B1}$ ($G_F$), the door body 30 moves towards the outer side during the closing process, causing the flipping force $F_N$ to continuously decay. In addition, as the closing angle of the door body 30 is decreased, the locking force $F_S$ continues to be decreased.

In this embodiment, since $G_{B1}$ is equal to $G_F$, in a case where the flipping force $F_N$ and the locking force $F_S$ are both maximum, the flipping force $F_N$ and the locking force $F_S$ promote each other simultaneously, thereby fully expanding the angle range of the flipping of the flipping beam 9 promoted by the locking force $F_S$.

In this embodiment, based on the limitation of the trajectory of the trajectory groove in the embodiment 1, in a case where the door body 30 is closed to $G_{B1}$ ($G_F$), the first hinge shaft 41 is located at the first contact positioning point relative to the first trajectory groove 50, and the second hinge shaft 42 is located at the first contact guiding point relative to the second trajectory groove 60.

The first contact positioning point is located on the straight trajectory segment of the first trajectory line S, and the first contact positioning point and the first positioning point $P_1$ are arranged towards the direction away from the door side wall 32 in sequence. The first contact guiding point is located on the second trajectory line K, and the first contact guiding point and the first guiding point $Q_1$ are arranged towards the direction away from the door side wall 32 and proximate to the door front wall 31 in sequence.

In this embodiment, $G_S$ is set to be equal to $G_{B0}$, that is, in a case where the guiding block 13 is in contact with the guiding groove 14, the hooking portion 84 is in contact with the blocking portion 403. In this way, due to the action of the closing force $F_W$, the torsion springs and the hooking portion of the flipping beam 9 start to deform simultaneously and accumulate elastic energy, and then release the elastic energy one after another, thereby effectively improving the synchronization of the movements of the torsion spring and the hooking portion and reducing the time for the user to apply the closing force $F_W$ during the opening process of the door body 30, which may improve the user experience.

Embodiment 11

Figure 58:
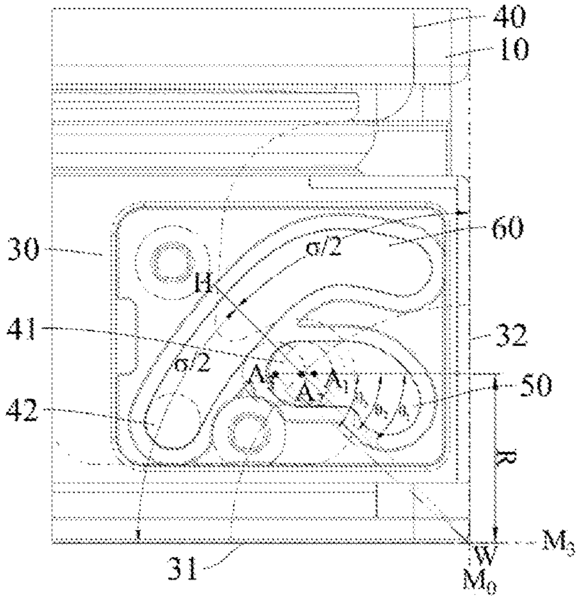
FIG. 58 is a schematic diagram showing a structure of a hinge in a case where a door body is in a closed state in an embodiment 11 of a refrigerator, in accordance with some embodiments.

The arrangement of the embodiment 11 is the same as that of the embodiment 1 to the embodiment 10, and the difference is that in this embodiment, as shown in FIG. 58, an angle bisecting plane of the angle formed by the door front wall 31 and the door side wall 32 is referred to as an angle bisecting plane H (i.e., a reference angle bisecting plane). A dihedral angle formed by the third reference plane $M_3$ and the datum plane $M_0$ is referred to as a first included angle $\sigma$, which is equal to 90°. In a case where the door body 30 is closed, the angle bisecting plane H bisects the first included angle $\sigma$.

It will be noted that an angle bisecting plane of the dihedral angle formed by the third reference plane $M_3$ and the datum plane $M_0$ (remaining stationary) is the angle bisecting plane H formed by the door front wall 31 and the door side wall 32 in a case where the door body 30 is closed. That is, the angle bisecting plane H in a case where the door body 30 is closed is also a bisecting plane of the included angle between the third reference plane $M_3$ and the datum plane $M_0$. During the opening process of the door body 30 relative to the box body 10, the angle bisecting plane H moves with the door body 30 relative to the box body 10.

In this embodiment, the first side edge W is located on the datum plane $M_0$ in a case where the door body 30 is closed, that is, the first side edge W is an intersection line of the third reference plane $M_3$ and the datum plane $M_0$ in a case where the door body 30 is closed.

Figure 59:
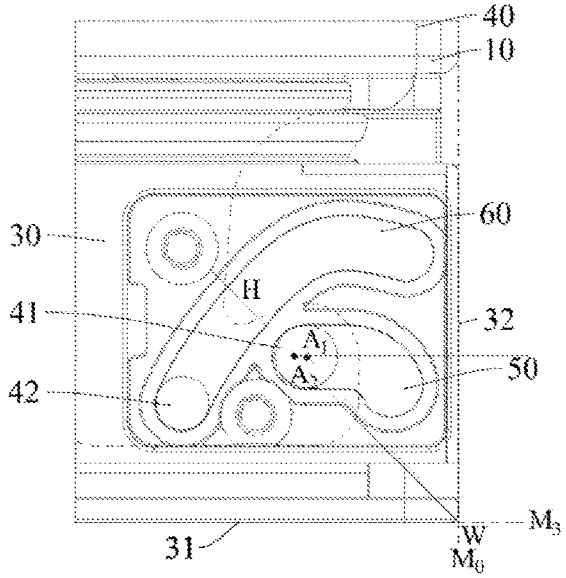
FIG. 59 is a schematic diagram showing a structure of a hinge in a case where a door body is in a closed state and a first positioning point $P_1$ is located at a side of an angle bisecting plane H proximate to a door side wall in an embodiment 11 of a refrigerator, in accordance with some embodiments.
Figure 60:
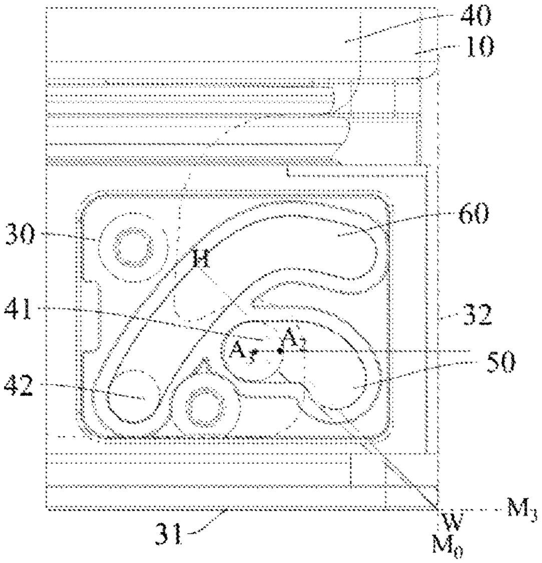
FIG. 60 is a schematic diagram showing a structure of a hinge in a case where a door body is in a closed state and a first positioning point $P_1$ is located at a side of an angle bisecting plane H away from a door side wall in an embodiment 11 of a refrigerator, in accordance with some embodiments.

Referring to FIGS. 58 to 60, the first included angle $\sigma$ formed by the door front wall 31 and the door side wall 32 is equal to 90°.

In a case where the door body 30 is closed, the positioning central axis P is located at the first positioning point $P_1$ of the first trajectory S. An included angle between the line segment WP and the straight trajectory segment on the first trajectory line S is referred to as $\theta$ (e.g., $\theta \in [0, \pi/2]$). A distance between the first side edge W and a straight line where the straight trajectory segment on the first trajectory line S is located is R, and R is a constant value.

In a case where the door body 30 is rotated and opened with the first hinge shaft 41 (positioning center axis P) as the rotational axis, and in a case where the door body 30 is rotated until WP is parallel to the second reference plane $M_2$, a distance E between the first side edge W and the datum plane $M_0$ is the greatest. For example, $E_{max}$=R/sin θ−R cot θ=R (1/sin θ−cot θ). During this process, the door body 30 is rotated around the first hinge shaft 41 by an angle θ.

A first derivative of $E_{max}$ with respect to the angle θ is as follows:

$$\begin{aligned} E'_{max} &= R[(1/\sin\theta)' - \cot'\theta] \\ &= R[-\cos\theta/\sin^2\theta + 1/\sin^2\theta]. \\ &= (R/\sin^2\theta) \times (1-\cos\theta) > 0 \end{aligned}$$

It can be seen that $E_{max}$=R/sin θ−R cot θ=R(1/sin θ−cot θ) is an increasing function with respect to θ.

As shown in FIG. 58, an intersection point of the straight trajectory segment of the first trajectory line S and the angle bisecting plane H is referred to as a second setting position $A_2$. A point on the first trajectory line S located at a side of the angle bisecting plane H proximate to the door side wall 32 is referred to as a first setting position $A_1$. A point on the straight trajectory segment of the first trajectory line S located at a side of the angle bisecting plane H away from the door side wall 32 is referred to as a third setting position $A_3$. An included angle between $WA_1$ and the straight trajectory segment of the first trajectory line is referred to as $\theta_1$, an included angle between $WA_2$ and the straight trajectory segment of the first trajectory line is referred to as $\theta_2$, and an included angle between $WA_3$ and the straight trajectory segment of the first trajectory line is referred to as $\theta_3$. For example, $\theta_1$ is greater than $\theta_2$, and $\theta_2$ is greater than $\theta_3$ (i.e., $\theta_1 > \theta_2 > \theta_3$).

Since $E_{max}$=R/sin θ−R cot θ is an increasing function with respect to θ, it can be obtained that $E_{max}(\theta_1)$ is greater than $E_{max}(\theta_2)$, and $E_{max}(\theta_2)$ is greater than $E_{max}(\theta_3)$ (i.e., $E_{max}(\theta_1) > E_{max}(\theta_2) > E_{max}(\theta_3)$).

In summary, in a case where the first positioning point $P_1$ is set at the first setting position $A_1$ when the door body 30 is closed, if the door body 30 only performs rotational movement around the rotational axis (e.g., the first hinge shaft 41), a distance of the first side edge W exceeding the datum plane $M_0$ during the rotation of the door body 30 is the greatest.

In a case where the first positioning point $P_1$ is set at the third setting position $A_3$ when the door body 30 is closed, if the door body 30 only performs rotational movement around the rotational axis (e.g., the first hinge shaft 41), a distance of the first side edge W exceeding the datum plane $M_0$ during the rotation of the door body 30 is the least.

Therefore, in order to implement embedding the door body 30 into the cabinet 100 for use, the greater the distance between the first positioning point $P_1$ and the door side wall 32 in a case where the door body 30 is closed, the less the displacement compensation amount required for the door body 30 to move towards the inner side while rotating.

Considering the stability of the rotation and the movement of the door body 30, the first hinge shaft 41 may be disposed on the angle bisecting plane H.

In summary, in this embodiment, for the first trajectory groove 50 and the second trajectory groove 60 whose relative positional relationship remains unchanged, in a case where the position of the first positioning point $P_1$ of the first trajectory groove 50 relative to the angle bisecting plane H is different when the door body 30 is closed, a distance between the door body 30 and the first reference plane $M_1$ is different when the door body 30 is rotated and opened to 90°.

For example, as the distance between the first positioning point $P_1$ of the first trajectory groove 50 and the door side wall 32 is set to be increased, the distance between the door body 30 and the first reference plane $M_1$ will be increased when the door body 30 is rotated and opened to 90°, so that the maximum angle at which the door body 30 may be opened is increased.

For example, referring to FIG. 9, in a case where the door body 30 is opened to 90°, the distance between the door front wall 31 and the datum plane $M_0$ is referred to as a first distance λ. In a case where the door front wall 31 is located at the inner side of the datum plane $M_0$, the first distance λ is referred to as a positive number.

For example, as shown in FIG. 59, in a case where the first positioning point $P_1$ is set to be located at the first setting position $A_1$ when the door body 30 is closed, the first distance λ is equal to 0 when the door body 30 is opened to 90°, and the door front wall 31 is flush with the datum plane $M_0$. In this embodiment, an absolute value of $A_1A_2$ is greater than 0 mm and less than or equal to 2 mm (i.e., $|A_1A_2| \in (0, 2]$, unit: mm). In this way, it may be ensured that the positioning center axis P is proximate to the angle bisecting plane H, so as to ensure the stability of the movement of the first hinge shaft 41 relative to the door body 30. In addition, it may be ensured that the door body 30 does not exceed the datum plane $M_0$ when being opened to 90°, thereby avoiding the interference between the door body 30 and the cabinet 100.

For example, as shown in FIG. 60, in a case where the first positioning point $P_1$ is set to be located at the third setting position $A_3$ when the door body 30 is closed, the door front wall 31 is located at the inner side of the datum plane $M_0$ when the door body 30 is opened to 90°, and the first distance λ is greater than 0. For example, A is greater than or equal to 0.5 mm and less than or equal to 2 mm (i.e., $\lambda \in [0.5, 2]$, unit: mm).

In this case, the door body 30 is located at the inner side of the datum plane $M_0$, which facilitates the door body 30 of the refrigerator 1 embedded in the cabinet 100 to be opened to a greater angle. For example, an absolute value of $A_3A_2$ is greater than 0 mm and less than or equal to 2 mm (i.e., $|A_3A_2| \in (0, 2]$, unit: mm). In this way, it may be ensured that the positioning center axis P is proximate to the angle bisecting plane H, so as to ensure the stability of the movement of the first hinge shaft 41 relative to the door body 30. In addition, it may be ensured that the door body 30 is located at the inner side of the datum plane $M_0$ when being opened to 90°, which facilitates the door body 30 of the refrigerator 1 embedded in the cabinet 100 to be opened to a greater angle.

In this embodiment, the door front wall 31 is coplanar with the third reference plane $M_3$, and the door side wall 32 is coplanar with the datum plane $M_0$. The angle bisecting plane H is also an angle bisecting plane of the included angle between the door front wall 31 and the door side wall 32. In a case where the door body 30 is rotated and opened to 45° around the first hinge shaft 41, the angle bisecting plane H is parallel to the third reference plane $M_3$. In a case where the door body 30 is opened to 90°, the door front wall 31 is parallel or coplanar with the datum plane $M_0$.

For example, in a case where the door body 30 is opened to substantially 45°, the first hinge shaft 41 moves to the end portion (i.e., the third positioning point $P_3$) of the straight trajectory segment of the first trajectory line S proximate to the door side wall 32. For example, in a case where the first hinge shaft 41 moves to the end portion of the straight trajectory segment of the first trajectory line S proximate to the door side wall 32, the opening angle of the door body 30 is any angle from 43° to 47°. That is, in this embodiment, $G_2$ is greater than or equal to 43° and less than or equal to 47° (i.e., $G_2 \in [43°, 47°]$).

A person skilled in the art will understand that the scope of disclosure in the present disclosure is not limited to specific embodiments discussed above, and may modify and substitute some elements of the embodiments without departing from the spirits of this application. The scope of this application is limited by the appended claims.

What is claimed is:

1. A refrigerator, comprising:

a box body, including a plurality of storage compartments, an inner container defining the plurality of storage compartments, a shell forming an appearance of the refrigerator, and a heat insulation layer disposed between the inner container and the shell; wherein the box body includes a first body side wall and a second body side wall disposed opposite to each other; the plurality of storage compartments include a refrigerating compartment and a freezing compartment located below the refrigerating compartment, and an access opening is provided at a front end of any one storage compartment of the plurality of storage compartments;

a refrigeration device used for supplying cold air to the plurality of storage compartments;

at least one door body connected to the box body and used to open and close the access opening corresponding to the any one storage compartment of the plurality of storage compartments; each door body of the at least one door body includes:

a door front wall disposed away from the box body in a case where the door body is closed, a door rear wall disposed opposite to the door front wall and proximate to the box body, and a door side wall disposed proximate to a hinge assembly and connected to the door front wall;

a first side edge W provided by an intersection of the door front wall and the door side wall of the door body; and a second side edge N provided by an intersection of the door side wall and the door rear wall; wherein in a case where the door body is closed, the first side edge W is located at a side of the second side edge N away from the box body;

the hinge assembly including a hinge plate fixedly connected to the box body; the hinge plate including a connecting portion connected to the box body, an extending portion extending from the connecting portion towards a front side and in a shape of a horizontal plate, and a first hinge shaft and a second hinge shaft integrally provided on the extending portion; wherein in a case where the door body is in a closed state, the first hinge shaft is located at a side of the second hinge shaft proximate to the door side wall and proximate to the door rear wall; and a mounting block including a plate body and a first trajectory groove and a second trajectory groove provided on the plate body; a lower end surface of the door body being provided with an accommodating groove, and the mounting block being located in the accommodating groove and being fixedly connected to the door body;

wherein the first hinge shaft is adapted to the first trajectory groove, and the second hinge shaft is adapted to the second trajectory groove; during a process of the door body rotating to open or close, the first hinge shaft moves relative to the first trajectory groove, and the second hinge shaft moves relative to the second trajectory groove;

wherein the first trajectory groove includes a curved groove segment; an end of the curved groove segment extends in a direction proximate to the first side edge W, and a distance between the curved groove segment and the door side wall is decreased along a direction from the door rear wall to the door front wall; an end of the second trajectory groove is farther away from the door rear wall and the door side wall than another end of the second trajectory groove;

wherein a center trajectory line of the first trajectory groove is referred to as a first trajectory line S, and a center trajectory line of the second trajectory groove is referred to as a second trajectory line K; a center axis of the first hinge shaft is referred to as a positioning center axis P, and a center axis of the second hinge shaft is referred to as a guiding center axis Q;

in a case where the door body is in the closed state, the positioning center axis P is located at a first positioning point $P_1$ of the first trajectory line S, and the guiding center axis Q is located at a first guiding point $Q_1$ of the second trajectory line K; in a case where the door body is opened to a maximum angle $G_{max}$, the positioning center axis P is located at a sixth positioning point $P_6$ of the first trajectory line S, and the guiding center axis Q is located at a sixth guiding point $Q_6$ of the second trajectory line K;

wherein the first positioning point $P_1$ is an end point that the positioning center axis P reaches away from the door side wall when the positioning center axis P moves along the first trajectory line S; the sixth positioning point $P_6$ is an end point that the positioning center axis P reaches proximate to the door side wall when the positioning center axis P moves along the first trajectory line S; the first guiding point $Q_1$ is an end point that the guiding center axis Q reaches away from the door side wall when the guiding center axis Q moves along the second trajectory line K; the sixth guiding point $Q_6$ is an end point that the guiding center axis Q reaches proximate to the door side wall when the guiding center axis Q moves along the second trajectory line K;

wherein a distance between the first positioning point $P_1$ and the door front wall is referred to as $D_1$, and a distance between the sixth positioning point $P_6$ and the door front wall is referred to as $D_2$, a distance between the first guiding point $Q_1$ and the door front wall is referred to as $Z_1$, and a distance between the sixth guiding point $Q_6$ and the door front wall is referred to as $Z_2$, wherein $Z_1<D_2$;

in a case where the door body is in the closed state, a distance between the first hinge shaft and the second hinge shaft in a first direction parallel to the door side wall is referred to as $L_1$, and $L_1$ is equal to a difference between $D_1$ and $Z_1$; $L_1$ is any value in a range from 2.5 mm to 10 mm; a distance between the first hinge shaft and the second hinge shaft in a second direction perpendicular to the door side wall is referred to as $L_2$, and $L_2$ is any value in a range from 7.5 mm to 30 mm;

wherein there is a first gap $J_1$ between an end surface of the first hinge shaft away from the hinge plate and a groove bottom of the first trajectory groove, and there is a second gap $J_2$ between an end surface of the second hinge shaft away from the hinge plate and a groove bottom of the second trajectory groove; the second gap $J_2$ is greater than or equal to the first gap $J_1$;

wherein the mounting block further includes a lock hook disposed on the plate body and located at a side of the plate body away from the door side wall; the lock hook includes a hooking portion extending towards a side away from the door side wall and bent to a side proximate to the door rear wall; the lock hook is provided with an opening facing towards the plate body; a free end of the lock hook is closer to the door rear wall than a fixed end of the lock hook; and a side of the hinge plate away from the first body side wall is provided with a blocking portion; a side of the blocking portion proximate to the box body is provided with a hook gap;

in a case where the door body is in the closed state, the free end of the lock hook is accommodated in the hook gap, so that the lock hook is locked with the hinge plate to lock the door body; in a case where the door body is opened, the lock hook is deformed due to force and is disengaged from the blocking portion;

the hinge plate includes a limiting surface; and the limiting surface is disposed at an end of the hinge plate away from the box body and is proximate to the first body side wall;

a lower end portion of a door body proximate to the hinge assembly is provided with a limiting portion; the limiting portion includes an embedded portion and a limiting bar; the limiting portion is a sheet metal member; wherein the embedded portion is plate-shaped; the mounting block is located at a side of the embedded portion away from the door body, and the mounting block is used to clamp and fix the embedded portion on the door body;

the limiting bar extends out of a surface of the door body from an edge of the embedded portion proximate to the door front wall towards a side away from the door body the surface of the door body;

in a case where the door body is opened from the closed state to the maximum angle $G_{max}$, the limiting bar abuts against the limiting surface to prevent the door body from rotating; and wherein an angle bisecting plane of an included angle provided by the door front wall and the door side wall is referred to as an angle bisecting plane H; in a case where the door body is closed, a central axis of the first hinge shaft is located at a side of the angle bisecting plane H away from the door side wall.

2. The refrigerator according to claim 1, wherein the at least one door body includes two door bodies; the two door bodies are disposed opposite to each other;

the refrigerator further comprises:

a torsion spring;

a flipping beam disposed at an end of one of the two door bodies proximate to another of the two door bodies; the flipping beam being connected to the one of the two door bodies through a door hinge; the flipping beam and the door hinge being elastically connected through the torsion spring;

a guiding groove disposed in a top wall of the any one storage compartment; and a guiding block disposed at a top end of the flipping beam, and cooperated with the guiding groove, so as to implement a switching of different angles between the flipping beam and a corresponding door body;

wherein during a process of the one of the two door bodies being closed from an open state, in a case where the one of the two door bodies is closed to an angle $G_{B0}$, the hooking portion is in contact with the blocking portion;

in a case where the one of the two door bodies continues to be closed, the blocking portion is interacted with the hooking portion, the hooking portion is elastically deformed, and the hooking portion enters the hook gap;

in a case where the one of the two door bodies is closed to an angle $G_S$, the guiding block at the top end of the flipping beam is in contact with the guiding groove; and during a process of the one of the two door bodies continuing to be closed, the guiding block is flipped due to a pressure of a groove wall of the guiding groove.

3. The refrigerator according to claim 2, wherein in a case where the door body is opened from the closed state to the maximum angle $G_{max}$, the first hinge shaft is in contact with an end portion of the first trajectory groove proximate to the door side wall, and the second hinge shaft is in contact with an end portion of the second trajectory groove proximate to the door side wall.

4. The refrigerator according to claim 2, wherein the first trajectory line S includes two trajectory segments extending in different directions, and a connection point of the two trajectory segments is referred to as a second positioning point $P_2$; the first trajectory line S extends from an end thereof away from the door side wall to a direction proximate to the door side wall;

wherein a second angle $G_2$ is an unlocking angle; in a case where the door body is opened to the second angle $G_2$, the central axis of the first hinge shaft moves along the first trajectory line to the second positioning point $P_2$, and the lock hook is disengaged from the blocking portion;

an end point of the central axis of the first hinge shaft on the first trajectory line S proximate to the door side wall is referred to as a sixth positioning point $P_6$; during a process of the door body opening from the second angle $G_2$ to the maximum angle $G_{max}$, the central axis of the first hinge shaft moves along the first trajectory line S towards a direction proximate to the door side wall to the sixth positioning point $P_6$, and a central axis of the second hinge shaft moves along the second trajectory line K towards a direction proximate to the door side wall to the sixth guiding point $Q_6$; and in a case where the door body is opened to the maximum angle $G_{max}$, the limiting portion abuts against the limiting surface to prevent the door body from opening;

wherein the second angle $G_2 < 90° <$ the maximum angle $G_{max}$.

5. The refrigerator according to claim 2, wherein a plane where the access opening of the any one storage compartment is located is referred to as a second reference plane $M_2$; in a case where the door body is closed, a line intersecting a plane where the door front wall is located and a plane where the door side wall is located provides the first side edge W; a plane passing through the first side edge W and parallel to the second reference plane $M_2$ is referred to as a third reference plane $M_3$;

wherein in a case where the door body is closed, the door front wall is coplanar with the third reference plane $M_3$; in a case where the door body is closed, the door front wall is parallel to the second reference plane $M_2$; a fourth gap $\mu_2$ is provided between the second hinge shaft and an end wall of the second trajectory groove away from the door side wall, and a width of the fourth gap $\mu_2$ is greater than 0; and in a case where the door body is in the closed state and continues to squeeze a door seal, the door front wall moves to a side of the third reference plane $M_3$ proximate to the box body; an included angle between the door front wall and the third reference plane $M_3$ is referred to as $\delta_1$, and $\delta_1$ is less than 0°.

6. The refrigerator according to claim 2, wherein a plane where the access opening of the any one storage compartment is located is referred to as a second reference plane $M_2$; in a case where the door body is closed, a line intersecting a plane where the door front wall is located and a plane where the door side wall is located provides the first side edge W; a plane passing through the first side edge W and parallel to the second reference plane $M_2$ is referred to as a third reference plane $M_3$;

wherein in a case where the door body is closed, the door front wall is coplanar with the third reference plane $M_3$; in a case where the door body is closed, the door front wall is parallel to the second reference plane $M_2$; a third gap $\mu_1$ is provided between the first hinge shaft and an end wall of the first trajectory groove away from the door side wall, and the third gap $\mu_1$ is any value in a range from 0 to 0.2 mm; a fourth gap $\mu_2$ is provided between the second hinge shaft and an end wall of the second trajectory groove away from the door side wall, and a width of the fourth gap $\mu_2$ is greater than 0; and in a case where the door body is in the closed state and continues to squeeze a door seal, the door front wall moves to a side of the third reference plane $M_3$ proximate to the box body; an included angle between the door front wall and the third reference plane $M_3$ is referred to as $\delta_1$, and $\delta_1$ is less than 0°.

7. The refrigerator according to claim 1, wherein in a case where the door body is opened from the closed state to the maximum angle $G_{max}$, a separation gap $\mu_0$ is provided between the second hinge shaft and an end portion of the second trajectory groove proximate to the door side wall, and a width of the separation gap $\mu_0$ is greater than 0, so that the second hinge shaft and the end portion of the second trajectory groove are not in contact with each other and have no interaction force.

8. The refrigerator according to claim 1, wherein in a case where the door body is opened from the closed state to the maximum angle $G_{max}$, the first hinge shaft is in contact with an end portion of the first trajectory groove proximate to the door side wall; a separation gap $\mu_0$ is provided between the second hinge shaft and an end portion of the second trajectory groove proximate to the door side wall, and a width of the separation gap $\mu_0$ is greater than 0, so that the second hinge shaft and the end portion of the second trajectory groove are not in contact with each other and have no interaction force.

9. The refrigerator according to claim 1, further comprising a door seal; the door seal being disposed on the door rear wall; the door seal having a side sealing edge F proximate to the door side wall and away from the door front wall;

wherein during a process of the door body being closed from the open state, in a case where the door body is closed to an angle $G_{B0}$, the hooking portion is in contact with the blocking portion; in a case where the door body continues to be closed, the blocking portion is interacted with the hooking portion, the hooking portion is elastically deformed, and the hooking portion enters the hook gap;

wherein the refrigerator further comprises a flipping beam, a guiding block disposed on a top end of the flipping beam, and a guiding groove disposed in the box body; in a case where the door body is closed to an angle $G_S$, the guiding block is in contact with the guiding groove; during a process of the door body continuing to be closed, the guiding block is flipped due to a pressure of a groove wall of the guiding groove;

in a case where the door body is opened to 90°, a surface of the door seal away from the door front wall is approximately parallel to the first body side wall; and during a process of the door body being opened from 90° to the maximum angle $G_{max}$, an included angle between the surface of the door seal away from the door front wall and the first body side wall is increased monotonically, and a distance between the side sealing edge F and a plane where a surface of the door seal away from the door front wall is located in a case where the door body 30 is opened to 90° is increased monotonically.

10. The refrigerator according to claim 9, wherein an axis radius of the first hinge shaft and the second hinge shaft is $r_T$, and a minimum curvature radius of curve trajectories of the first trajectory line S and the second trajectory line K is $\rho_{min}$; $r_T$ and $\rho_{min}$ satisfy a relationship: $r_T \leq 0.8\ \rho_{min}$.

11. The refrigerator according to claim 10, wherein the door seal includes a side seal;

during a process of the door body being opened from the closed state to a first angle $G_1$, an average change amount of a distance between the central axis of the first hinge shaft and an edge of the side seal away from the door side wall in a case where the door body 30 is opened for a unit angle is referred to as $\zeta_1$; during a process of the door body being opened from the first angle $G_1$ to the second angle $G_2$, an average change amount of a distance between the central axis of the first hinge shaft and an edge of the side seal away from the door side wall in a case where the door body 30 is opened for the unit angle is referred to as $\zeta_2$, wherein $\zeta_1$ and $\zeta_2$ satisfy: $\zeta_1 > \zeta_2$.

12. The refrigerator according to claim 10, wherein in a case where the first hinge shaft moves along a straight line along a straight groove segment of the first trajectory groove, the door body moves a distance $\xi_1$ to an inner side when being rotated and opened for a unit angle; and in a case where the first hinge shaft moves along a curved line along the curved groove segment of the first trajectory groove, the door body moves a distance $\xi_2$ to the inner side when being rotated and opened for the unit angle; wherein $\xi_1$ and $\xi_2$ satisfy: $\xi_1 > \xi_2$.

13. The refrigerator according to claim 1, wherein an axis radius of the first hinge shaft and the second hinge shaft is $r_T$, and a minimum curvature radius of curve trajectories of the first trajectory line S and the second trajectory line K is $\rho_{min}$; $r_T$ and $\rho_{min}$ satisfy a relationship: $r_T \leq 0.8\rho_{min}$, during a process of the door body being closed from the open state, in a case where the door body is closed to an angle $G_{B0}$, the hooking portion is in contact with the blocking portion; in a case where the door body continues to be closed, the blocking portion is interacted with the hooking portion, the hooking portion is elastically deformed, and the hooking portion enters the hook gap;

wherein the refrigerator further comprises a flipping beam, a guiding block disposed on a top end of the flipping beam, and a guiding groove disposed in the box body; in a case where the door body is closed to an angle $G_S$, the guiding block is in contact with the guiding groove;

during a process of the door body continuing to be closed, the guiding block is flipped due to a pressure of a groove wall of the guiding groove;

in a case where the first hinge shaft moves along a straight line along a straight groove segment of the first trajectory groove, the door body moves a distance $\xi_1$ to an inner side when being rotated and opened for a unit angle; and in a case where the first hinge shaft moves along a curved line along the curved groove segment of the first trajectory groove, the door body moves a distance $\xi_2$ to the inner side when being rotated and opened for the unit angle; wherein $\xi_1$ and $\xi_2$ satisfy: $\xi_1 > \xi_2$.

14. The refrigerator according to claim 1, wherein during a process of the door body being closed from the open state, in a case where the door body is closed to an angle $G_{B0}$, the hooking portion is in contact with the blocking portion; in a case where the door body continues to be closed, the blocking portion is interacted with the hooking portion, the hooking portion is elastically deformed, and the hooking portion enters the hook gap; after the door body is closed to an angle $G_{B1}$, the deformation of the hooking portion is restored; wherein $G_{B0} > G_{B1}$;

wherein the refrigerator further comprises a flipping beam, a guiding block disposed on a top end of the flipping beam, and a guiding groove disposed in the box body; in a case where the door body is closed to an angle $G_S$, the guiding block is in contact with the guiding groove; during a process of the door body continuing to be closed, the guiding block is flipped due to a pressure of a groove wall of the guiding groove; wherein $G_{B1} > G_S$; and wherein the refrigerator further comprises a torsion spring, and the flipping beam is connected to the door body through the torsion spring; in a case where the door body continues to be closed to an angle $G_F$, the flipping beam is flipped over an angle $G'_F$ and reaches a critical value of the torsion spring; after the door body is closed to the angle $G_F$, the flipping beam is flipped; wherein $G_S > G_F$.

15. The refrigerator according to claim 1, wherein a plane where the access opening of the any one storage compartment is located is referred to as a second reference plane $M_2$; in a case where the door body is closed, a line intersecting a plane where the door front wall is located and a plane where the door side wall is located provides the first side edge W; a plane passing through the first side edge W and parallel to the second reference plane $M_2$ is referred to as a third reference plane $M_3$;

wherein in a case where the door body is closed, the door front wall is coplanar with the third reference plane $M_3$; in a case where the door body is closed, the door front wall is parallel to the second reference plane $M_2$; a third gap $\mu_1$ is provided between the first hinge shaft and an end wall of the first trajectory groove away from the door side wall, and the third gap $\mu_1$ is any value in a range from 0 to 0.2 mm; a fourth gap $\mu_2$ is provided between the second hinge shaft and an end wall of the second trajectory groove away from the door side wall, and a width of the fourth gap $\mu_2$ is greater than 0;

in a case where the door body is in the closed state and continues to squeeze a door seal, the door front wall moves to a side of the third reference plane $M_3$ proximate to the box body; an included angle between the door front wall and the third reference plane $M_3$ is referred to as $\delta_1$, and $\delta_1$ is less than 0°;

during a process of the door body being closed from the open state, in a case where the door body is closed to an angle $G_{B0}$, the hooking portion is in contact with the blocking portion; in a case where the door body continues to be closed, the blocking portion is interacted with the hooking portion, the hooking portion is elastically deformed, and the hooking portion enters the hook gap; after the door body is closed to an angle $G_{B1}$, the deformation of the hooking portion is restored; wherein $G_{B0} > G_{B1}$;

wherein the refrigerator further comprises a flipping beam, a guiding block disposed on a top end of the flipping beam, and a guiding groove disposed in the box body; in a case where the door body is closed to an angle $G_S$, the guiding block is in contact with the guiding groove; during a process of the door body continuing to be closed, the guiding block is flipped due to a pressure of a groove wall of the guiding groove; wherein $G_{B1}>G_S$; and wherein the refrigerator further comprises a torsion spring, and the flipping beam is connected to the door body through the torsion spring; in a case where the door body continues to be closed to an angle $G_F$, the flipping beam is flipped over an angle $G'_F$ and reaches a critical value of the torsion spring; after the door body is closed to the angle $G_F$, the flipping beam is flipped; wherein $G_S>G_F$.

16. The refrigerator according to claim 1, wherein an axis radius of the first hinge shaft and the second hinge shaft is $r_T$, and a minimum curvature radius of curve trajectories of the first trajectory line S and the second trajectory line K is $\rho_{min}$; $r_T$ and $\rho_{min}$ satisfy a relationship: $r_T \leq 0.8\ \rho_{min}$;

a plane where the access opening of the any one storage compartment is located is referred to as a second reference plane $M_2$; in a case where the door body is closed, a line intersecting a plane where the door front wall is located and a plane where the door side wall is located provides the first side edge W; a plane passing through the first side edge W and parallel to the second reference plane $M_2$ is referred to as a third reference plane $M_3$;

wherein in a case where the door body is closed, the door front wall is coplanar with the third reference plane $M_3$; in a case where the door body is closed, the door front wall is parallel to the second reference plane $M_2$; a third gap $\mu_1$ is provided between the first hinge shaft and an end wall of the first trajectory groove away from the door side wall, and the third gap $\mu_1$ is any value in a range from 0 to 0.2 mm; a fourth gap $\mu_2$ is provided between the second hinge shaft and an end wall of the second trajectory groove away from the door side wall, and a width of the fourth gap $\mu_2$ is greater than 0;

in a case where the door body is in the closed state and continues to squeeze a door seal, the door front wall moves to a side of the third reference plane $M_3$ proximate to the box body; an included angle between the door front wall and the third reference plane $M_3$ is referred to as $\delta_1$, and $\delta_1$ is less than 0°;

during a process of the door body being closed from the open state, in a case where the door body is closed to an angle $G_{B0}$, the hooking portion is in contact with the blocking portion; in a case where the door body continues to be closed, the blocking portion is interacted with the hooking portion, the hooking portion is elastically deformed, and the hooking portion enters the hook gap; after the door body is closed to an angle $G_{B1}$, the deformation of the hooking portion is restored; wherein $G_{B0}>G_{B1}$;

wherein the refrigerator further comprises a flipping beam, a guiding block disposed on a top end of the flipping beam, and a guiding groove disposed in the box body; in a case where the door body is closed to an angle $G_S$, the guiding block is in contact with the guiding groove; during a process of the door body continuing to be closed, the guiding block is flipped due to a pressure of a groove wall of the guiding groove; wherein $G_{B1}>G_S$;

wherein the refrigerator further comprises a torsion spring, and the flipping beam is connected to the door body through the torsion spring; in a case where the door body continues to be closed to an angle $G_F$, the flipping beam is flipped over an angle $G'_F$ and reaches a critical value of the torsion spring; after the door body is closed to the angle Gr, the flipping beam is flipped; wherein $G_S>G_F$; and in a case where the door body is opened from the closed state to the maximum angle $G_{max}$, a separation gap $\mu_0$ is provided between the second hinge shaft and an end portion of the second trajectory groove proximate to the door side wall, and a width of the separation gap $\mu_0$ is greater than 0, so that the second hinge shaft and the end portion of the second trajectory groove are not in contact with each other and have no interaction force.

17. The refrigerator according to claim 1, wherein in a case where the door body is closed from an angle $G_{B0}$ to an angle $G_{B1}$, an elastic deformation amount of the hooking portion reaches a maximum amount of deformation; after the door body is closed to the angle $G_{B1}$, the deformation of the hooking portion is restored, wherein $G_{B0}>G_{B1}$;

wherein the refrigerator further comprises a flipping beam, a guiding block disposed on a top end of the flipping beam, and a guiding groove disposed in the box body; in a case where the door body is closed to an angle $G_S$, the guiding block is in contact with the guiding groove; wherein $G_{B1}>G_S$; and wherein the refrigerator further comprises a torsion spring, and the flipping beam is connected to the door body through the torsion spring; in a case where the door body continues to be closed from the angle $G_S$ to an angle $G_F$, the flipping beam is flipped over an angle $G'_F$ and reaches a critical value of the torsion spring; after the door body is closed to the angle $G_F$, the flipping beam is flipped; wherein $G_S>G_F$.

18. The refrigerator according to claim 1, wherein during a process of the door body being opened from the closed state to the maximum angle $G_{max}$, the positioning center axis P of the first hinge shaft moves unidirectionally relative to the first trajectory groove towards the door side wall, so that the door body moves towards an inner side laterally; and the first trajectory line S extends from the first positioning point $\rho_1$ first towards a direction proximate to the door side wall, and then extends along a curve towards a direction proximate to the door side wall and proximate to the door front wall to the sixth positioning point $\rho_6$; wherein the sixth positioning point $\rho_6$ is located at a side of the first positioning point $\rho_1$ proximate to the door side wall and away from the door front wall.

19. The refrigerator according to claim 18, wherein the second trajectory line K extends along a curve from the first guiding point $Q_1$ to a direction away from the door front wall and proximate to the door side wall to the sixth guiding point $Q_6$; in a direction from an end of the the second trajectory line K away from the door side wall to the door side wall, a distance between the second trajectory line K and the door front wall is first increased and is then decreased.

* * * * *